(12) United States Patent
Maruyama et al.

(10) Patent No.: US 6,194,800 B1
(45) Date of Patent: Feb. 27, 2001

(54) MAGNETIC BEARING

(75) Inventors: Teruo Maruyama, Hirakata; Isao Tashiro, Higashiosaka; Tohru Nakagawa, Hirakata, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/301,476

(22) Filed: Apr. 28, 1999

(30) Foreign Application Priority Data

Apr. 28, 1998 (JP) .................................................. 10-118319
Jun. 3, 1998 (JP) .................................................. 10-154293

(51) Int. Cl.⁷ ..................................................... H02K 7/09
(52) U.S. Cl. ..................... 310/90.5; 310/254; 310/216; 310/256; 310/218
(58) Field of Search ..................... 310/90.5, 254, 310/258, 216, 218, 68 B; 384/100, 108, 291, 292, 279, 458

(56) References Cited

U.S. PATENT DOCUMENTS

| | | |
|---|---|---|
| 4,583,794 | 4/1986 | Takahara et al. . |
| 4,794,290 | 12/1988 | Nagasaka . |
| 4,998,032 * | 3/1991 | Burgbaccher ........................... 310/51 |
| 5,654,683 * | 8/1997 | Hull ...................................... 335/296 |
| 5,682,072 * | 10/1997 | Takahashi ............................ 310/156 |
| 5,698,917 * | 12/1997 | Shultz ..................................... 310/87 |
| 5,864,303 * | 1/1999 | Rosen et al. ..................... 340/870.37 |
| 5,929,548 * | 7/1999 | Pinkerton et al. .................... 310/166 |
| 5,962,940 * | 10/1999 | Imlach ................................ 310/90.5 |

* cited by examiner

*Primary Examiner*—Elvin Enad
*Assistant Examiner*—Thanh Lam
(74) *Attorney, Agent, or Firm*—Wenderoth, Lind & Ponack, L.L.P.

(57) ABSTRACT

On the stationary side of a radial bearing constructed of a plurality of magnetic poles, the magnetic poles are formed into a shape such that the magnetic flux density distribution formed between the inner surfaces of these magnetic poles and a rotor located on the rotating side of the radial bearing has a distribution inclined from the magnetic pole end portion to the magnetic pole center portion. With this arrangement, the rate of change in magnetic flux density during the shift of the rotor from a magnetic pole to the adjacent magnetic pole is reduced, thereby reducing the eddy current loss and heat generation.

20 Claims, 40 Drawing Sheets

Fig.16A
Fig.16B
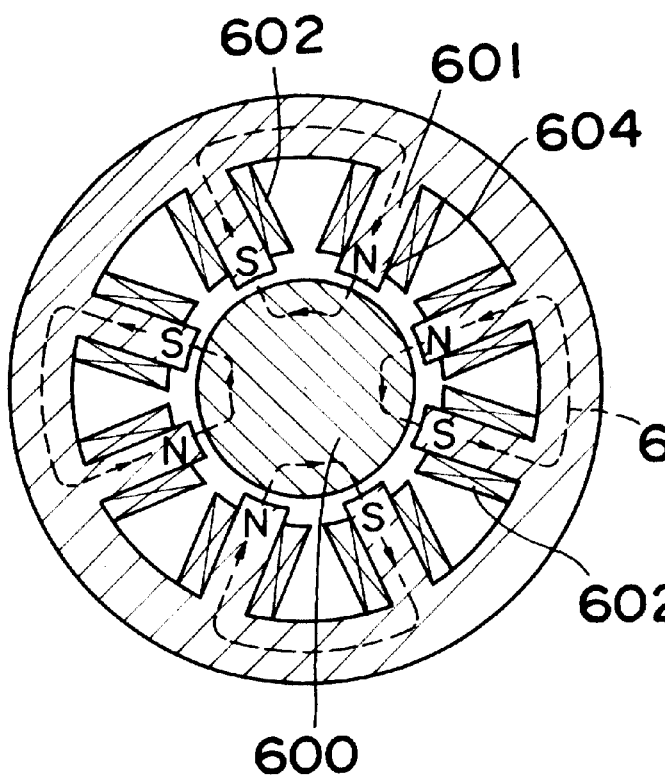
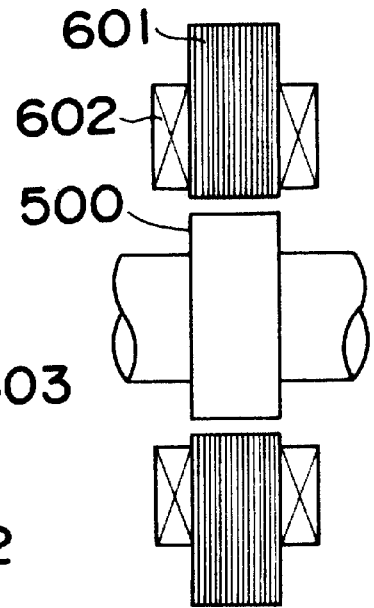

MAGNETIC BEARING

BACKGROUND OF THE INVENTION

The present invention relates to a magnetic bearing spindle for use in manufacturing processing machinery (for metal molding or aluminum processing such as scrolling), a turbo molecular pump of semiconductor equipment or the like.

The issues of a high-speed spindle for machining, taken as an example, will be described below.

In recent years, there has been a growing demand for high-speed cutting work in the field of machining. The high-speed cutting is expected to produce the effects of improving the production efficiency, improving the processing accuracy and prolonging the operating life of the tool by virtue of a reduction in cutting resistance, reducing the cost of the mold and the like, and reducing the processing time by virtue of cutting from an integrated material into a shape in a stroke.

The recent requirements for the product quality care about not only the quality of the processed surface (i.e., the shape accuracy and surface roughness) but also the defect beneath the processed surface and the presence or absence of a transubstantiated layer. Accordingly, there is a great expectation for high-speed cutting that receives little influence from the generation of heat accompanying the removal of metal and is able to reduce the cutting resistance.

For the spindle that decisively dominates the capabilities of the processing machinery, there has conventionally been mainly used a support structure with ball bearings. In response to the aforementioned demands for high-speed cutting, there have been developments for the increase in speed by improving the lubricating system and adopting a ceramics bearing or the like.

On the other hand, an active control type magnetic bearing spindle that supports a rotating body in a non-contact manner by magnetic levitation has attracted a great deal of attention as a spindle that has the possibility of exceeding the limit of the ball bearing system in recent years.

FIG. 15 illustrates an example of the magnetic bearing spindle, in which are shown a spindle main shaft 500, a motor rotor 501, and a motor stator 502. There are also shown front side radial bearings 503 and 504, rear side radial bearings 505 and 506, and thrust bearings 507 and 508. These combinations are each being constructed of the rotor located on the rotating side and the stator located on the stationary side. There are further shown radial displacement sensors 509 and 510 located on the front and rear sides, respectively, a thrust displacement sensor 511, protecting bearings 512 and 513, and a casing 514.

The fundamental capability of the processing use spindle is normally evaluated by the magnitude of a DN value (spindle diameter x number of revolutions).

In the case of the ball bearing spindle, which has undergone a variety of improvements in recent years, it is considered that the limitation of the DN value is practically about 2.5 million taking the operating life into account due to the accompaniment of mechanical sliding lubrication.

By contrast, in the case of the magnetic bearing, it is possible to provide a spindle of which the DN value surpasses the DN value of the ball bearing by making the best use of the features of non-contact rotation that can ensure semipermanent use. In order to satisfy the demands for the aforementioned high-speed high-rigidity structure on the processing side, there have been carried out trials for increasing the spindle main shaft diameter and rotating the same at higher speed. The large main shaft diameter is desired because the inertial rigidity (the dynamic effect in which the main shaft axial center tries to keep one direction) is greater in a high-speed operation and a blade tool of a larger diameter can be gripped because the main shaft diameter is greater.

However, it was discovered that the magnetic bearing, which was expected to have a small loss because of the non-contact structure, unexpectedly caused a great frictional loss as the result ova striving for a higher DN value. The principal factor of the above result is-the eddy current loss of the radial bearing.

FIGS. 16A and 16B show the principle of the radial bearing that has conventionally been used, in which are shown a rotor iron core 600 (corresponding to 503 of FIG. 15) constructed of electromagnetic steel plates, a stator iron core 601 (corresponding to 504 of FIG. 15), and a winding 602. In the figure, the flow of magnetic flux is indicated by the arrow 603. In the radial magnetic bearing, the rotor is retained at the center in a non-contacL manner by attracting the rotor 600 by magnetic forces in vertical and horizontal directions.

Because of the rotation, one key factor of the rotor iron core is that is successively faces magnetic poles 604 in the order of N→S→S→N (there is another case of N→S→N→S as described later) as shown in FIG. 16A, so that the direction and magnitude of the magnetic flux 603 varies. Consequently, a varying induction electromotive force is generated in the rotor iron core 600, so that an eddy current flows. In order to reduce this eddy current loss, the rotor iron core 600 normally has a laminate structure formed by stacking thin electromagnetic steel plates (silicon steel plates).

If the rotating section of the magnetic bearing is constructed for the achievement of a spindle having a high DN value (a large main shaft diameter and a greater number of revolutions), the following issues occur.

(1) If electromagnetic steel plates of a high resistivity, a small iron loss, and a small plate thickness are used in order to reduce the eddy current loss, there is a restriction on the permitted number of revolutions due to a limitation of the mechanical strength of the material with respect to a stress generated by a centrifugal force so long as the material is identical. The stress generated by the centrifugal force depends on the peripheral velocity of the rotating body, and this naturally leads to the limitation of the DN value.

(2) Conversely, when electromagnetic steel plates that endure a large number of revolutions and have a large plate thickness, a low resistivity, and a large iron loss are used, an abnormal temperature rise is caused on the main shaft by the heat generation due to a. large eddy current loss so long as the material is identical. This temperature rise exerts a great deal of bad influence on the reliability of the rotating main shaft constructed of composite components. The main shaft of the magnetic bearing is normally constructed of a motor, electromagnetic steel plates of the magnetic bearing, a ring for fastening the plates, a disk for the thrust bearing, a tooling member provided by utilizing the inside of the main shaft, and so on. The main shaft subjected to severe conditions at high speed and high temperature causes the troubles of destruction, deformation, and the like of these composite components.

(3) The loss can be reduced by reducing the bias current to be formed through the electromagnet of the radial bearing, and reducing the face width or the axial length of the electromagnet, or by taking similar measures. However, the rigidity and loading capability are concurrently reduced, and therefore, the DN value is hard to increase.

SUMMARY OF THE INVENTION

Accordingly, an object of the present invention is to provide a magnetic bearing which can give radical solutions to the issues that have not been able to be solved by the aforementioned measures (1) through (3) in reducing the eddy current loss.

In accomplishing these and other aspects, according to a first aspect of the present invention, there is provided a magnetic bearing for supporting a load in a radial direction of a rotary shaft that is rotatively driven by a motor in a radial magnetic bearing. The magnetic bearing comprises a stator section which serves as a stationary side of the radial bearing, and in which north magnetic poles and south magnetic poles are arranged in a circumferential direction thereof. The magnetic pole are formed into a shape such that a magnetic flux density distribution formed between a rotor that serves as a rotating side of the radial bearing and an inner surface of the magnetic pole facing the rotor has a distribution that increases from at least one magnetic pole end portion to a magnetic pole center portion in the circumferential direction.

According to a second aspect of the present invention, there is provided a magnetic bearing as defined in the first aspect, wherein the magnetic flux density has a distribution inclined at an interval at the circumferential direction from a boundary between two of the adjacent magnetic poles and a flat distribution in the magnetic pole center portion.

According to a third aspect of the present invention, there is provided a magnetic bearing as defined in the first aspect, wherein an inclined surface is formed on the magnetic pole inner surface so that a magnetic path gap formed between the magnetic pole inner surface and the rotor becomes narrower in the circumferential direction from the magnetic pole end portion to the magnetic pole center portion in the circumferential direction.

According to a fourth aspect of the present invention, there is provided a magnetic bearing as defined in the third aspect, wherein the magnetic pole inner surface is provided with a circle portion coaxial with the rotor so that a uniform magnetic path gap is maintained.

According to a fifth aspect of the present invention, there is provided a magnetic bearing as defined in the first aspect, wherein, assuming that an interval having the distribution in which the magnetic flux density gradually increases from the magnetic pole end portion to the magnetic pole center portion in the circumferential direction is a and an angle that one magnetic pole bears as a radial electromagnet is $\psi$, then $(\alpha/\psi)>0.15$.

According to a sixth aspect of the present invention, there is provided a magnetic bearing as defined in the first aspect, wherein the radial electromagnet is constructed with a magnetic pole arrangement of an NSSN type. The magnetic flux density has a distribution in which the magnetic flux density gradually increases in an interval from a midpoint of a boundary to the magnetic pole on a heteropolar side in the circumferential direction, and has a roughly flat distribution in an interval from a midpoint of a boundary to the magnetic pole on a homopolar side in the circumferential direction.

According to a seventh aspect of the present invention, there is provided a magnetic bearing as defined in the first aspect, wherein the radial electromagnet is constructed with a magnetic pole arrangement of an NSSN type. Assuming that a gap between an inner surface of the magnetic pole end portion on a heteropolar side adjacent to one magnetic pole and the rotor :Ls $\delta_1$ and a gap between an inner surface of the magnetic pole end portion on a homopolar side and the rotor is $\delta_2$, then $\delta_1>\delta_2$.

According to an eighth aspect of the present invention, there is provided a magnetic bearing as claimed in claim 1, wherein a portion that has a reduced magnetic path area is provided for the magnetic pole in a magnetic circuit that extends from a winding portion to the magnetic pole end portion.

According to a ninth aspect of the present invention, there is provided a magnetic bearing as defined in the first aspect, wherein the stator section is constructed of a plurality of divided and assembled core pieces through a division method for dividing the stator section into the core pieces and assembling the stator section.

According to a tenth aspect of the present invention, there is provided a magnetic bearing as defined in any one of the first through ninth aspects, wherein the magnetic flux density distribution is asymmetrical about the magnetic pole center portion in the circumferential direction.

According to an eleventh aspect of the present invention, there is provided a magnetic bearing as defined in any one of the first through tenth aspects, wherein, with regard to one point on the rotor and one magnetic pole, it is assumed that a vicinity of the magnetic pole end portion by which the one point on the rotor passes first is an entrance side of the magnetic pole, and the opposite side is an exit side of the magnetic pole. If an interval on the entrance side of the magnetic pole has a distribution in which the magnetic flux density gradually increases from the magnetic pole end portion to the magnetic pole center portion in the circumferential direction and is defined as $a_1$, an interval on the exit side of the magnetic pole has a distribution in which the magnetic flux density gradually decreases from the magnetic pole end portion to the magnetic pole center portion in the circumferential direction and is defined as $\alpha_2$, and an angle that one magnetic pole bears as the radial electromagnet is $\psi$, then $(\alpha_1/\psi)<(\alpha_2/\psi)$.

According to a twelfth aspect of the present invention, there is provided a magnetic bearing as defined in the first aspect, wherein the magnetic pole located on a heteropolar sides and the magnetic pole located on a homopolar side are arranged on the left-hand and right-hand sides. The shapes of the magnetic pole located on the heteropolar side and the magnetic pole located on the homopolar side of the magnetic pole, or a relative positional relation between the magnetic pole located on the heteropolar side and the magnetic pole located on the homopolar side of a magnetic pole adjacent to the one magnetic pole, is asymmetrical.

According to a thirteenth aspect of the present invention, there is provided a magnetic bearing as defined in the twelfth aspect, wherein, if a gap in the circumferential direction between one magnetic pole and the magnetic pole end portion located on the heteropolar side adjacent to the one magnetic pole is defined as $S_1$, and a gap in the circumferential direction between the magnetic pole and the magnetic pole end portion located on the homopolar side is defined as $S_2$, then $S_1>S_2$.

According to a fourteenth aspect of the present invention, there is provided a magnetic bearing as defined in the twelfth or thirteenth aspect, wherein the end portion of one magnetic pole and the end portion of the adjacent magnetic pole located on the homopolar side are individually produced and thereafter integrated with each other.

According to a fifteenth aspect of the present invention, there is provided a magnetic bearing as defined in any one of the twelfth through fourteenth aspects,, wherein one magnetic pole and the adjacent magnetic pole located on the homopolar side have an integrated structure.

According to a sixteenth aspect of the present invention, there is provided a magnetic bearing as defined in any one of the twelfth through fifteenth aspects, wherein the magnetic flux density has a distribution at which the magnetic flux density gradually increases in an interval from a midpoint of a boundary to the magnetic pole on the heteropolar side in the circumferential direction, and has a roughly flat distribution in an interval from a midpoint cf a boundary to the magnetic pole on the homopolar side in the circumferential direction.

According to a seventeenth aspect of the present invention, there is provided a magnetic bearing as defined in any one of the twelfth through sixteenth aspects, wherein the magnetic flux density has a distribution in which the magnetic flux density gradually increases in intervals in the circumferential direction from midpoints of boundaries to the magnetic poles on bothl the heteropolar side and the homopolar side. Assuming that the interval of increase on the heteropolar side is $\alpha_1$ and the interval of increase on the homopolar side is $\alpha_2$, then $\alpha_1 > \alpha_2$.

According to an eighteenth aspect of the present invention, there is provided a magnetic bearing as defined in any one of the twelfth through seventeenth aspects, wherein, if a gap between an inner surface of the magnetic pole end portion on the heteropolar side located adjacent to the one magnetic pole and the rotor is defined as $\delta_2$, then $\delta_1 > \delta_2$.

According to a nineteenth aspect of the present invention, there is provided a magnetic bearing as defined in any one of the twelfth through eighteenth aspects, wherein an inclined surface is formed on an inner surface of the magnetic pole soD that the magnetic path gap formed between the inner surface of the magnetic pole and the rotor is tapered down in the circumferential direction from the magnetic pole end portion oil the heteropolar side toward the magnetic pole center portion in the circumferential direction.

According to a twentieth aspect of the present invention, there is provided a magnetic bearing as defined in the nineteenth aspect, wherein the inner surface of the magnetic pole center portion is provided with a circle portion coaxial with the rotor so that a uniform magnetic path gap is maintained.

According to a twenty-first aspect of the present invention, there is provided a magnetic bearing as defined inr any one of the twelfth through twentieth aspects, wherein a portion that has a reduced magnetic path area is provided on the heteropolar side of the magnetic pole in a magnetic circuit that: extends from a winding portion to the magnetic pole end portion.

According to a twenty-second aspect of the present invention, there is provided a magnetic bearing as defined in any one of the twelfth through twenty-first aspects, wherein the stator section is constructed of a plurality of core pieces.

According to a twenty-third aspect of the present invention, there is provided a magnetic bearing as claimed in the first aspect, wherein the magnetic bearing is a rotary spindle. The spindle includes a motor for rotating the rotary shaft; a radial magnetic bearing for supporting a radial load of the rotary shaft; a thrust bearing for supporting the axial load of the rotary shaft; and a displacement sensor for detecting a gap on a stationary side and a gap on a rotating side of the thrust bearing.

BRIEF DESCRIPTION OF THE DRAWINGS

These and other aspects and features of the present invention will become clear from the following description taken in conjunction with the preferred embodiments thereof with reference to the accompanying drawings, En which:

FIGS. 16A and 16B are a front view and a side view, respectively, of the conventional radial magnetic bearing;

DETAILED DESCRIPTION OF THE PREFERRED EMBODIMENTS

Figure 1:
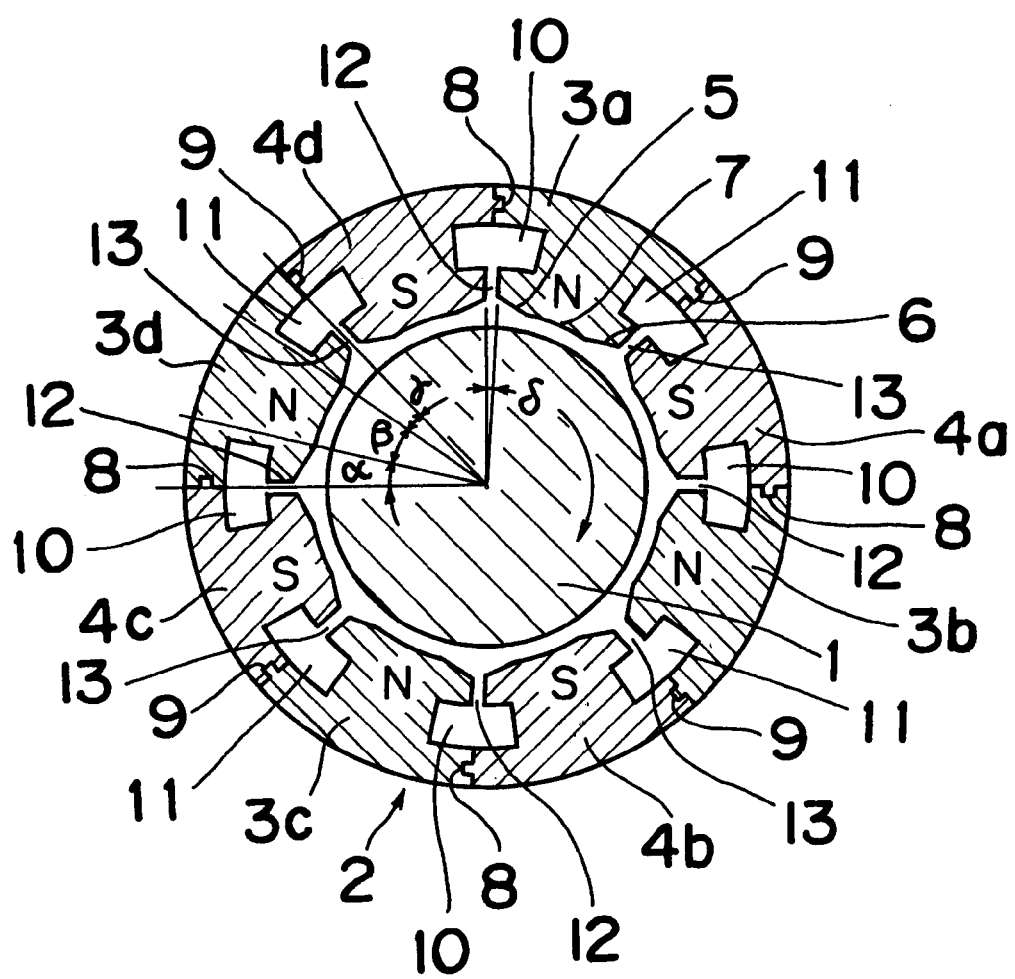
FIG. 1 is a view showing the principle of an electromagnet A of a radial magnetic bearing according to a first embodiment of the present invention.

Before the description of the present invention proceeds, it is to be noted that like parts are designated by like reference numerals throughout the accompanying drawings.

(First Embodiment)

The outline of a first embodiment of the present invention will be first described below, and the principle and effects thereof will then be described by theoretical eddy current loss analysis.

1. Construction of the Electromagnet

[1] In the case of an electromagnet A

FIG. 1 shows the principle of a radial magnetic bearing electromagnet (referred to as an electromagnet A) according to the first embodiment of the present invention. There are shown a rotor 1 and a stator section 2, and this stator section 2 employs the NSNS type structure constructed of eight independent magnetic poles. That is, four north poles $3a$ through $3d$ and four south poles $4a$ through $4d$ are arranged alternately in the circumferential direction. In this case, with regard to one north pole $3a$, there are shown inclined portions 5 and 6 formed at both end portions of the inner surface of the magnetic pole $3a$, a perfect circle portion (coaxial portion) 7 arranged coaxially with respect to the rotor 1, mutually engageable projected and recessed connecting portions 8 and 9 for positioning and fastening the respective magnetic poles, winding accommodating portions 10 and 11, and slot portions 12 and 13 that are inter-heteropolar gaps. It is to be noted that these portions 5 through 11 are similarly provided for each of the other magnetic poles.

Figure 2:
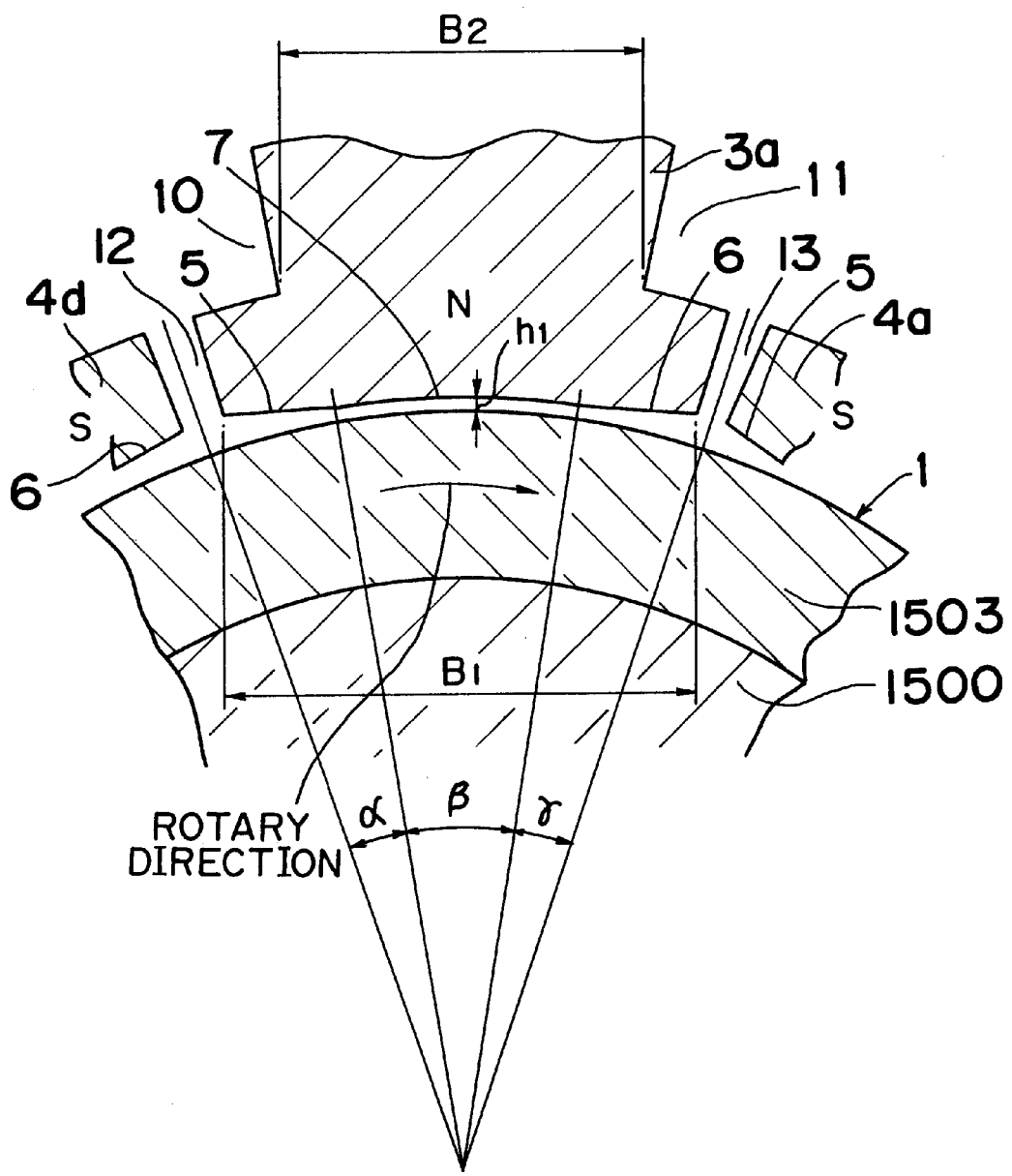
FIG. 2 is an enlarged view of the electromagnet of FIG. 1.

FIG. 2 shows an enlarged view of the magnetic pole $3a$. In this embodiment, a slot width $\delta$ of the slot portions 12 and 13 between heteropolar magnetic poles is set to a sufficiently small value of $\delta=6$ degrees. The end portions and the coaxial portion 7 of the magnetic pole are connected via gently inclined surfaces, forming the inclined portions 5 and 6 having the intervals of $\alpha=\gamma=10$ degrees. In this case, it is assumed that the interval of the angle $\alpha$ is referred to as a rising interval (approaching interval) of a magnetic flux density curve and the interval of the angle $\gamma$ is referred to as a falling interval (decelerating interval). In an interval of an angle $\beta$ in the center portion, the inner surface of the magnetic pole is formed so as to be coaxial with the rotor 1, and a gap (air gap) between the rotor 1 and the magnetic pole is uniform.

Figure 17:
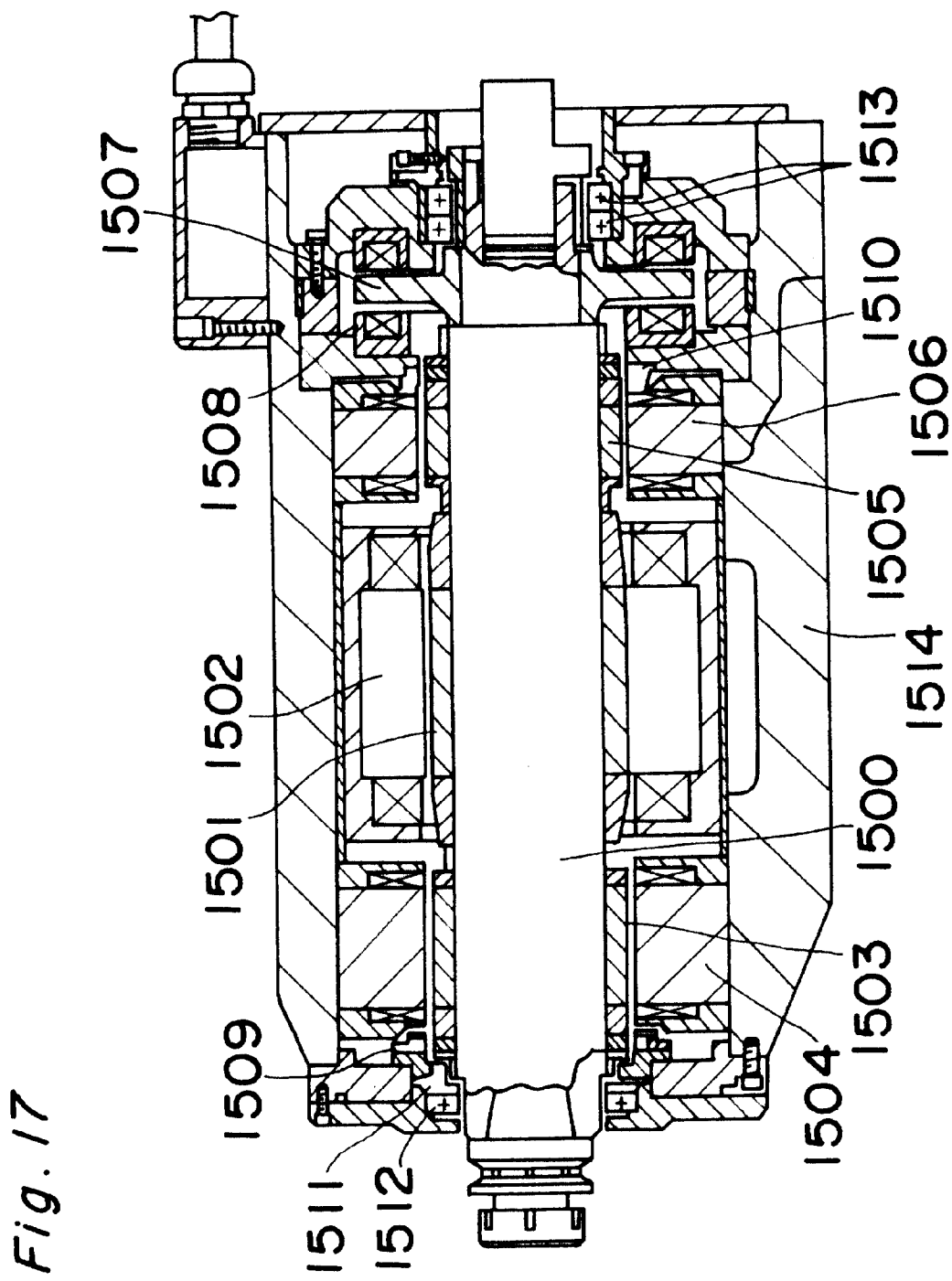
FIG. 17 is a front section view of a magnetic bearing spindle provided with the radial magnetic bearing of the first embodiment.

FIG. 17 is an example of a magnetic bearing spindle provided with the radial magnetic bearing electromagnet of the first embodiment. The magnetic bearing is a rotary spindle that: comprises a motor for rotating the rotary shaft; a radial magnetic bearing for supporting the radial load of the rotary shaft; a thrust bearing for supporting axial the load of the rotary shaft; and displacement sensors for detecting a gap on a stationary side and a gap on a rotating side of each of the radial magnetic an thrust bearings. In detail, in FIG. 17, there are shown a spindle main shaft 1500, a motor rotor 1501, and a motor stator 1502. There are also shown front side radial bearings 1503 and 1504 that constitute the radial magnetic bearing of the first embodiment, rear side radial bearings 1505 and 1506 that constitute the radial magnetic bearing of the first embodiment, and thrust bearings 1507 and 1508. The radial bearings are constructed of the rotors 1503 and 1505 located on the rotating side and the stators 1504 and 1506 located on the stator side. There are further shown radial displacement sensors 1509 and 1510 located on the front side and the rear side, a thrust displacement sensor 1511, protecting bearings 1512 and 1513, and a casing 1514. The rotors 1503 and 1505 of tire radial bearings correspond to the rotor 1 of FIG. 1, while the stators 1504 and 1506 correspond to the stator section 2 of FIG. 1. It is to be noted that FIG. 1 is illustrated by only the section of the rotor 1 while omitting the section of the stator for the simplicity of the figure.

[2] In the case of an electromagnet B

Figure 11:
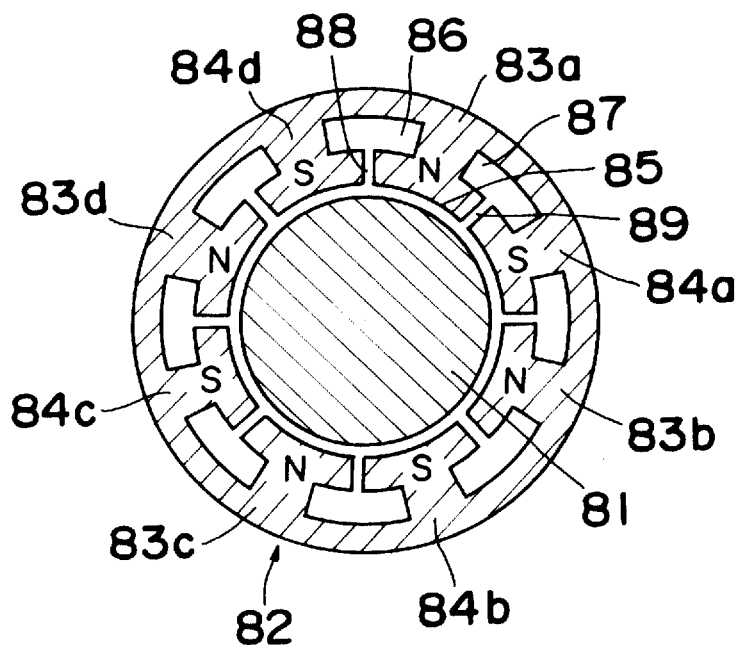
FIG. 11 is a view showing the principle of an electromagnet B taken as a comparative example in the case where the rising interval and the falling interval are made to be zero.

FIG. 11 shows the principle of the radial magnetic bearing electromagnet B in the case in which the aforementioned angles $\alpha=\gamma=0$. There are shown a rotor 81 and a stator section 82. This stator section 82 also has the NSNS type structure in which four north poles 83a through 83d and four south poles 84a through 84d are alternately arranged in the circumferential direction. In this case, with regard to one magnetic pole 83a, there is a perfect circle portion 85, in which the gap between the rotor 81 and each magnetic pole is uniform. There are further shown winding accommodating portions 86 and 87, and slot portions 99 and 89 that are inter-heteropolar gaps. With regard to the shape of the electromagnet of FIG. 11, the slot width is set so that $\gamma=6$ degrees, which is smaller than the shape of the radial bearing for normal use similar to the aforementioned first embodiment of the present invention. This arrangement is selected in order to compare the loss of the present invention with the loss of the conventional structure under the same conditions of loading capability and rigidity through the eddy current loss analysis as follows.

[3] In the case of a conventional electromagnet C

Figure 13:
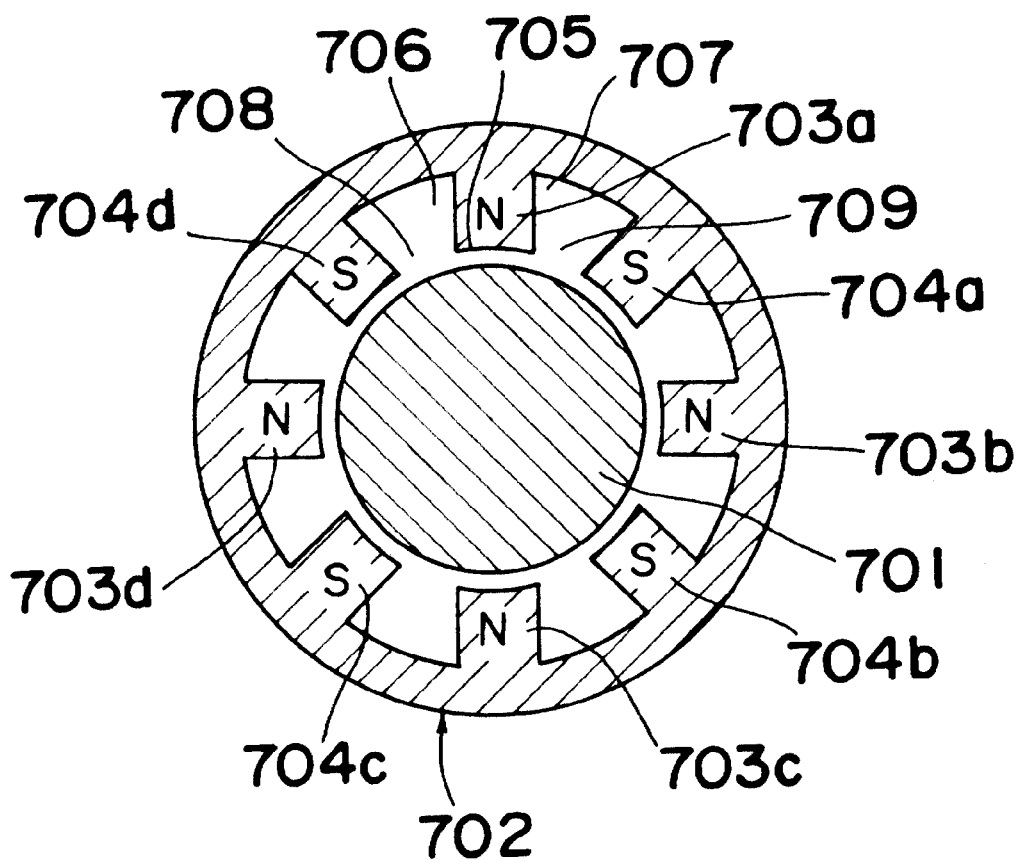
FIG. 13 is a view showing the principle of an electromagnet C of a conventional generic magnetic bearing.

FIG. 13 shows the principle of the radial magnetic bearing electromagnet C that has conventionally been used. There are shown a rotor 701 and a stator section 702. This stator section 702 also has ths NSNS type structure in which four north poles 703a through 703d and four south poles 704a through 704d are alternately arranged in the circumferential direction. In this case, with regard to one magnetic pole 703a, there is a perfect circle portion 705, where the gap between the rotor 701 and each magnetic pole is uniform. There are further shown winding accommodating portions 706 and 707, and slot portions 708 and 709 that are inter-heteropolar gaps. With regard to the shape of the conventional electromagnet of FIG. 13, the slot width is set sufficiently large in order to accommodate a winding in the winding accommodating portions 706 and 707.

II. Eddy current loss analysis

There is currently found no example of conventional research for obtaining an absolute value of the eddy current loss of a magnetic bearing. Therefore, an analytic solution is first directly derived from an electromagnetic induction theory.

[1] Basic model of analysis

Figure 3:
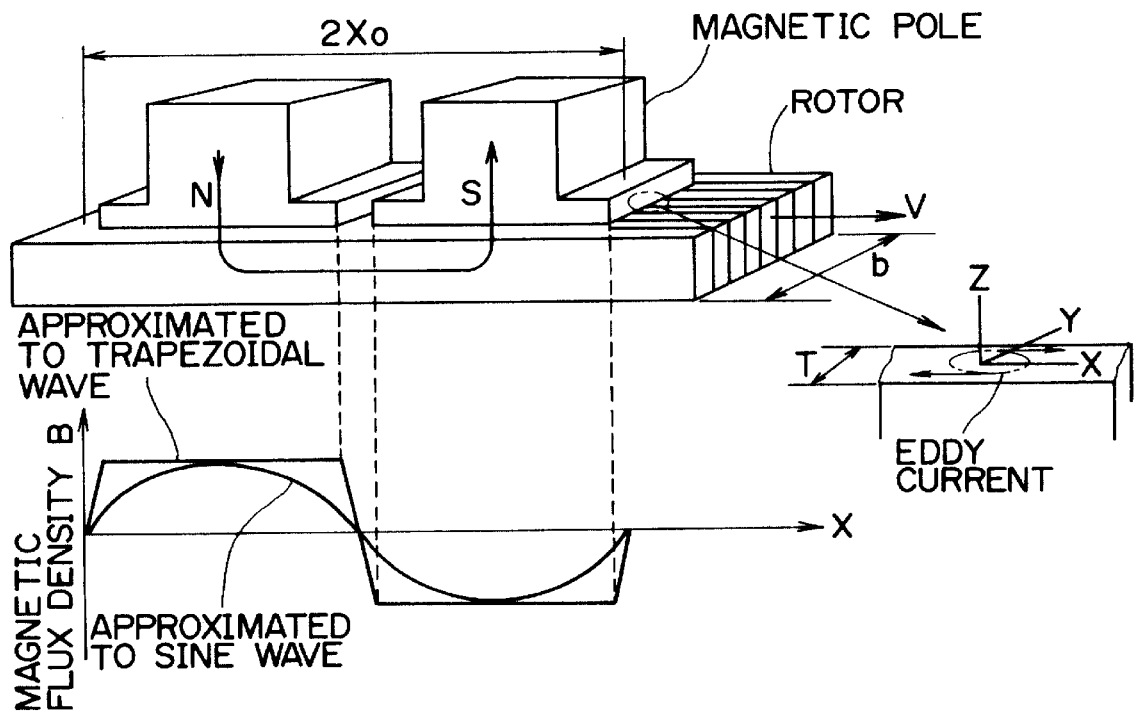
FIG. 3 is a view of a model for an eddy current loss analyis.

In FIG. 3, coordinates are plotted on a planar conductor that is moving at a velocity $v=r\omega$, and it is assumed that a magnetic flux B expressed by:

$$B = B_0 \sin\left[m\left(\omega t + \frac{x}{r}\right)\right]k. \quad \text{(Equation 1)}$$

The magnetic flux B is intersecting this planar conductor, where $B_0$ is the maximum value of the magnetic flux density.

In the above equation (1), "$\omega$" represents an angular acceleration of the spindle, "r" represents the radius of the main shaft, and "m" represents a value which is determined by the magnetic pole arrangement and assumes the value m=4 in the case of the NSNS type and the value m=2 in the case of the NSSN type.

[2] Fundamental equation

According to the electromagnetic induction theory:

$$\nabla \times J = -\sigma \frac{\partial B}{\partial t} \quad \text{(Equation 2)}$$

where "J" represents a current density ($=J_x i + j_y j + J_z k$) "$\gamma$" represents a conductivity, "t". represents time, "i" indicates a direction of a vector in x-direction shown in FIG. 3, "j" indicate a direction of a vector in y-direction shown in FIG. 3, "k" indicate a direction of a vector in z-direction shown in FIG. 3, "Jx" represents a current density in x-dlrection, "Jz" represents a current density in z-direction, and "$\nabla$" (nabla) represents a differential operator.

$$\nabla = i\frac{\partial}{\partial x} + j\frac{\partial}{\partial y} + k\frac{\partial}{\partial z}$$

$$\nabla \times J = \left(\frac{\partial J_z}{\partial y} - \frac{\partial J_y}{\partial z}\right)i + \left(\frac{\partial J_x}{\partial z} - \frac{\partial J_z}{\partial x}\right)j + \left(\frac{\partial J_y}{\partial x} - \frac{\partial J_x}{\partial y}\right)k$$

With regard to one electromagnetic steel plate, the plate thickness is sufficiently small. Therefore the current density in the y-direction is expressed by: $J_y=0$ Assuming that there is a uniformity in the z-direction, then $J_z=\partial/\partial z=0$ $$\frac{\partial J_x}{\partial y}k = +\sigma\frac{\partial}{\partial t}\left[B_0 \sin\left\{m\left(\omega t + \frac{x}{r}\right)\right\}\right]k \quad \text{(Equation 3)}$$

$$J_x = +B_0 \sigma m \omega \int \cos\left\{m\left(\omega t + \frac{x}{r}\right)\right\} dy \quad \text{(Equation 4)}$$

$$= +B_0 \sigma m \omega \cos\left\{m\left(\omega t + \frac{x}{r}\right)\right\} \cdot y$$

where "m" represents an integer determined by a magnetic pole arrangement in the circumferential direction and the number of the magnetic poles as described above.

If a time average and averages in the x-direction and y-direction are calculated assuming that the eddy current loss $W_e$ is consumed inside the conductor of an electromagnetic steel plate having a thickness T (a width b in terms of the total length of the laminated layers) a length d in the circumferential direction, and a depth S where the magnetic flux enters, since $$\Delta W_e = J_x^2 \cdot \Delta V / \gamma$$

then:

$$W_e = \frac{1}{2\pi} \frac{bd}{2x_0 T} \int_0^{2\pi} \int_0^S \int_{-T/2}^{T/2} \int_0^{2x_0} \frac{1}{\sigma} J_x^2 \, dx\, dy\, dz\, d(\omega t) \quad \text{(Equation 5)}$$

where the terms of the averages of time and the x-directionl are expressed by:

$$\frac{1}{2\pi 2x_o} \int_0^{2\pi} \int_0^{2x_o} \cos^2\left\{m\left(\omega t + \frac{x}{r}\right)\right\} dx\, d(\omega t) = 1/2 \quad \text{(Equation 6)}$$

where "$X_0$" represents a value of a length in the circumferential direction of one magnetic pole in a case where a length in the circumferential direction of two magnetic poles as shown in FIG. 3 iSsupposed to be $2X_0$, and the termn of the average of the y-direction is expressed by:

$$\frac{1}{T}\int_{-\frac{T}{2}}^{\frac{T}{2}} y^2 dy = \frac{T^3}{12}.$$ (Equation 7)

If these values are used, the eddy current loss $W_3$ in the case where the magnetic flux density distribution of the radial magnetic bearing is approximated to be a sine wave in the circumferential direction is obtained. Since d2 πr, then:

$$W_e = \frac{\pi}{12}bT^2 rs B_0^2 \sigma m^2 \omega^2$$ (Equation 8)

where "s" represents a depth of the entry of magnetic flux in the rotor.

Figure 4:
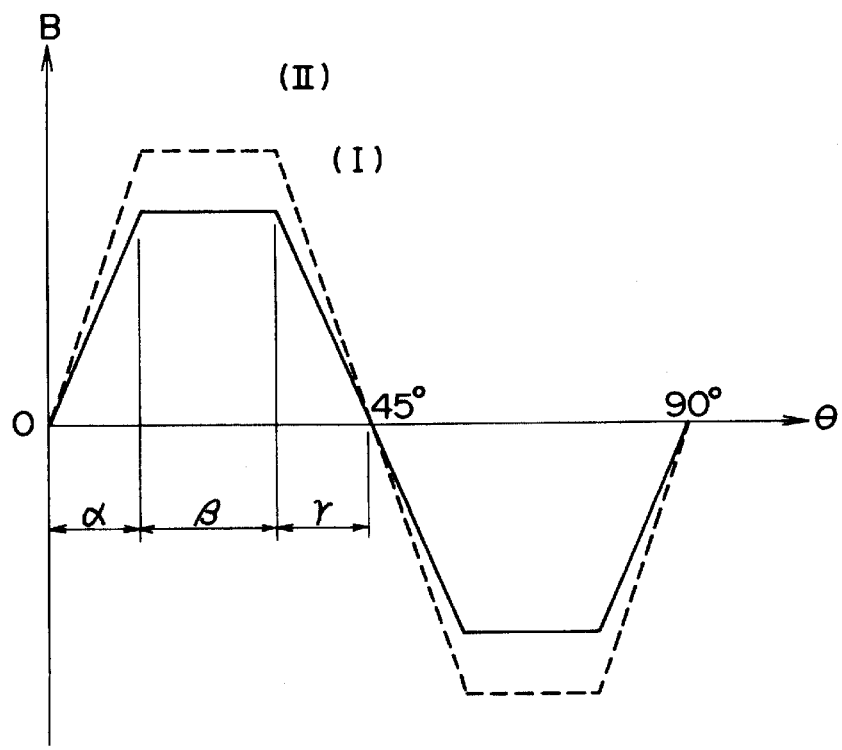
FIG. 4 is a graph showing the magnetic flux density distribution of the magnetic poles of the first embodiment of the present invention.
Figure 12:
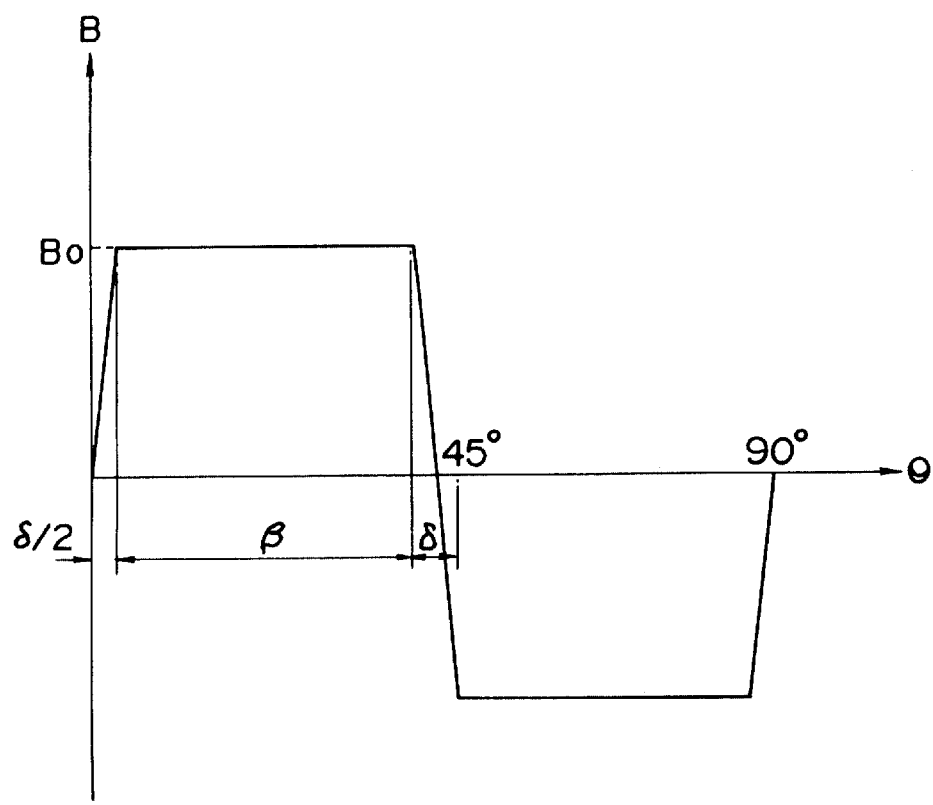
FIG. 12 is a graph showing the magnetic flux density distribution of the electromagnet of FIG. 11.

[3] In the case of a periodic function with an arbitrary magnetic flux density distribution Although the magnetic flux density distribution curve has been approximated to the sine wave for the sake of easy understanding according to the above description, the periodic function of the magnetic flux density distribution of the actual magnetic bearing has a close resemblance to a rectangular wave or a trapezoidal wave as shown in FIG. 4 or FIG. 12. In this case:

$$B = B_0 \sum_n A_n \cdot \sin\left[m\left(\omega t + \frac{x}{r}\right)\right]$$ (Equation 9)

instead of the Equation 1, and "$A_n$" represents a function of 11 obtained from Fourier-series by Fourier-series-approximating the periodic function.

The eddy current loss $W_e$ in this case is expressed by the following equation:

$$W_e = \frac{\pi}{12}bT^2 rs B_0^2 \sigma \omega^2 \sum_n A_n^2 n^2$$ (Equation 10)

instead of the Equation 8.

On the rotor surface of the magnetic bearing, the low frequency components Of the magnetic flux enter the inside of the rotor. However, high frequency components are hard to enter. Therefore, assuming that a skin depth, i.e., a volume that causes a loss, is proportional to:
 $1/\sqrt{n}$
 $1/\sqrt{n}$
then the Equation 10 becomes:

$$W_e = \frac{\pi}{12}bT^2 rs B_0^2 \sigma \omega^2 \sum_n \frac{a_n^2}{\sqrt{n}} n^2.$$ (Equation 11)

In the Equation 11, "$a_n$" represents the Fourier coefficient determined by the type (sine wave, trapezoidal wave, rectangular wave, or the like) of the periodic function.

III. Effect of reducing the loss of the first embodiment

According to the above results, the fundamental equation (Equation 11) for obtaining the absolute value of the eddy current loss when an arbitrary periodic function is given to the magnetic flux density distribution is thus obtained. Then calculation is executed by applying the equation to the first embodiment (the electromagnet A of FIG. 1) of the present invention. Further, the effect of reducing the loss is evaluated by comparison with a bearing structure (the electromagnet B of FIG. 11) that serves as a comparative example having neither the rising interval nor the falling interval of the magnetic flux density distribution.

[1] Comparison of magnetic flux density distribution

FIG. 4 shows the magnetic flux density distribution of the first embodiment (the electromagnet A) in the interval in which a rotor rotating angle is 0 to 90 degrees. It should be theoretically provided that B=0 in the interval of the slot width δ. However, (1) the slot width δ is made sufficiently small in the first embodiment.

(2) In the actual electromagnet, the waveform of the magnetic field somewhat loses its edges due to the influence of leakage flux, the chamfering process of the rotor inner surface edge portions of the electromagnet, and other factors. For the aforementioned reasons (1) and (2), the magnetic field distribution s provided with an angle of inclination fully in the rising interval α and the falling interval γ. Further, α=γ in Lhe first embodiment.

Also, in the case of the electromagnet B of FIG. 11 to be compared with the first embodiment of the present invention, a slight angle of inclination is provided in the interval of the slot width δ as shown in FIG. 11 for the aforementioned reasons (1) and (2).

Figure 14:
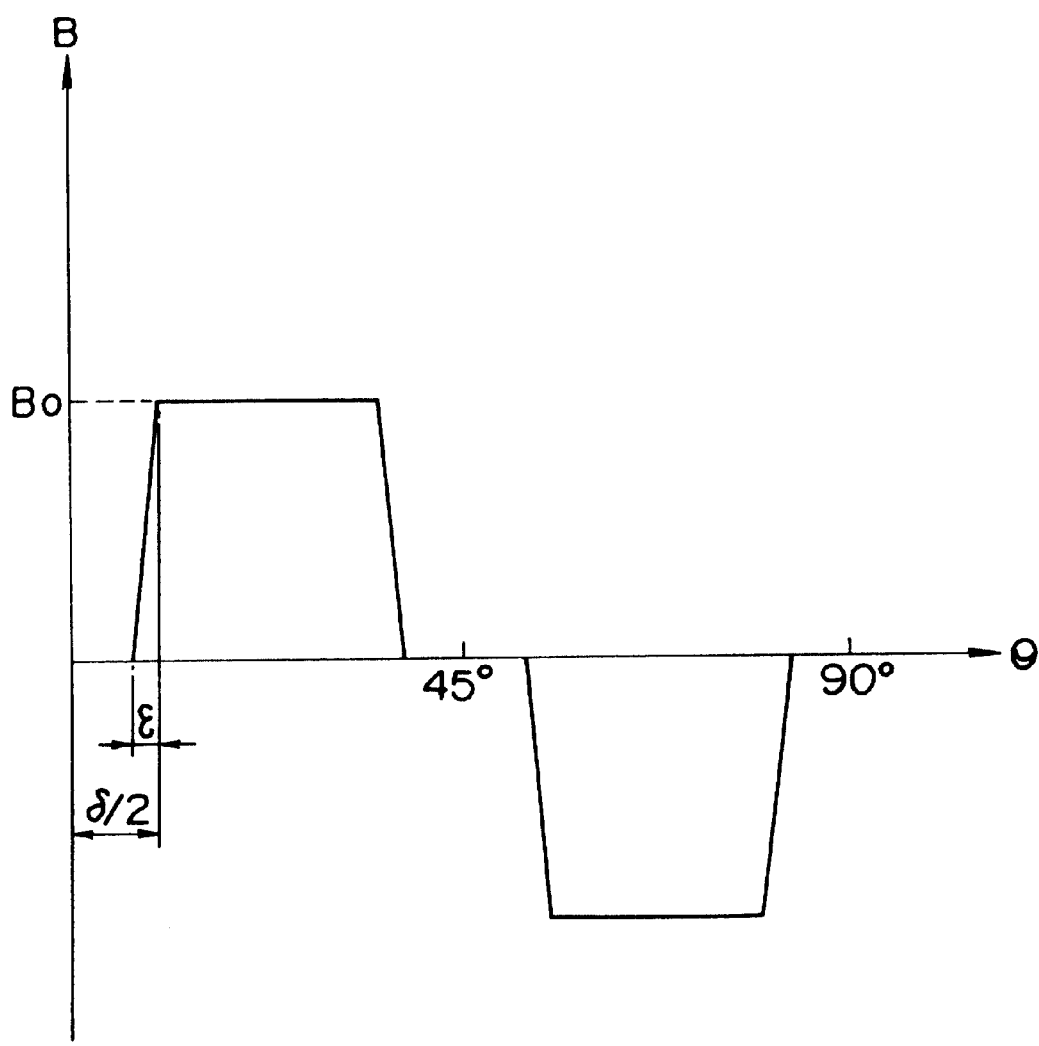
FIG. 14 is a graph showing the magnetic flux density dtstribution of the electromagnet C of FIG. 12.
Figure 15:
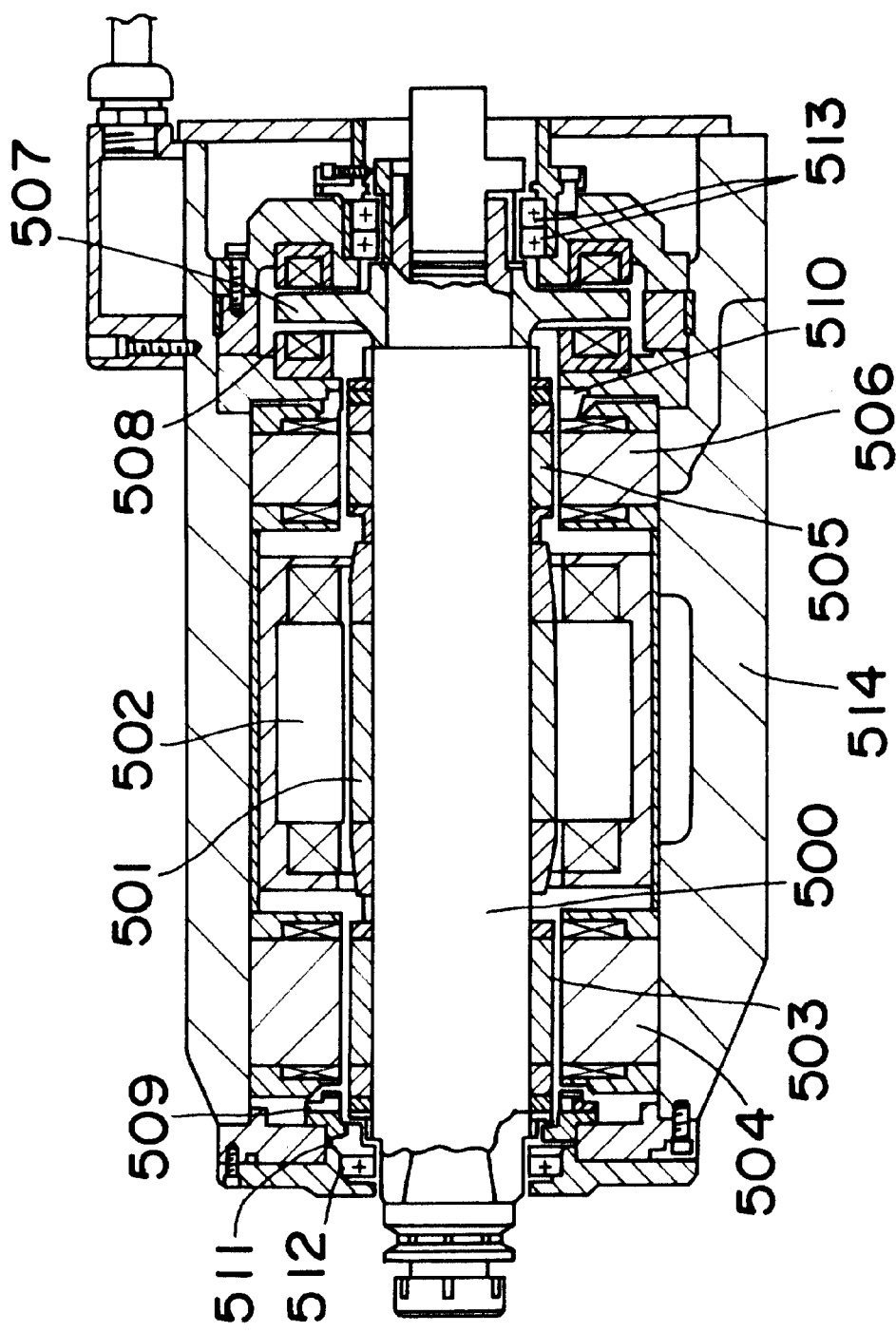
FIG. 15 is a front section view of a conventional magnetic bearing spindle.

The magnetic flux density of the conventional generic electromagnet C is shown in FIG. 14 in the case where the slot width δ=20 degrees. Also, in this case, an angle of inclination is provided within a range of 0<ε21 3 deg.

[2] Calculation results of eddy current loss

Figure 5:
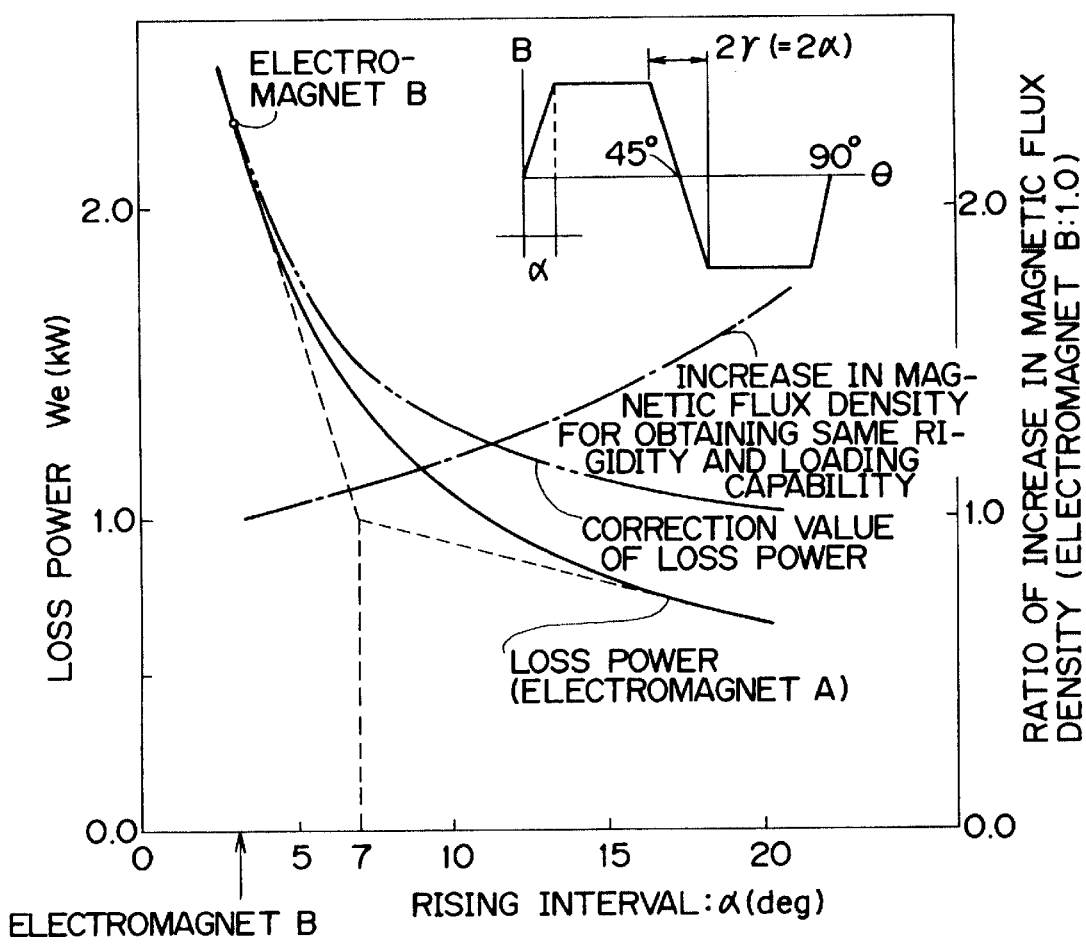
FIG. 5 is a graph showing a relation between the loss and the length of a rising interval according to the result of the eddy current loss analysis.

FIG. 5 shows the result of a relation between the eddy current loss and the length of the rising interval. As analysis conditions, for both the electromagnets A and B to be analyzed, the specific resistance value (ρ=5.6×10$^{-7}$Ωm) of the electromagnetic steel plate, and the depth s of the entry of magnetic flux in the rotor provided by the thickness (s=7 mm) of the electromagnetic steel plate rotor of the magnetic bearing are used. Further, an electromagnetic steel plate for high strength use (T=0.00035 m) intended for a high DN value is employed to withstand the centrifugal force although the loss is large.

Further, there are the conditions of a width b (0.05 m) of the magnetic bearing, the maximum value Bo (=2.12 T (Tesla)) of the magnetic flux density, a conductivity δ (=1/ρ), a radius r (=0.09/2m) of the main shaft, and the nuiaer of revolutions ω (=40000 rpm×2 ×π/60).

The analytic results of FIG. 5 are summarized as follows.

(1) in the case of the electromagnet B (FIG. 11) having neither the rising interval α nor the falling interval γ of the magnetic flux density curve, a rate of change (=∂B/∂θ) of the magnetic flux density is very large, and the loss $W_e$=2.26 kW.

(2) If the rising interval α (and γ) of the electromagnet A is increased and the rate of change in the magnetic flux density is reduced, then the loss power is significantly lowered. For example, if α is changed from three degrees (FIG. 5) to 10 degrees, then the loss $W_e$ reduces from 2.26 too 1.06 kW.

(3) Since the total magnetic flux reduces in this case, the maximum value of the magnetic flux density is required to be increased by 20 percent (from (I) to (II) in FIG. 4) as indicated by the one-dot chain line of FIG. 5.

If a correction value (two-dot chain line) of the loss is obtained by taking the above increase into account, then there is the result that $W_e$=1.28 kW. Therefore, it can be appreciated that if the rising interval α=10 deg is selected according to the application of the first embodiment of the present invention, then the eddy current loss can be reduced to a value slightly smaller than one half with the same loading capability and rigidity maintained.

With regard to the conventional generic electromagnet C (FIG. 13), the analytic results in the case where its magnetic flux density distribution (FIG. 14) is used is shown in Table 1 by comparison with the electromagnet A of the first embodiment of the present invention.

TABLE 1

| | Electromagnet A Maximum Value of Magnetic Flux Density: Bmax = $B_0$ | Electromagnet C | |
| --- | --- | --- | --- |
| | | (1) When Bmax = $B_0$ | (2) When Bmax = $1.4B_0$ |
| Loss Power(kW) | 1.28 | 1.73 | 2.42 |

The result (1) of the electromagnet C in Table 1 shows the case where the maximum value of its magnetic flux density distribution is made equal to that of the electromagnet A (Bmax=$B_0$). In order to evaluate the magnitude of the loss under the same conditions of rigidity and loading capability, the maximum value of the magnetic flux density of the electromagnet C that has a close resemblance to the rectangular wave is required to be increased as compared with the electromagnet A that has a close resemblance to the trapezoidal wave. The result (2) in Table 1 shows the corrected result. Summarizing the results of Table 1, it can be appreciated that the loss of the first embodiment (electromagnet A) of the present invention can be reduced to) one half of that of the conventional generic magnetic bearing (electromagnet C) on the precondition of obtaining the same rigidity and loading capability.

IV. Supplementary explanation of the first embodiment and other embodiments

Assuming that the number of revolutions and the main shaft diameter are the uncompromisable conditions among the alternatives of design of the radial magnetic bearing, there are incompatible issues in terms of strength and loss in selecting the electromagnetic steel plate and in terms of the loading capability, rigidity, and loss in selecting the bias current and the magnetic pole width, as described earlier.

The first embodiment of the present invention pays attention to the factor of the occurrence of the eddy current loss on the stator side of the stator, not on the rotor iron core side. The eddy current loss is attributed to the induction electromotive force generated as a consequence of variations in the direction and magnitude of the magnetic flux on the surface opposite to the magnetic poles of the rotor iron core. The current density of th.e eddy current attributed to this induction electromotive force is proportional to the amplitude of a variation in magnetic flux density. Therefore, the eddy current loss consumed by the rotor is proportional to the square of the current density, i.e., the square of the variation in magnetic flux density. In the conventional magnetic bearing, a sudden change in magnetic flux density is caused by the relative movement of the rotor and the stator, and the sudden change has been the biggest factor in the eddy current loss.

Explaining the eddy current loss by the fundamental equation (equation 11) for obtaining the eddy current loss, as the rate of change in magnetic flux density increases, a larger amount of higher harmonic components are included and the Fourier coefficient $a_n$ of high degree n is large. Therefore, the term of the higher harmonic components expressed by:

$a_n^2 n^2/\sqrt{n}$ is significant and can't be ignored.

According to the first embodiment of the present invention, the magnetic flux density varies with a gentle slope when one point of the rotor shifts from N to S or from S to N. That is, by providing the magnetic flux density distribution with a sufficiently long rising interval (approaching interval) and a sufficiently long falling interval (decelerating interval) like a cam curve, the occurrence of eddy current loss is suppressed so as to allow the substantial reduction in heat generation.

The provision of the magnetic flux dens.Lty distribution with the rising interval and the falling interval is not just for the effect of reducing the loss. The loading capability and rigidity of the magnetic bearing are determined by the total area of the magnetic flux density distribution. Therefore, the present embodiment in which the magnetic flux density distribution has a close resemblance to the trapezoidal wave is advantageous since the present embodiment can provide a large total area as compared with the conventional magnetic bearing or which the magnetic flux density distribution has a close resemblance to the rectangular wave.

(Second Embodiment)

Figure 6:
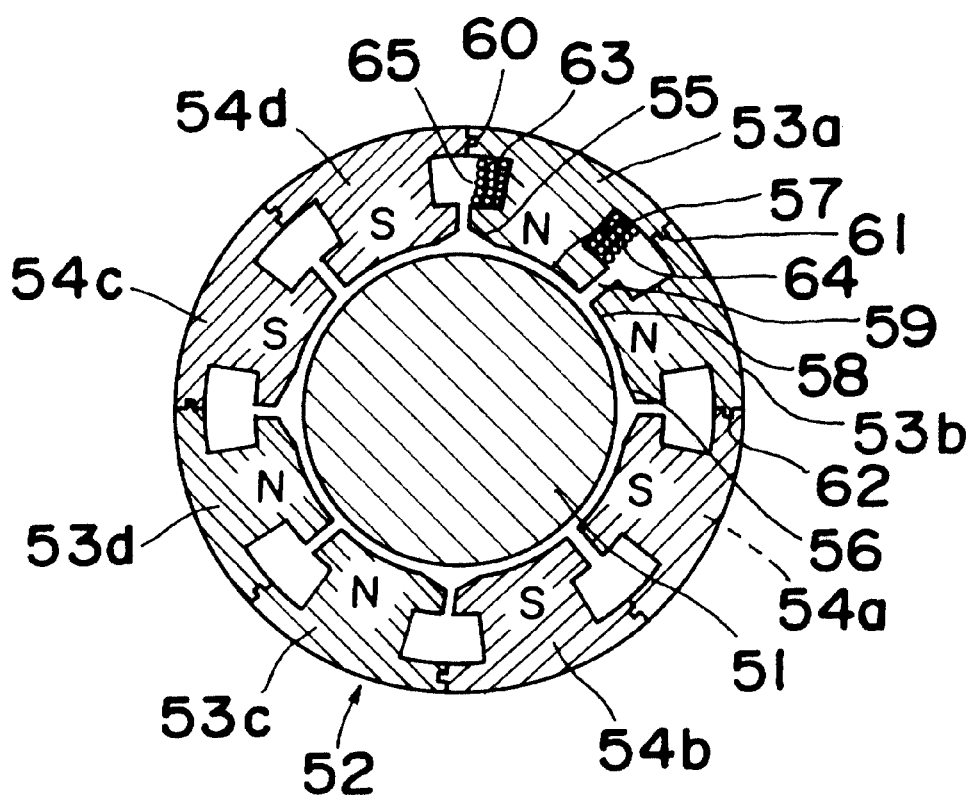
FIG. 6 is a view showing the principle of an electromagnet of a radial magnetic bearing according to a second embodiment of the present invention.
Figure 7:
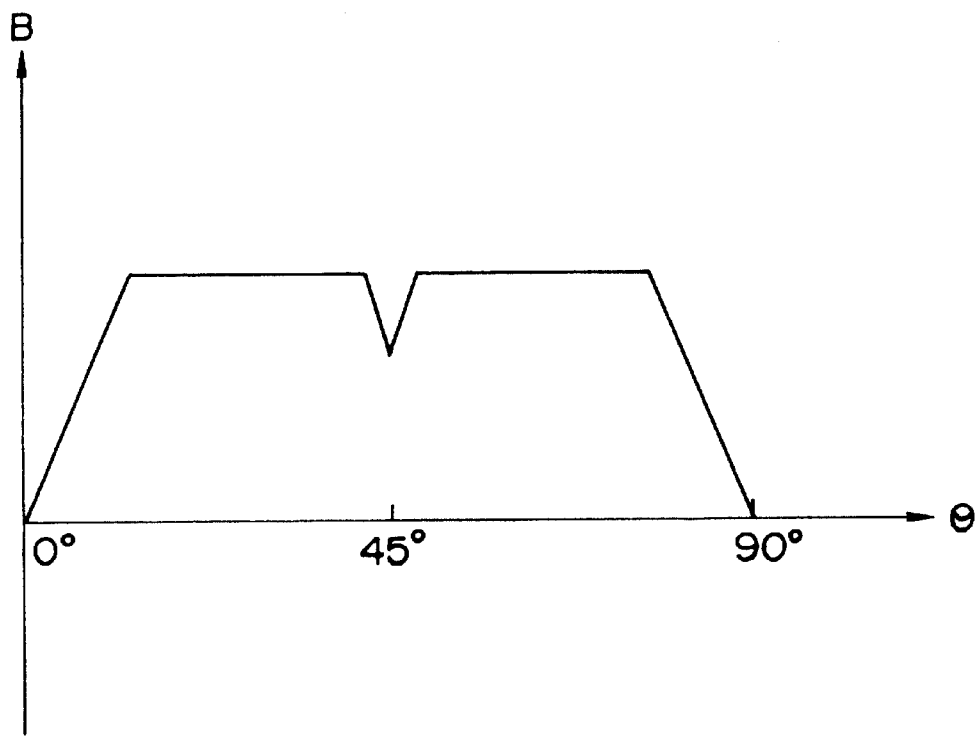
FIG. 7 is a graph showing the magnetic flux density distribution of the magnetic poles of the second embodiment of the present invention.

FIG. 6 shows a second embodiment of the present invention, which is obtained by applying the present invention to the NSSN type magnetic pole arrangement. FIG. 7 shows the magnetic flux density distribution of the magnetic poles of FIG. 6.

There are shown a rotor 51 and a stator section 52. This stator section 52 is the NSSN type constructed of eight independent magnetic poles. That is, the stator section is constructed of four north poles 53a through 53d and four south poles 54a through 54d, providing a construction in which a pair of adjacently arranged identical magnetic poles are alternately arranged in the circumferential direction. In this case, with regard to the two north poles 53a and 53b, there are shown inclined portions 55 and 56 formed at Lacth end portions of the inner surface of each of the magnetic pole 53a, 53b, perfect circle portions (coaxial portions) 57 and 58, a slot portion 59, connecting portions 60 through 62 for positioning and fastening the respective magnetic poles, and winding accommodating portions 63 and 64. In the embodiment, the end portions on the heteropolar side of the magnetic poles are connected to the coaxial portions 57 and 58 via the gently inclined portions 55 and 56, and the shape of the inner surfaces of the magnetic poles is made coaxial with the axial center of the rotor 51 on the homopolar side similar to the conventional case since there is a small variation in magnetic flux density on the homopolar side. The above arrangement, in which the total area of the magnetic flux density distribution can be increased as compared with the case of the NSNS type, is advantageous in terms of loss, rigidity, and loading capability, as appreciated through comparison of FIG. 7 with FIG. 4.

Figure 8:
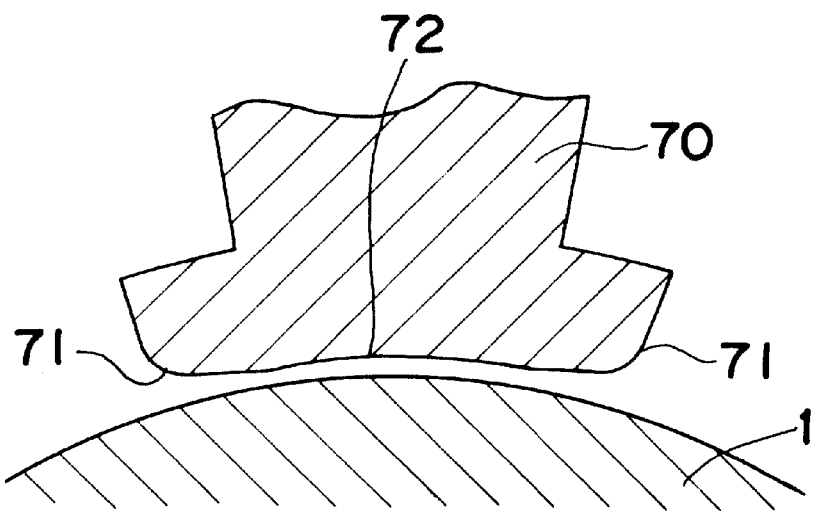
FIG. 8 is a view showing a magnetic pole having a curved surface shape according to an embodiment of the present invention.

In any one of the above embodiments, if the inclined surface to be formed on the magnetic pole inner surface is formed into a gently curved surface, then the higher harmonic components can be reduced, so that the further reduction of loss can be achieved. FIG. 8 shows an example in which a curved surface is formed on the magnetic pole inner surface of the aforementioned first embodiment. There are shown a magnetic pole 70, curved portions 71, and a perfect circle portion 72.

The aforementioned embodiments provide the magnetic flux density distribution with the rising and falling characteristics by forming the inclined surface on the magnetic pole inner surface and varying the gap (air gap) between the magnetic pole and the rotor in the circumferential direction.

(Third Embodiment)

Figure 9:
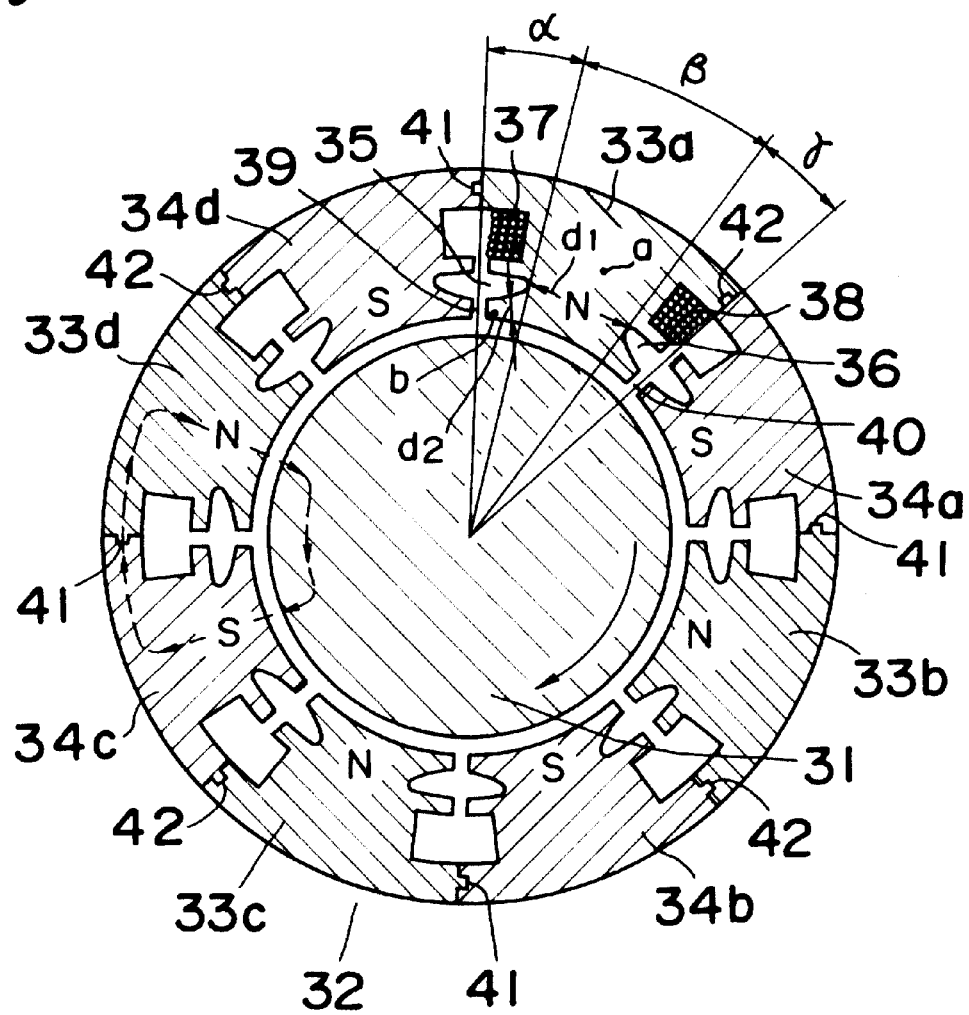
FIG. 9 is a view showing the principle of an electromagnet of a radial magnetic bearing according to a third embodiment of the present invention.

FIG. 9 shows a third embodiment of the present invention. The magnetic flux density distribution is provided with rising and falling characteristics having a long interval by forming a portion in which the width (area) is reduced through a magnetic path extending from the winding portion to the magnetic pole end portion in the magnetic circuit formed in the order of, for example, north pole→air gap→rotor→air gap→south pole. Therefore, according to the present third embodiment, the inner surface shape of the magnetic pole is coaxial with the rotor.

There are shown a rotor 31 and a stator section 32. This stator section 32 is the NSNS type structure constructed of eight independent magnetic poles. That is, the stator section is constructed of four north poles 33a through 33d and four south poles 34a through 34d, which are alternately arranged in the circumferential direction. In this case, with regard to one north pole 33a, there are formed narrow portions having a reduced width in the circumferential direction of the magnetic path, i.e., air gap portions 35 and 36 between the inner surface on the magnetic pole rotor side and the winding accommodating portions 37 and 38. There are shown slot portions 39 and 40, and connecting portions 41 through 42 for positioning and fastening the respective magnetic poles. In FIG. 9, the magnetic path is provided with a portion in which the magnetic path width is reduced from $d_1$ to $d_2$ in the interval of the angle a along the path that extends from a point "a" at which a winding is peripherally wound to an end portion "b" of the magnetic pole. In the interval of the angle β, the width $d_1$ of the magnetic path is effective for conducting the magnetic flux. According to the above shape of the magnetic pole, the magnetic flux density distribution formed between the magnetic pole inner surface and a rotor 31 does not become uniform in the circumferential direction, but is formed into a pseudo trapezoidal wave.

In applying the present invention, it is acceptable to provide the magnetic flux density distribution by devising the shape of the magnetic path other than the portion of the magnetic pole that faces the rotor, e.g., by forming the narrow portion (air gap portion) in the magnetic path as described in connection with the third embodiment. However, it is also acceptable to combine the above arrangement with the method of setting the air gap (in the first or second embodiment).

How large the magnitudes of the rising and falling intervals should be set will now be considered. Taking the first embodiment as an example, it can be found in the graph of FIG. 5 that the loss sharpiy reduces as the angle α is increased from the state in which α=0. The radial electromagnet is normally constructed of eight magnetic poles, and it is preferable to keep the thermal deformation of the spindle symmetrical about its axis by making the loss (i.e., the calorific value) of each of the magnetic uniform in order to ensure a high accuracy. Therefore, taking the variation in processing accuracy and the like of the magnetic pole shape into account, it is preferable to avoid this sharply varying portion and set an angle α so as not to be smaller than seven degrees which is the point of inflection of the curve. Assuming that the angle that one magnetic pole bears as a radial bearing is $\psi(=\alpha+\beta+\gamma)$ and generalizing the knowledge obtained from the result of the embodiment in the case of ψ=45 degrees, it is proper to set the rising and falling intervals (a portion in which an inclined surface is formed, for example) so that $\alpha/\psi > 0.15$.

If the pole division core method used for a motor is utilized for the stator of the magnetic bearing to which the present invention is applied, then magnetic poles of special shapes having a great face width, (i.e., a small slot width) and an inclined surface can be adopted. For example, even when the face width $B_1$ is set greater than the width $B_2$ of the winding portion in order to form the inclined surfaces 5 and 6 in sufficiently long intervals as shown in the enlarged view of FIG. 2, a winding process that has not been able to be performed in the conventional magnetic bearing electromagnet can be achieved by using the division method. Furthermore, each magnetic pole can be treated as a single unit. Therefore, a high-density winding can be provided fully in the space for accommodating the coil, also facilitating the laminating and assembling work. That is, by virtue of the permitted great face width of the electromagnet, the narrow portion (indicated by the reference numeral 35 in FIG. 9) for providing the inclined surface on the magnetic pole inner surface or the magnetic resistance with a distribution in the circumferential direction can be formed with sufficient margins in sufficiently long intervals. As a result, rising and falling intervals having sufficient lengths in the magnetic flux density can be provided, so that the substantial reduction of the loss can be achieved.

Figure 10:
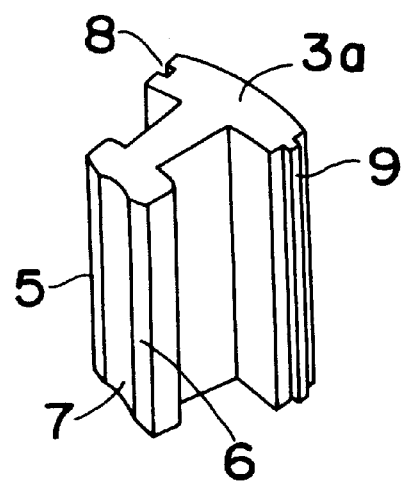
FIG. 10 is a perspective view of one magnetic pole in the casy where a pole division method is used.

FIG. 10 shows the shape of one magnetic pole in the case where the aforementioned processing method is used for the first embodiment (FIG. 1). By using the aforementioned processing method, a magnetic pole having an arbitrary shape can be adopted. Although the aforementioned division method is known in the field of the electric motor, there can be currently found no prior art to which the aforementioned processing method is applied to the magnetic bearing constructed of the magnetic poles having the specific shape intended for reducing the loss as proposed by the present embodiment. An example of the pole division method has the processes of dGividing the stator into a plurality of core pieces, laii.nating high-precision core pieces by the intrametal-mold laminate fixing method by for example, laser, providing the pieces with high-density winding, and thereafter highly accurately recombining them together by means of laser.

Although the above embodiment has been described taking the processing use spindle as an example, the present invention car. also be applied to a turbo molecular pump or the like.

By using the present invention, the heat generation due to the eddy current loss occurring at the rotor of the magnetic bearing can be substantially reduced with the simple construction not much changed from that of the conventional magnetic bearing. As a result, the temperature rise of the main shaft can be suppressed. Therefore, the reliability of the spindle constructed of a plurality of composite components can be improved and the axial expansion of the main shaft can be suppressed, so that a high runout accuracy can be ensured.

The present embodiment provides a very effective means for achieving a high DN value (main shaft diameter×number of revolutions) of the magnetic bearing spindle. The issues of the conventional magnetic bearing during high-speed rotation are solved. Therefore, the magnetic bearing can cope with the requirement for the high-speed cutting while further utilizing the fundamental capabilities (high speed and high rigidity) inherently possessed by the magnetic bearing spindle, providing a very great practical effect.

(Fourth and Fifth Embodiments)

The above embodiments and effects are described by utilizing an analysis solution introduced from the electromagnetic induction theory. Next, in fourth and fifth embodiments of the present invention, more strictly, the principle and effects thereof will be described by utilizing the results of dynamic magnetic field numerical analysis.

17

I. Outline of the fourth and fifth embodiments

[1] Magnetic flux density distribution during high-speed rotation

Reference is first made to the principle of a radial magnetic bearing electromagnet shown in FIG. 11, taken as a first comparative example. There are shown a rotor 81 and a stator section 82. This stator section 82 also has the NSNS type structure in which four north poles 83a through 83d and four south poles 84a through 84d are alternately arranged in the circumferential direction. There is also shown a perfect circle portion 85, where a gap $h_1$ between the rotor 81 and the magnetic pole is uniform. There are further shown winding accommodating portions 86 and 87, and slot portions 88 and 89 that are inter-heteropolar gaps.

Figure 21A:
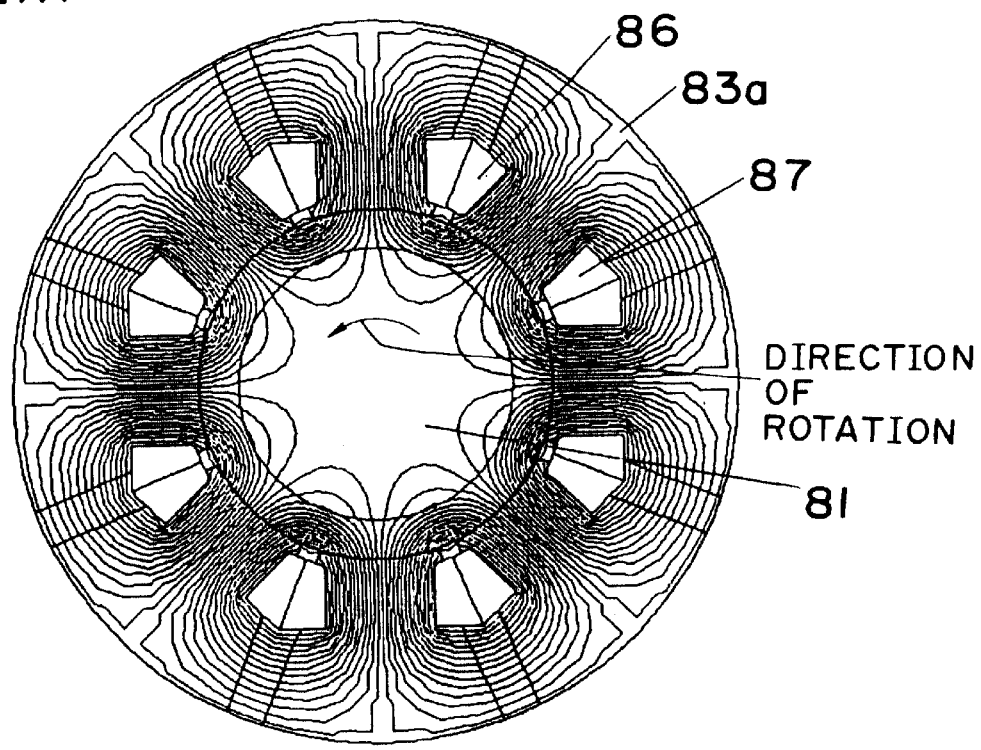
FIGS. 21A and 21B are a general view and an enlarged view showing magnetic flux contours of a magnetic bearing electromagnet in a case of the number in which revolutions N=0 rpm in a first comparative example.
Figure 21B:
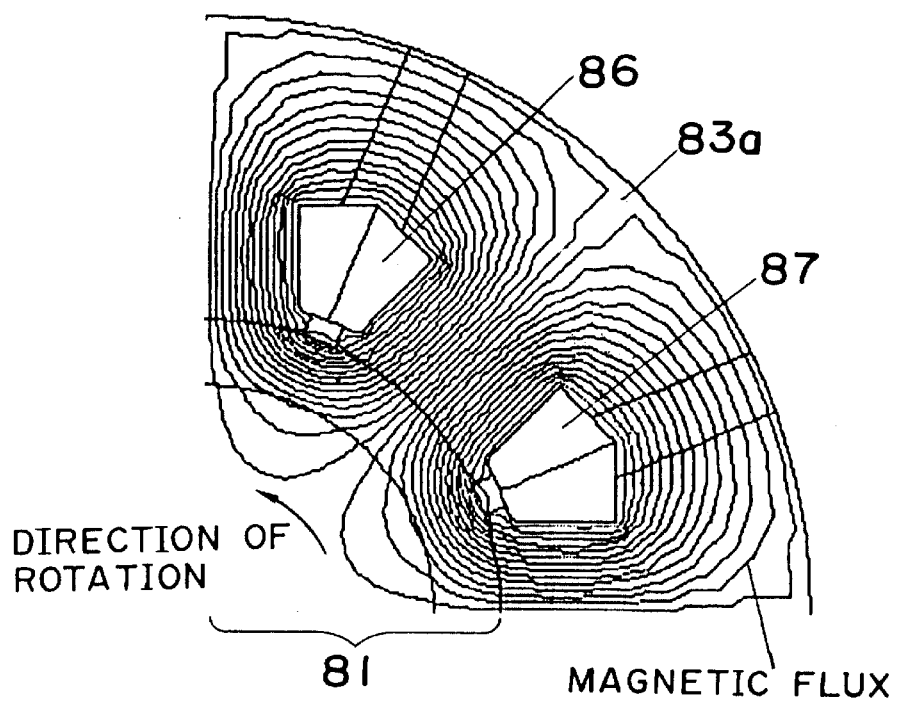
Figure 22A:
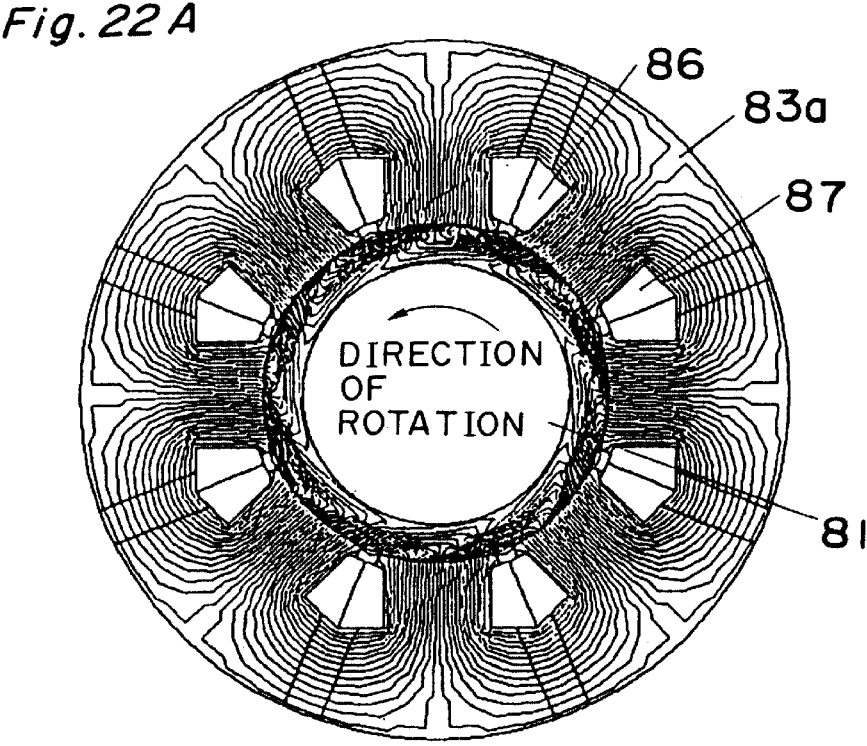
FIGS. 22A and 22B are a general view and an enlarged view showing magnetic flux contours of the magnetic bearing electromagnet in a case of the number in which revolutions N40,000 rpm in the first comparative example.
Figure 22B:
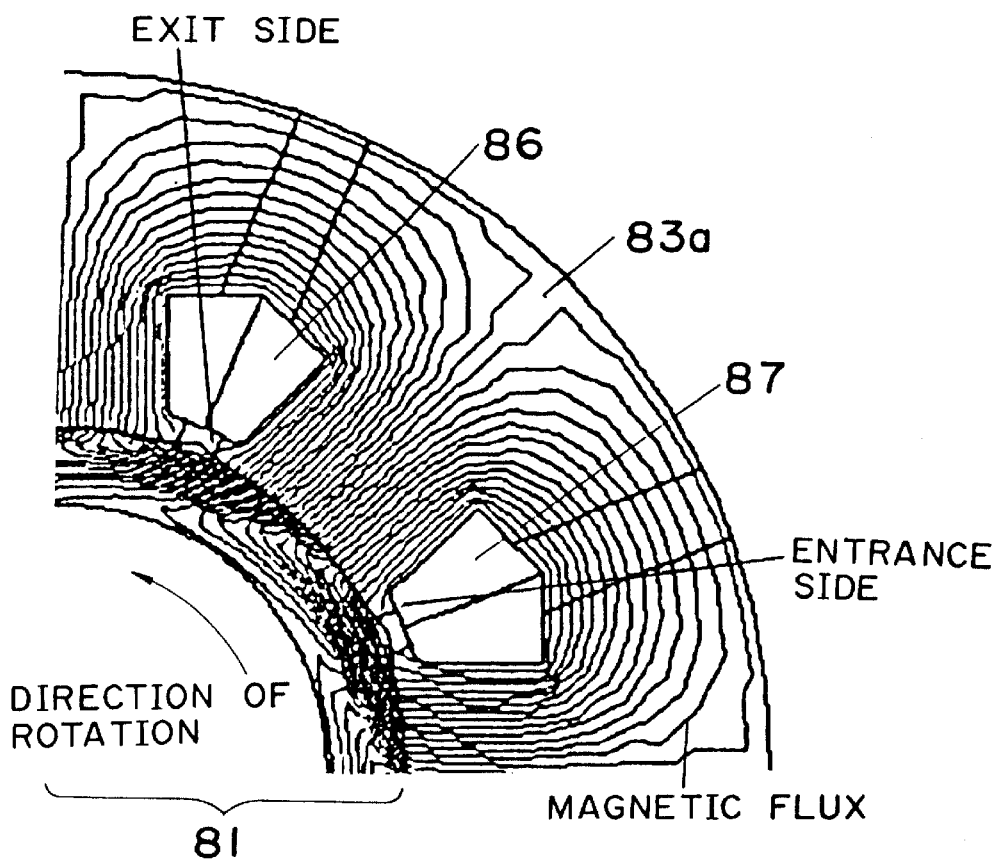
Figure 29:
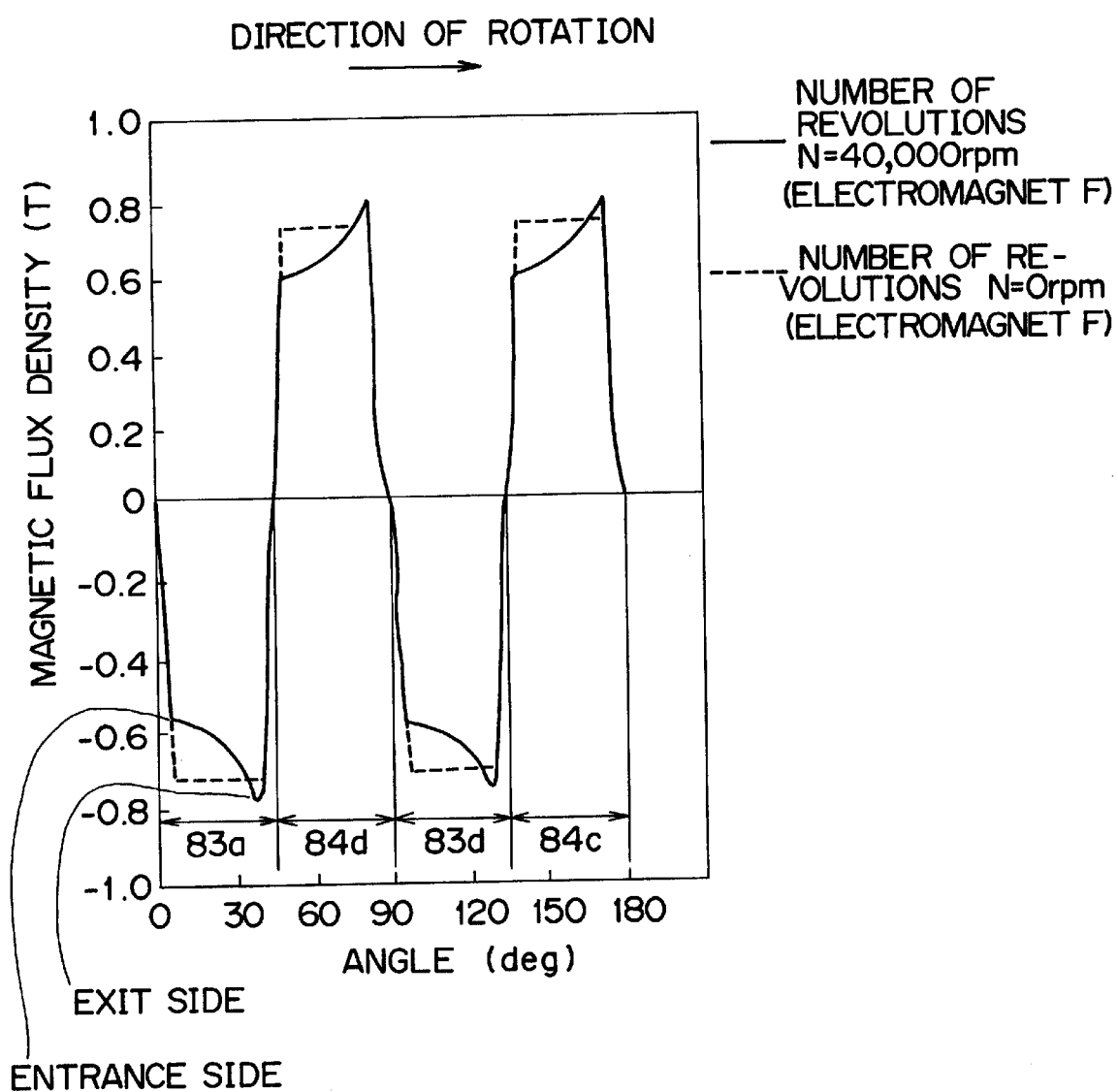
FIG. 29 is a graph showing the magnetic flux density distribution of the magnetic poles of an existing electromagnet (first comparative example)

FIG. 21A and FIG. 21B show the magnetic flux contours of the first comparative example when the number of revolutions N=0 rpm. When N=0 rpm, the magnetic flux density distribution is symmetrically arranged between the entrance side and the exit side. FIG. 22A and FIG. 22B show the magnetic flux contours of the electromagnet of the first comparative example when the number of revolutions N=40,000 rpm. According to FIG. 22B, the magnetic flux is deformed by the influence of a dimagnetic field due to the eddy current on the rotor as a consequence of the high-speed rotation at the velocity of 40,000 rpm. Thus, the magnetic flux density distribution is sparse on the entrance side of the magnetic pole in the vicinity of the magnetic pole end portion by which one point on the rotor passes first and is dense on the exit side of the magnetic pole on the opposite side. Further, FIG. 29 shows the magnetic flux density distributions in the gap between the electromagnet and the rotor when N0 rpm and when N=40,000 rpm. There is shown such a characteristic that the magnitude of the magnetic flux density increase from the entrance side toward is the exit side when N40,000 rpm. According to this magnetic flux density distribution, the eddy current loss is small in the portion where the magnetic flux density is sparse on the entrance side and the eddy current loss is great in the portion where the magnetic flux density is dense on the exit side during the high-speed rotation.

[2] Effects and issues of taper of the first embodiment

FIG. 1 shows the principle of the radial magnetic bearing electromagnet of the first embodiment.

The eddy current loss is attributed to the induction electromotive force generated due to a variation in the direction and magnitude of the magnetic flux in the surface of the rotor iron core opposite to the magnetic pole. The current density of the eddy current due to this induction electromotive force is proportional to the amplitude of the variation in magnetic flux density. Therefore, the eddy current loss consumed by the rotor 1 is proportional to the square of the current density, i.e., the square of the variation in magnetic flux density. Then, in the electromagnet of the first embodiment, by providing an electromagnet shape (with a taper) such that the maagi.etic flux density varies with a gentle slope when one point of the rotor shifts from N to S or from S to N, the generation of the eddy current loss is suppressed to substantially reduce the heat generation. However, since the total magnetic flux is reduced as compared with the first comparative example, it has been necessary to increase the maximum value of the magnetic flux density in order to generate the same attracting force as that of the first comparative example,, As a measure for increasing the maximum value of thes magnetic flux density, there is, for example, a method for increasing the electromagnet current. However, the loss consequently increases.

18

[3] Aimed point of view of the fourth and fifth embodiments of the present invention Therefore, the fourth and fifth embodiments of the present invention pay attention to the fact that the generation of the eddy current comes to have an asymmetrical arrangement between the entrance side and the exit side (sparse on the entrance side and dense on the exit side of the magnetic pole) due to the effect of the dynamic magnetic field. The fourth and fifth embodiments form the most appropriate shape for the eddy current loss and the attracting force by making the electromagnet shape asymmetrical about the magnetic pole center portion in the circumferential direction in order to form the electromagnet shape corresponding to the variation in magnetic flux density, thereby allowing the eddy current loss to be reduced without reducing the attracting force.

II. Comparison of the electromagnet shapes of the fourth and fifth embodiments with the comparative example and the first embodiment

Figure 18:
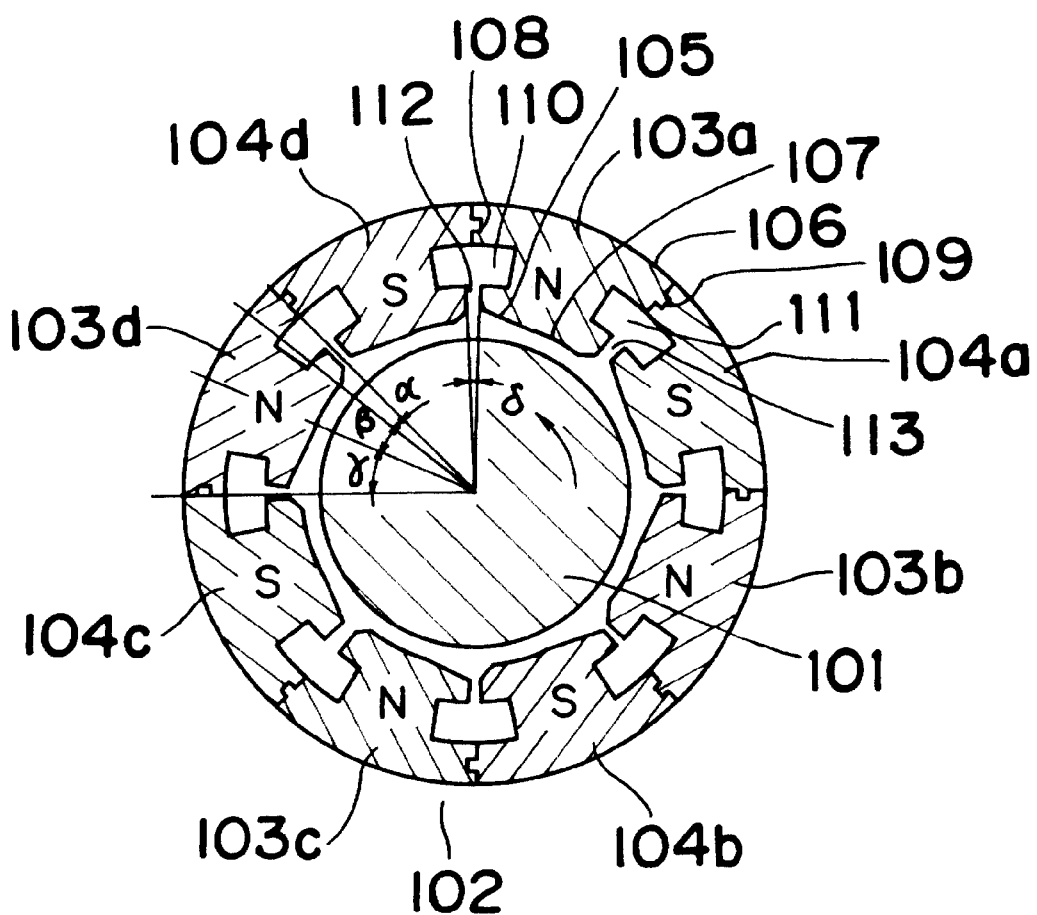
FIG. 18 is a view showing the principle of an electromagnet E of a radial magnetic bearing according to a fourth embodiment of the present invention.

[1] In the case of an electromagnet E of each of the fourth embodiment of the present invention FIG. 18 shows the principle of a radial magnetic bearing electromagnet (referred to as an electromagnet E) of the fourth embodiment of the present invention. There are shown a rotor 101 and a stator section 102. This stator section 102 adopts the NSNS type structure constructed of eight independent magnetic poles. That is, four north poles 103a through 103d and four south poles 104a through 104d are arranged alternately in the circumferential direction. In this case, with regard to one north pole 103a, there are shown inclined portions 105 and 106 formed at both end portions of the inner surface of the magnetic pole 103a, a perfect circle portion 107 arranged coaxially with the rotor 101, mutually engageable projecced and recessed connecting portions 108 and 109 for positioning and Ifastening the respective magnetic poles, winding accommodating portions 110 and 111, and slot portions 112 and 113 that are inter-heteropolar gaps. It is to be noted that the portions 105 through 111 are similarly provided for the other magnetic poles.

Figure 19:
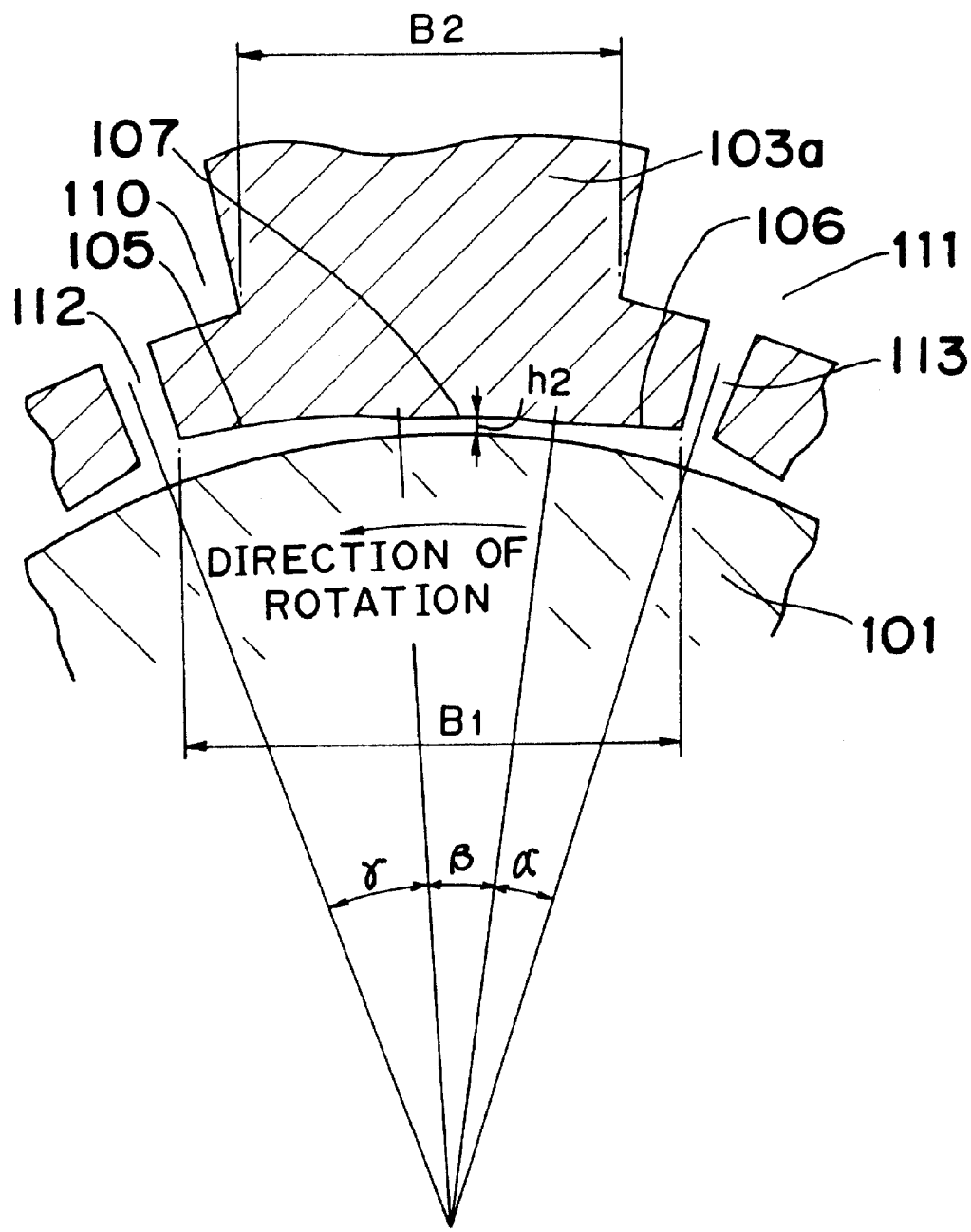
FIG. 19 is an enlarges view of the electromagnet E of the radial magnetic bearing of the fourth embodiment of the present invention.

FIG. 19 shows an enlarged view of part of the magnetic pole 103a of the fourth embodiment of the present invention. In the fourth embodiment, the slot width δ of the inter-heteropolar gap is set to a sufficiently small value of δ=12 degrees. In this case, it is assumed that the interval of the angle a is referred to as a rising interval (approaching interval) of a magnetic flux density curve and the interval of the angle y is referred to as a falling interval (decelerating interval) thereof. In the interval of the angle β in the center portion (perfect circle portion 107), the inner surface of the magnetic pole is formed coaxially with the rotor 101, and a gap (air gap) $h_2$ between the rotor 101 and the magnetic pole is uniform. In the fourth embodiment of the present invention, the electromagnet shape is made asymmetrical about the magnetic pole center portion in the circumferential direction with the setting of α<γ, and the gap (air gap) between the rotor 101 and the magnetic pole in the interval 107 of the angle β in the center portion is made small. That is, the above shape is such that the gap (air gap) between the rotor 101 and the magnetic pole in the interval 107 of the angle β in the center portion is made smaller than that of the first comparative example and the falling interval of the magnetic flux density on the exit side is further made longer than that of the first comparative example on the basis of the magnetic flux density distribution obtained through the dynamic magnetic field analysis. Specifically, the electromagnet is formed with the setting that α=16 degrees and the setting that γ=25 degrees. Further, a relation between the gap (air gap) $h_2$ between the rotor 101 and the magnetic pole in the interval of the angle D in the center portion and the air gap $h_1$ of the first comparative example is set so that $h_1 > h_2$.

[2] In the case of an electromagnet F of the first comparative example

FIG. 11 shows the principle of a radial magnetic bearing electromagnet F in the case where both edge portions of the magnetic pole inner surface are provided with no inclined portion (taper portion). The slot width γ of the inter-heteropolar gap is set so that γ=12 degrees.

[3] In the case of the electromagnet A of the first embodiment

FIG. 2 shows the enlarged view of the magnetic pole 3a in the diagram of the principle of the first embodiment of FIG. 1. The electromagnet of the first embodiment is called the electromagnet A. The end portions and the coaxial portion 7 of the magnetic pole are connected via gently inclined surfaces, tlereby forming the inclined portions 5 and 6 in the intervals α=γ=16 degrees. In the interval 7 of the angle β in the center portion, the magnetic pole inner surface is formed coaxially with the rotor 1, and the gap (air gap) $h_1$ between the rotor 1 and the magnetic pole is uniform. The slot width γ of the inter-heteropolar gap of the first embodiment is set so that γ=12 degrees similar to that of the first comparative example.

It should be theoretically provided that B=0 in the interval of the slot width γ, however, (1) the slot width γ is made sufficiently small. (2) In the actual electromagnet, the waveform of the magnetic field somewhat looses its edges due to the influence of leakage magnetic: flux, the chamfering process of the rotor inner surface edge portions of the electromagnet, and other factors. For the aforementioned reasons (1) and (2), an angle of inclination is provided in the magnetic field distribution fully in the rising interval cc and the falling interval γ. Further, α=γ in the first embodiment. Also, in the case of the first comparative example, a slight angle of inclination is provided in the interval of the slot width γ for the aforementioned reasons (1) and (2).

III. Dynamic magnetic field analysis

The dynamic magnetic field analysis for obtaining the magnetic flux density and the attracting force is performed on the fourth embodiment of the present invention using the aforementioned analysis model. The electromagnet shape effective for the reduction of eddy current loss is obtained by comparison with the first comparative example and the first embodiment.

[1] Analytic conditions

Figure 20:
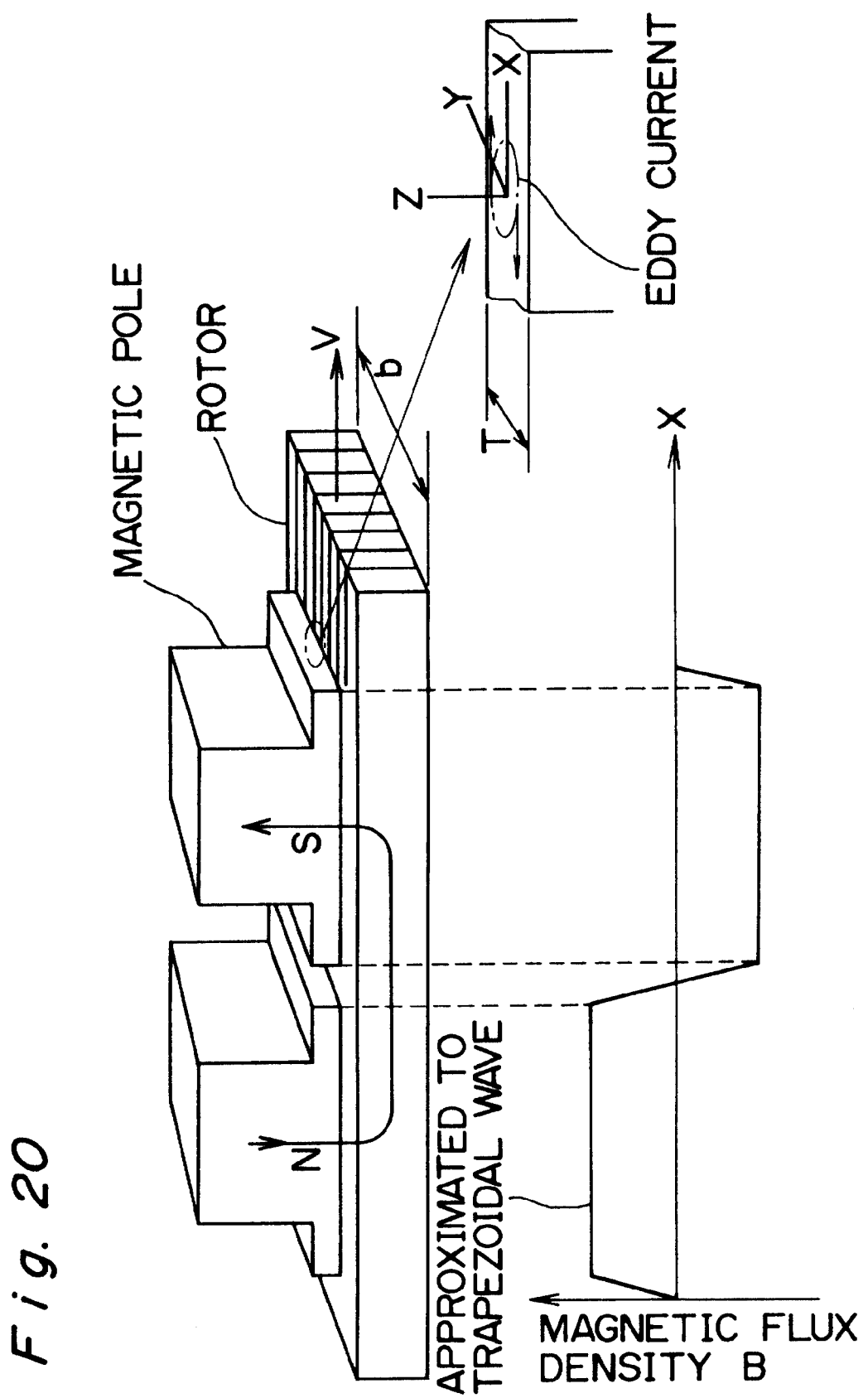
FIG. 20 is a view of a model for an eddy current loss analysks.

As analytic conditions, with regard to the electromagnets E, F, and A to be analyzed, there are the specific resistance value ($\rho = 5.6 \times 10^{-1} \Omega m$) of the electromagnetic steel plate and the depth s of the entry of magnetic flux in the rotor provided by the thickness (s=7 mm) of the electromagnetic steel plate rotor of the magnetic bearing. There are further conditions of an electromagnetic: steel plate thickness T (=0.0001 m), a width b of the magnetic bearing (=0.05 m), conductivity γ (=1/ρ), a radius r of the main shaft (=0.09/2 m), and the number of revolutiors ω (=40000 rpm×2×π/60). FIG. 20 shows the state of the occurrence of an eddy current in the vicinity of the magnetic pole in the form of a model.

The analytic results as described below are obtained by calculating the magnetic flux density and the attracting force through dynamic magnetic field analysis when the rotor is rotated in steps of a minute angle for one turn (360 degrees) on the aforementioned analytic conditions.

[2] Comparison of magrnetic flux density

Figure 23:
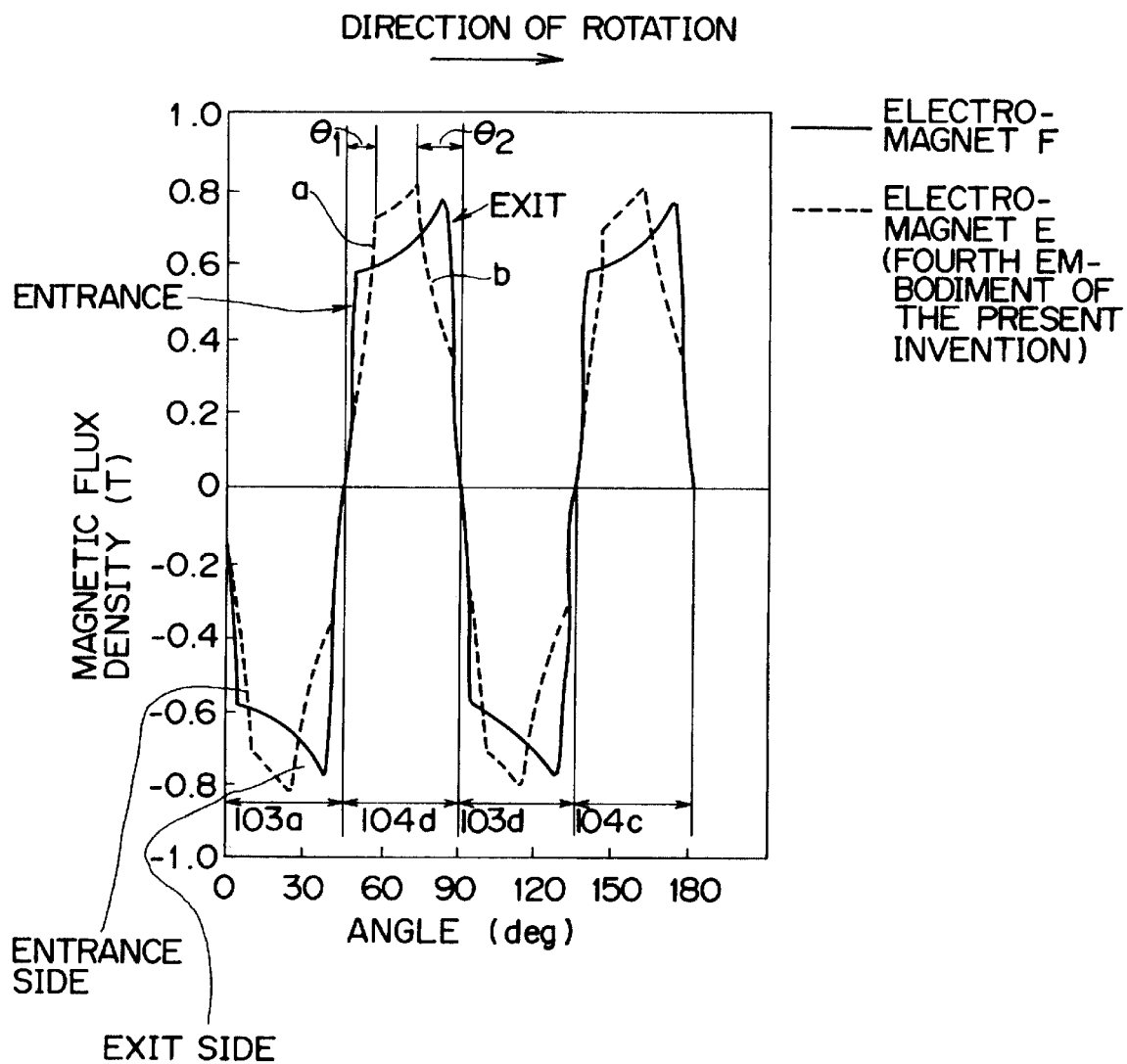
FIG. 23 is a graph showing the magnetic flux density distribution of the magnetic poles of the fourth embodiment of the present invention.
Figure 31:
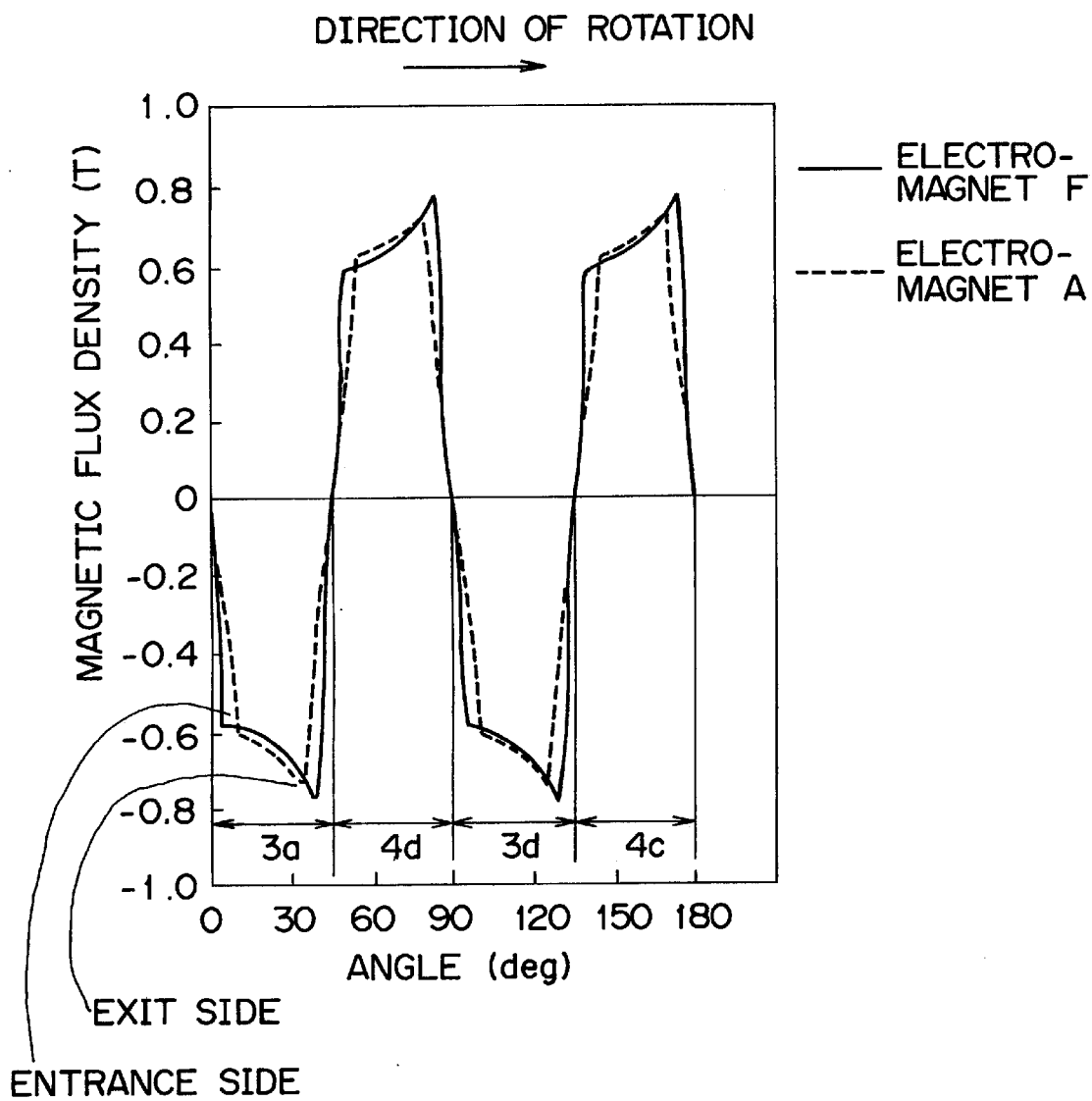
FIG. 31 is a graph showing the magnetic flux density distribution of the magnetic poles of the first embodiment.

FIG. 23 and FIG. 31 show the magnetic flux densities of the fourth embodii.nt of the present invention obtained through the dynamic mnagnetic field analysis by comparison with the electromagnet B of the first comparative example. The horizontal axis represents the angle from the slot center portion of the electromagnet, and the magnetic flux density within the angle of 180 degrees (corresponding to four poles of NSNS) is shown. Qualitatively speaking, the eddy current loss is smaller as the variation ($=\partial B/\partial \theta$) of the magnetic flux density is smaller as described earlier, and the loading capability is greater as the total area of the magnetic flux density B is greater. Therefore, the key factor is that each of the entrance and the exit of the magnetic flux density is made to have a gentle slope, and a greater total area is provided for the achievement of a magnetic bearing having small loss and high load capability. That is, according to FIG. 23, a gentle slope "a" can be given to the magnetic flux density B even though the rising is interval $\theta_1$ is made small since the magnetic flux density B has a small absolute value in the entrance portion. A sufficiently gentle slope "b" is given to the exert portion by providing a sufficiently great interval $\theta_2$ since the magnetic flux density B has a great absolute value in the exit portion. As a result, sufficiently gentle slopes can be given to both the entrance and the exit even though the magnitude of the magnetic flux density B is totally increased for the increase of the loading capability. Therefore, the analytic results of FIG. 23 and FIG. 31 can be summarized as follows.

(1) In FIG. 23 where the magnetic flux densities of the electromagnet E and the electromagnet F are compared with each other, the gap between the stator and the rotor of the flat portion 7 (interval β) of the electromagnet E is made smaller than that of the electromagnet F. Despite the fact that the magnetic flux density of the flat portion 7 is increased, both the rising and the falling intervals of the electromagnet E have gentle slope portions. As a result, the electromagnet E of the fourth embodiment of the present invention has a small eddy current loss despite the fact that the electromagnet E has a great load capability.

(2) In FIG. 31 where the magnetic flux densities of the electromagnet F and the electromagnet A are compared with each other, the magnetic flux density varies with a gentle slope when the electromagnet A shifts from N to S or front S to N. However, the loading capability of the is electromagnet F is reduced by a degree corresponding to a difference between the areas of the magnetic flux densities B of the electromagnet F and the electromagnet A.

[3] Comparison of attracting force

Figure 24:
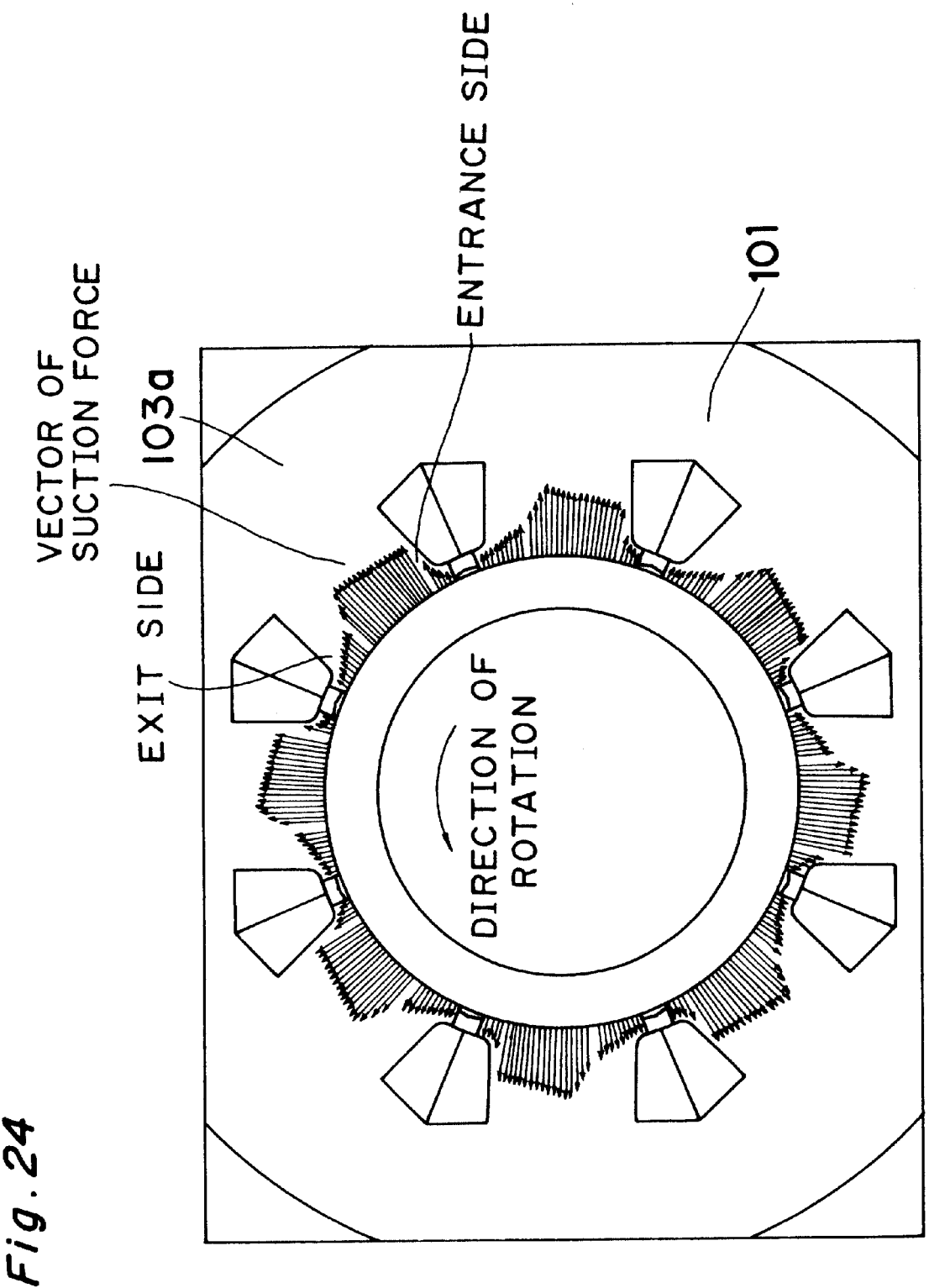
FIG. 24 is a view showing attracting forces of the electromagnet of the fourth embodiment of the present invention.
Figure 30:
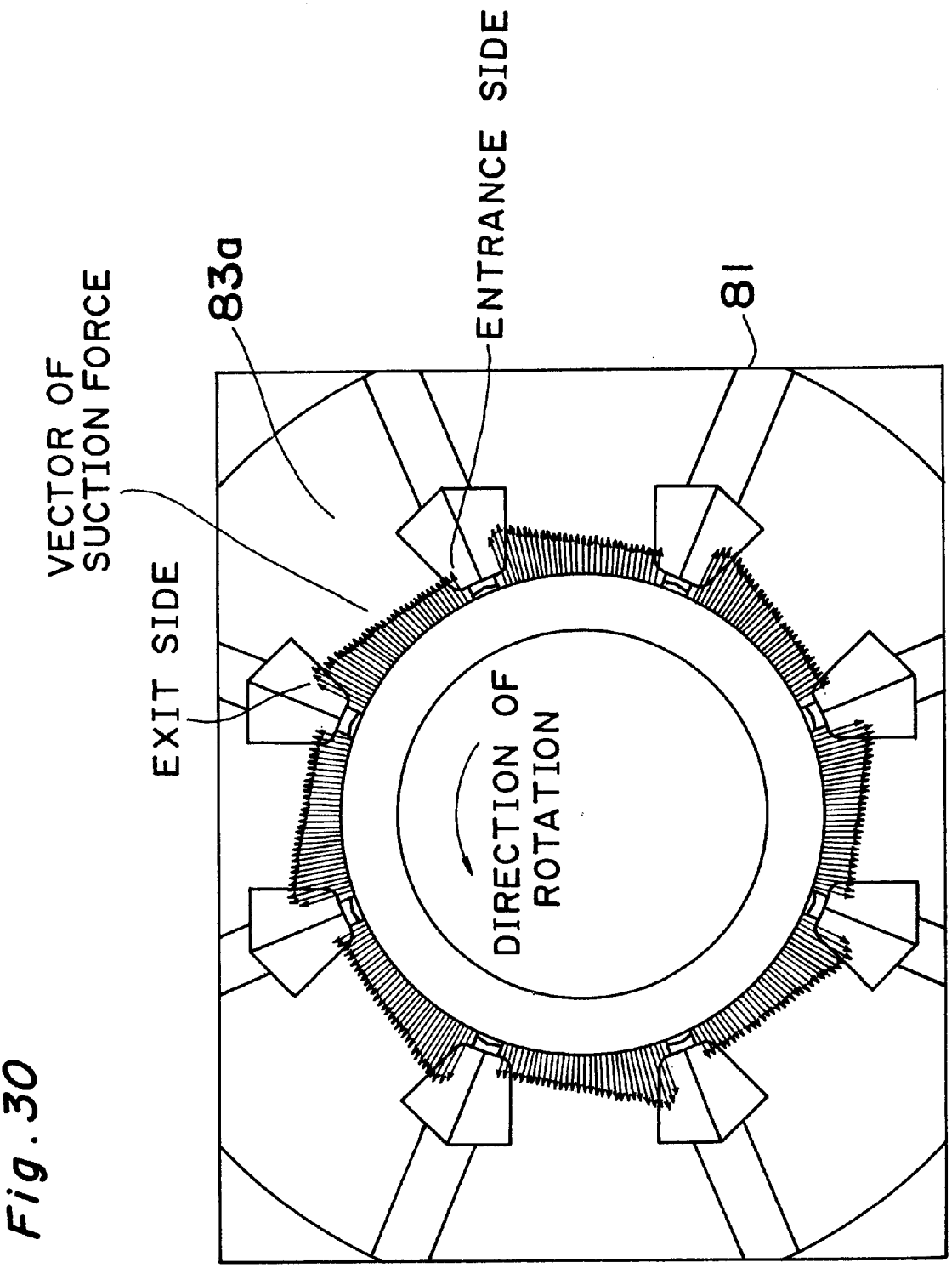
FIG. 30 is a view showing attracting forces of the electromagnet of the first comparative example.
Figure 32:
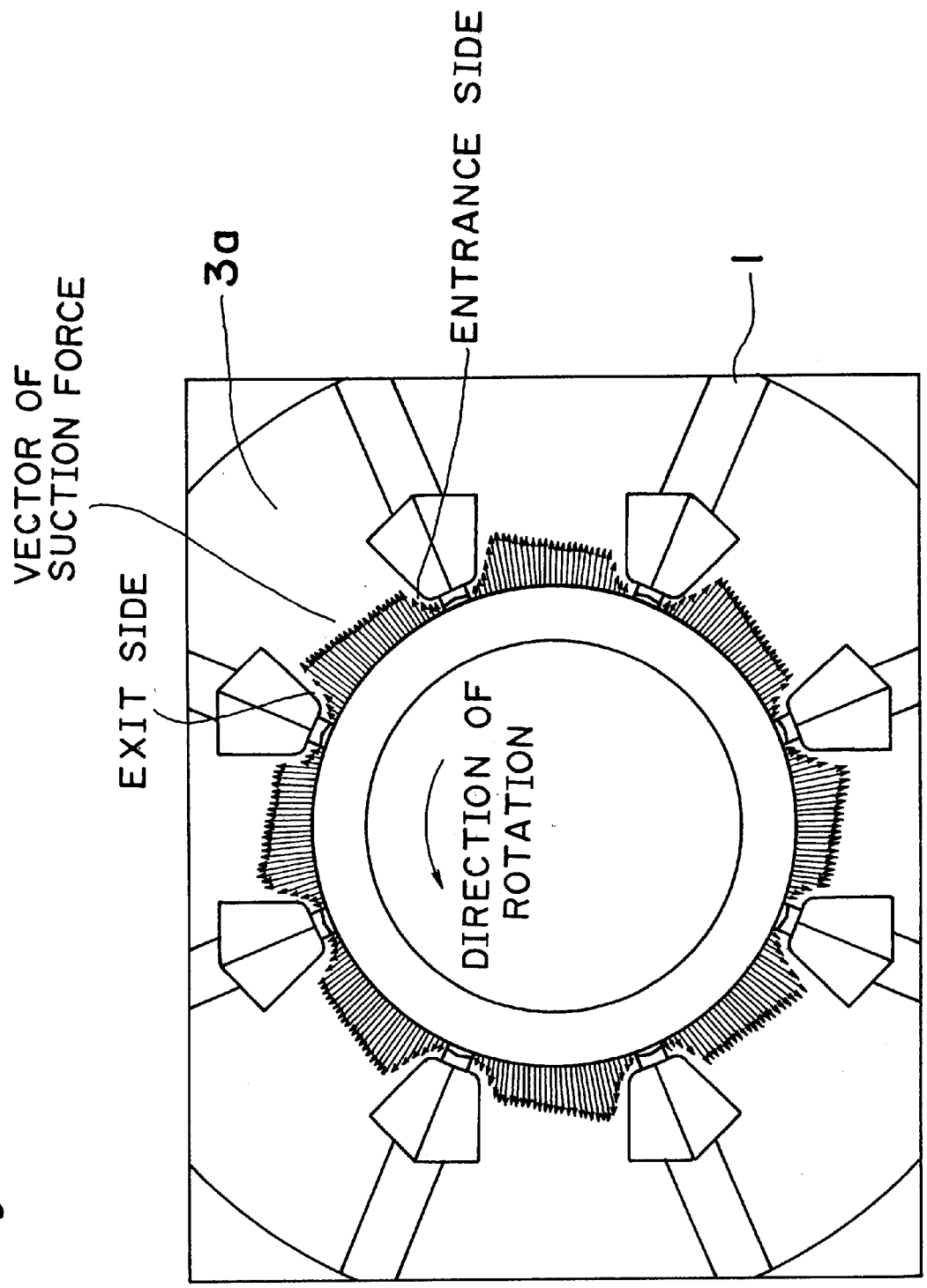
FIG. 32 is a view showing attracting forces of the electromagnet of the first embodiment.

FIG. 24, FIG. 30, and FIG. 32 show the attracting forces obtained through the dynamic magnetic field analysis. The magnitudes of the vectors in the figures represent the magnitudes of the attracting forces. The analytic results of FIG. 24, FIG. 30, and FIG. 32 can be summarized as follows.

FIG. 24 shows the attracting forces of the electromagnet E. The electromagnet E has a wide region of the gentle slope portion with regard to the distribution of the attracting forces since a wide falling interval 105 is provided. Since the gap between the electromagnet and the rotor 101 in the flat portion 107 (interval β) is made smaller than that of the electromagnet E, the attracting force in the flat portion 107 (interval β) has a great absolute value. Thus, this attraction compensates for the reduction in attracting force in the falling interval 105. FIG. 32 shows the attracting forces of the electromagnet A. As compared with the electromagnet F (FIG. 30) that has no inclined surface, the attracting force distribution has a gentle slope during the shift from N to S or from S to N. However, the absolute value of the attracting force is smaller than that of the electromagnet E.

[4] Effects of the reduction of eddy current loss

Paying attention to the fact that the magnetic flux density distribution during the high-speed rotation has an asymmetrical arrangement between the entrance side and the exit side, the fourth embodiment of the present invention suppresses the occurrence of eddy current loss by making the magnetic flux density shape have a gentle slope on the exit side (falling interval) of the magnetic pole where the magnetic flux density becomes dense. The fourth embodiment also reduces the gap between the electromagnet and the rotor in average by making the magnetic flux density shape have an inclination in a short interval on the entrance side of the magnetic pole where the magnetic flux density becomes sparse and the eddy current loss becomes small, thereby increasing the attracting forces. As a method for providing the magnetic flux density with a distribution that is inclined in the circumferential direction of the magnetic pole, it is also acceptable to adopt a magnetic pole shape such that the magnetic resistance is increased in the vicinity of the entrance and the vicinity of the exit in a magnetic circuit that extends from the magnetic pole to the rotor instead of varying the gap between the rotor and the stator (electromagnet) in the circumferential direction. Even in this case, the shape on the entrance side and the shape on the exit side become asymmetrical to each other. Thus, as described in connection with the fourth embodiment, by making the electromagnet taper shape asymmetrical about the magnetic pole center portion in the circumferential direction while taking advantage of the effect of the dynamic magnetic field during high-speed rotation, an appropriate electromagnet shape that compensates for the reduction in attracting force and reduces the eddy current loss can be formed. As a result a magnetic bearing can be provided in which the heat generation is substantially reduced without reducing the attracting forces. The Table 2 below shows the eddy current loss under the influence of the same attracting force in terms of its ratio to the eddy current loss of the first comparative example assumed to be 1.0, as the effect of the fourth embodiment of the present invention.

TABLE 2

Effect of Fourth Embodiment of Invention

|  | Example of Fourth Embodiment of Invention | First Comparative Example | Example of First Embodiment of Invention |
|---|---|---|---|
| Eddy Current Loss under Influence of Same Attracting Force | 0.4 | 1.0 | 0.6 |

IV. Other embodiments of the present invention

Figure 25:
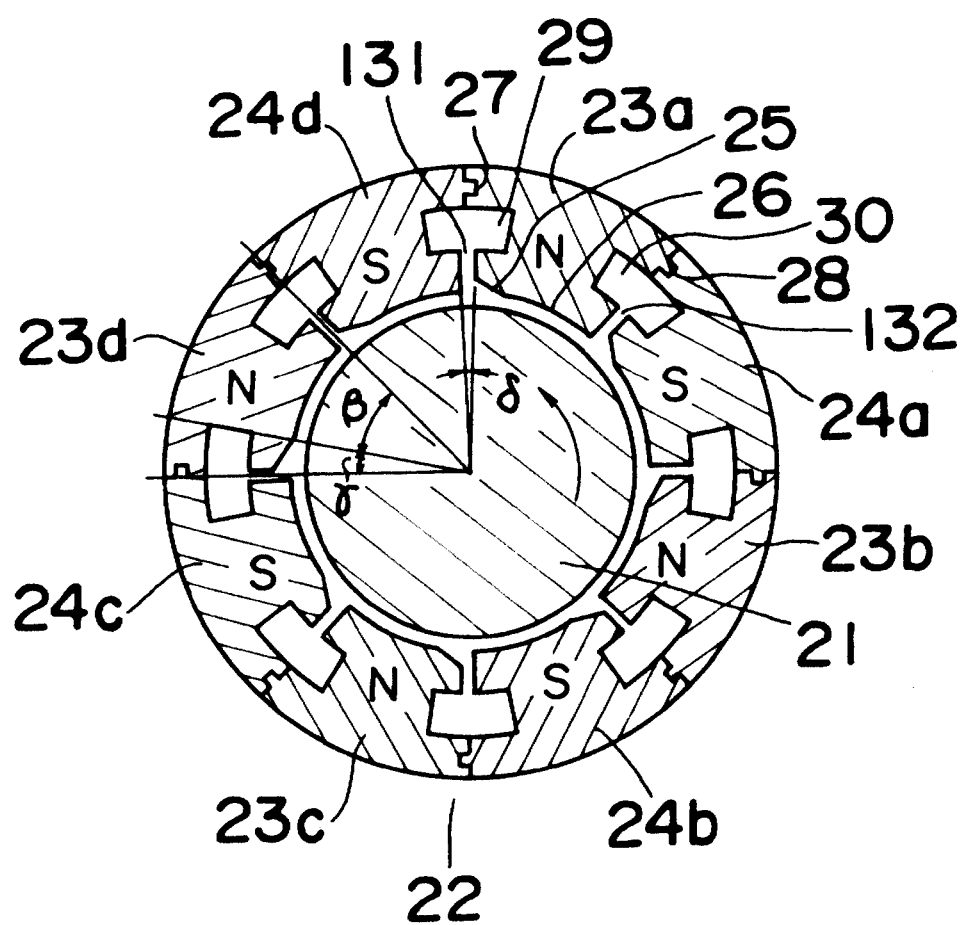
FIG. 25 is a view showing the principle of ar electromagnet G of a radial magnetic bearing according to a, fifth embodiment of the present invention.

[1] In the case of an electromagnet G of the fifth embodiment of the present invention FIG. 25 shows the principle of the radial magnetic bearing electromagnet (referred to as an electromagnet G) according to the fifth embodiment of the present invention. There are shown a rotor 21 and a stator section 22. This stator section 22 has the NSNS type structure constructed of eight independent magnetic poles. That is, four north poles 23a through 23d and four south poles 24a through 24d are arranged alternately in the circumferential direction. In this case, with regard to one north pole 23a, there are shown an inclined portion 25 fcrrmed at both end portions of the inner surface of the magnetic pole 23a, a perfect circle portion 26 arranged coaxially with the rotor 21, mutually engageable projected and recessed connecting portions 27 and 28 for positioning and fastening the respective magnetic poles, winding accommodating portions 29 and 30, and slot portions 131 and 132 that are inter-heteropolar gaps. It is to be noted that these portions 25 through 30 are similarly provided for the other magnetic poles.

Figure 26:
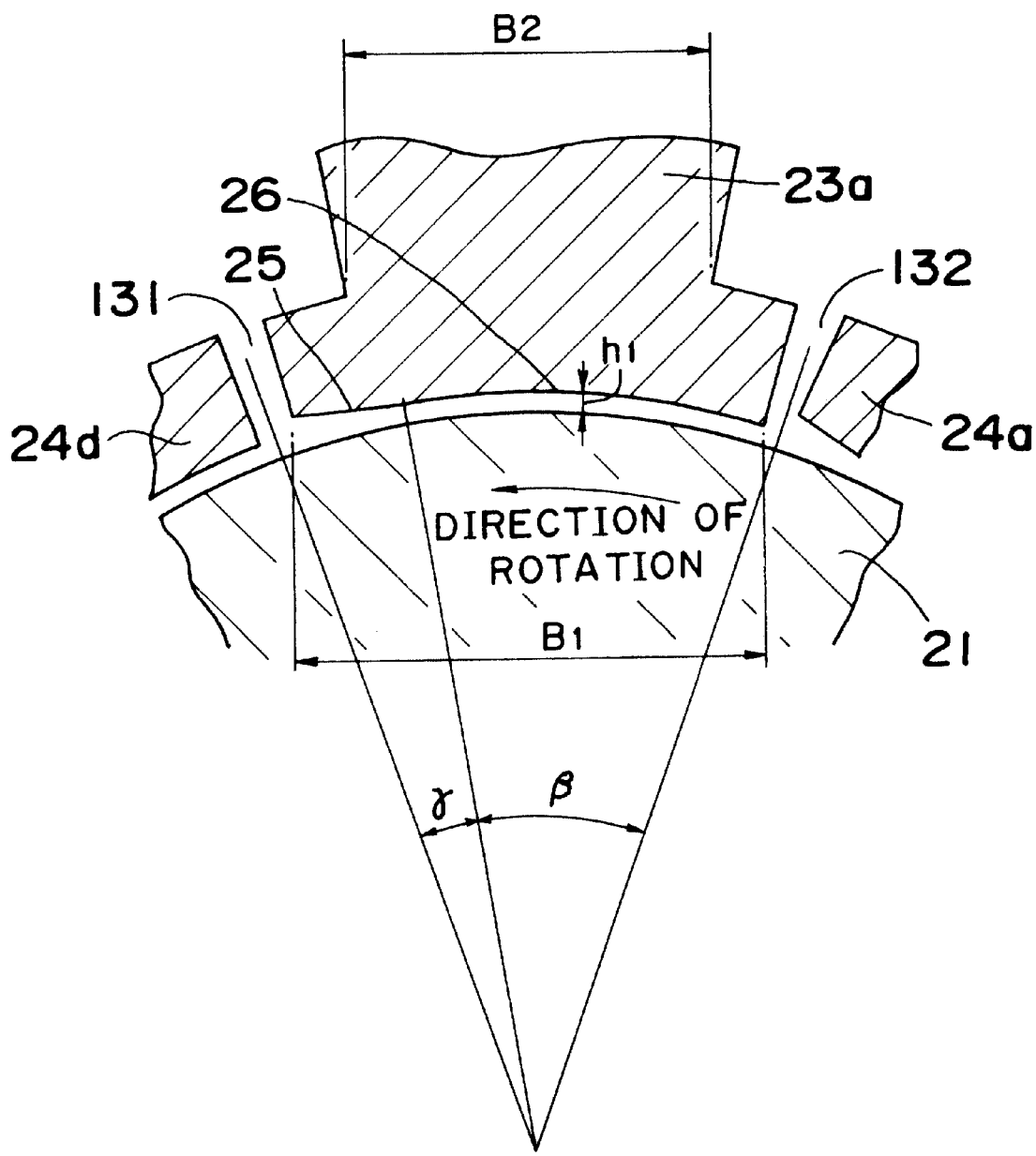
FIG. 26 is an enlarged view of the electromagnet G of the radial magnetic bearing of the fifth embodiment of the present invention.

FIG. 26 shows an enlarged view of pert of the magnetic pole 23a. In the fifth embodiment, the slot width $\gamma$ of the inter-heteropolar gap is set to a sufficiently small value of $\gamma=12$ degrees. In this case, the interval of the angle $\gamma$ is referred to as a falling interval (decelerating interval). As shown in FIG. 26, by forming the inclined portion in the falling interval $\gamma$ of the magnetic flux density curve, the electromagnet shape is made asymmetrical about the magnetic pole center portion in the circumferential direction. In the interval 26 of the angle $\beta$ in the center portion, the magnetic pole inner surface is formed coaxially with the rotor 21, and the gap (air gap) $h_1$ between the rotor 21 and the magnetic pole is uniform.

[2] Comparison of magnetic flux density through dynamic magnetic field analysis

Figure 27:
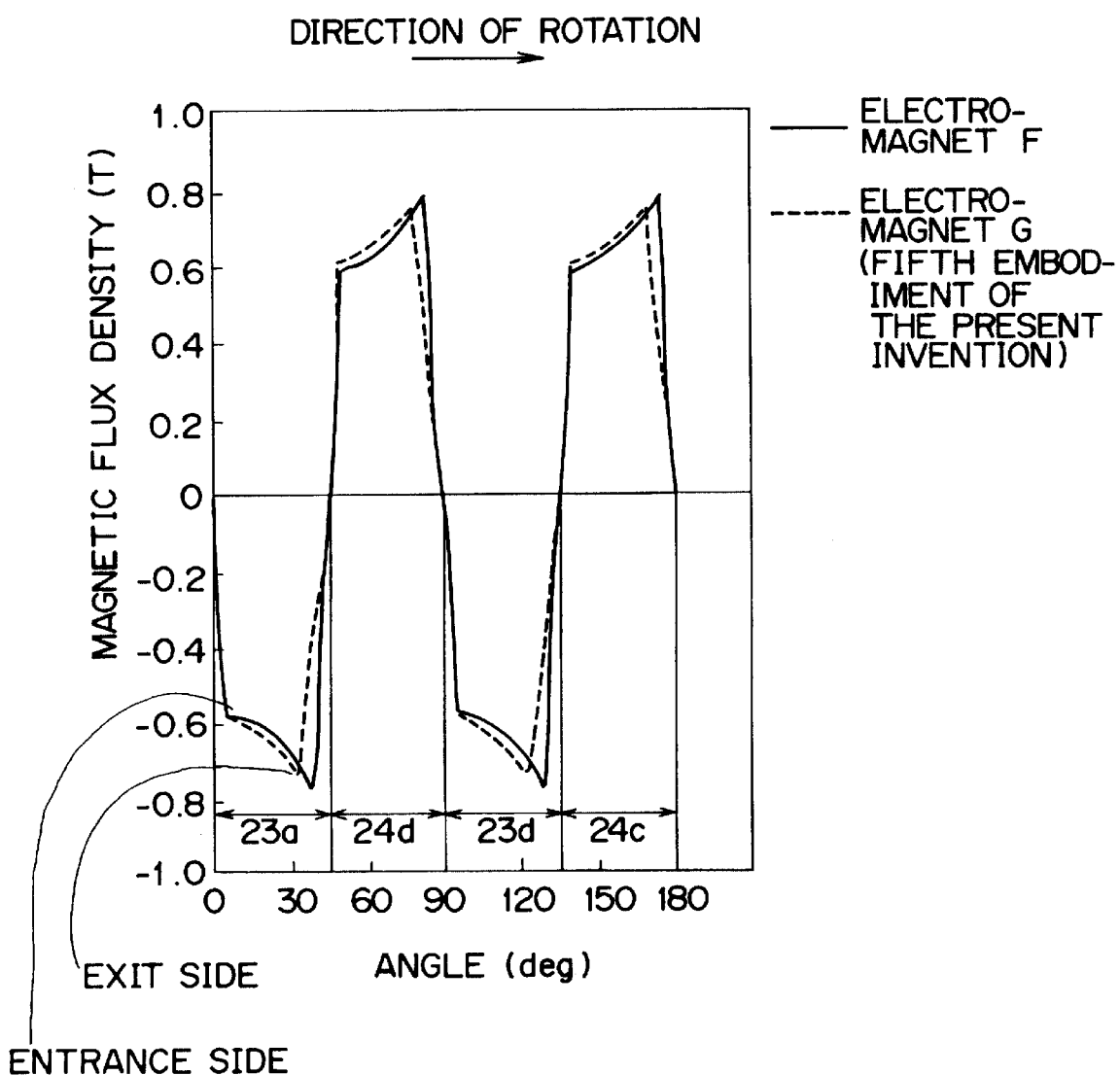
FIG. 27 is a graph showing the magnetic flues density distribution of the magnetic poles of the fifth embodiment of the present invention.

FIG. 27 shows the magnetic flux densities obtained through the dynamic magnetic field analysis under the same analytic conditions as those of the fourth embodiment of the present invention through comparison between the magnetic flux densities of the electromagnet E and the electromagnet G. The horizontal axis represents the angle from the slot center portion of the electromagnet, and the magnetic flux density within the angle of 180 degrees (corresponding to four poles of NSNS) is shown. The dotted line represents the electromagnet G, exhibiting the fact that the magnetic flux density of the electromagnet G on the entrance side of the magnetic pole is made approximately equal to that of the electromagnet F by setting no rising interval.

[3] Comparison of attracting forces through dynamic magnetic field analysis

Figure 28:
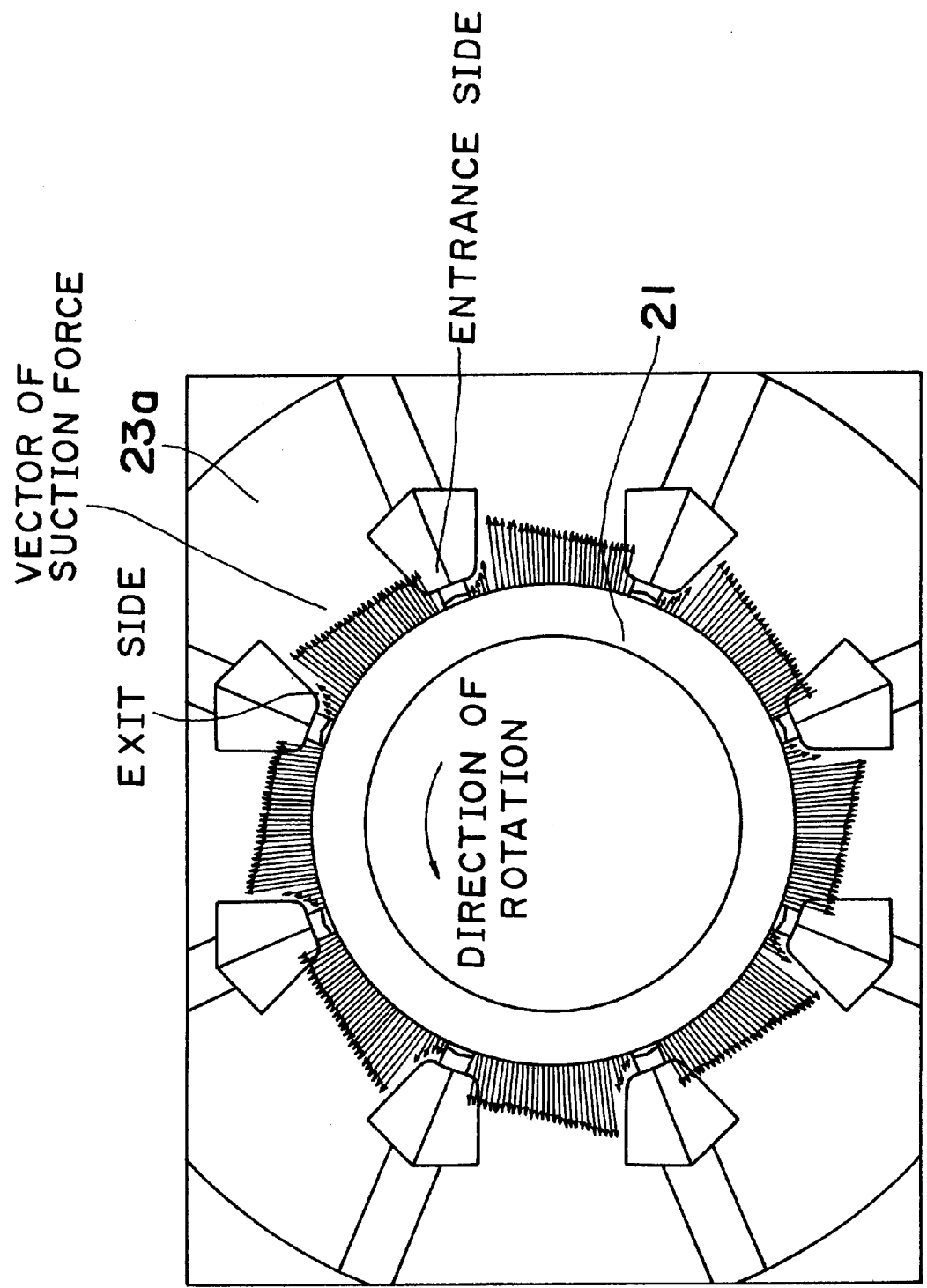
FIG. 28 is a view showing attracting forces of the electromagnet of the fifth embodiment of the present invention.

FIG. 28 shows the attracting forces obtained through the dynamic magnetic field analysis on the same analytic conditions as those of the fourth embodiment of the present invention. The magnitudes of the vectors in the figure represent the magnitudes of the attracting forces. According to the analytic result of FIG. 28, the attracting force of the electromagnet G on the entrance side of the magnetic pole is increased as compared with the electromagnet A (FIG. 32) by forming no rising interval. The reduction of the attracting force of the electromagnet G is compensated by forming no rising interval.

[4] Effect of the reduction of eddy current loss

Paying attention to the variation in magnetic flux density distribution during high-speed rotating, the fifth embodiment of the present invention suppresses the occurrence of eddy current loss on the exit side (falling interval) of the magnetic pole where the magnetic flux density becomes dense by providing the magnetic flux density shape (taper shape) such that the magnetic flux density has a gentle slope. The fifth embodiment also provides the magnetic flux density shape such that the magnetic flux is increased by forming no taper shape on the entrance side of the magnetic pole where the magnetic flux density is sparse and the eddy current loss is small, thereby increasing the attracting force.

V. Supplementary explanation of the present fifth embodiment

Assuming that the number of revolutions and the main shaft diameter are the uncompromisable conditions among the alternatives of design of the radial magnetic bearing, there are incompatible issues in terms of strength and loss in selecting the electromagnetic steel plate and in terms of the loading capability, rigidity, and loss in selecting the bias current and the magnetic pole width, as describer earlier. The fifth embodiment pays attention to the factor of the occurrence of the eddy current loss on the stator side of the stator, not the rotor iron core side. The eddy current loss is attributed to the induction electromotive force generated as a consequence of variations in the direction and the magnitude of the magnetic flux on the surface opposite to the magnetic pole of the rotor iron core. The current density of the eddy current attributed to this induction electromotive force is proportional to the amplitude of the variation ir. magnet-c flux density. Therefore, the eddy current loss consumed by the rotor is proportional to the square of the current density, i.e., the square of the variation in magnetic flux density. In the conventional magnetic bearing, a sudden change in magnetic flux density is caused by the relative movement of the rotor and the stator, and the sudden change has been the biggest factor of the eddy current loss.

According to the fourth and fifth embodiments of the present invention, the magnetic flux density varies with a gentle slope when one point of the rotor shifts from N to S or from S to N. That is, by providing the magnetic flux density distribution with the rising interval (approaching interval) and the falling interval (decelerating interval) like a cam curve and particularly prolonging the falling interval in which the eddy current loss is great, the occurrence of eddy current loss is suppressed to allow the substantial reduction in heat generation. Further, the formation of no slope in the rising interval in which the eddy current loss is small and the reduction of the gap between the magnetic pole and the rotor on the rising interval side increase the attracting force and increase the loading capability and the rigidity.

(Sixth Embodiment)

Figure 33:
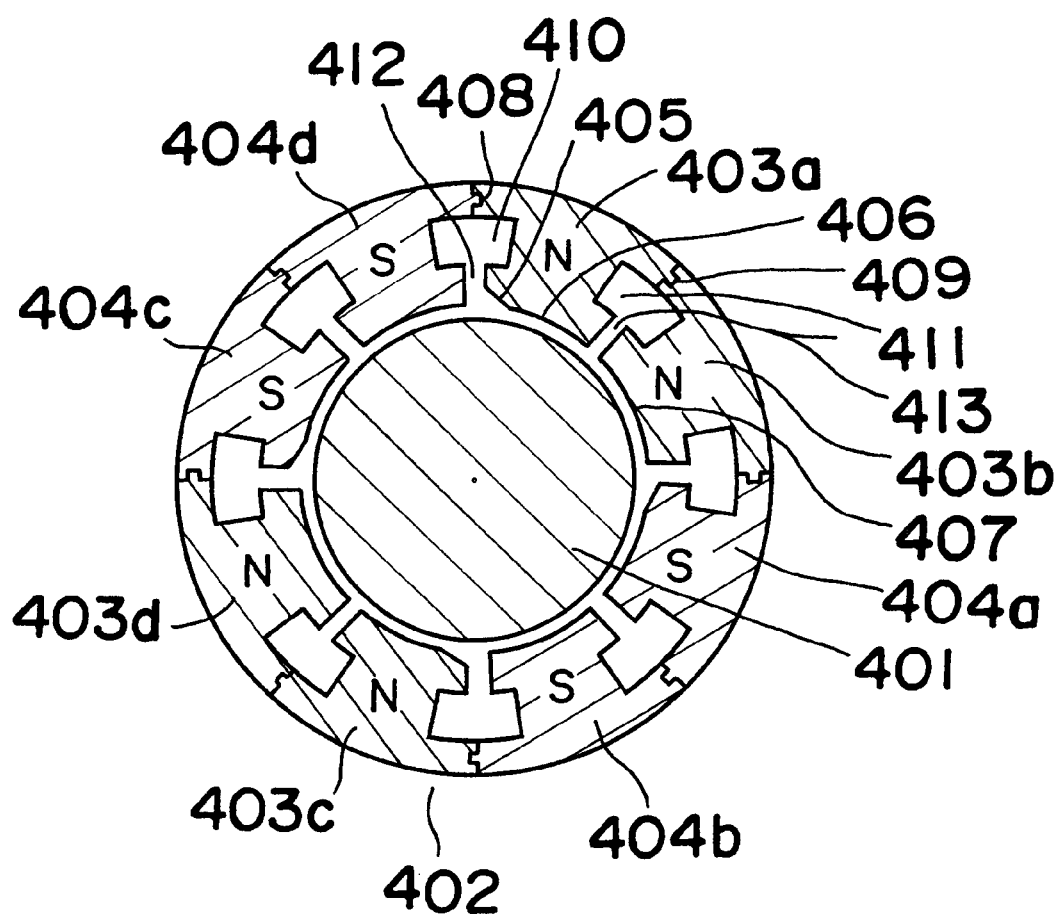
FIG. 33 is a view showing the principle of an NSSN type radial magnetic bearing electromagnet according to a sixth embodiment of the present invention.

The above description has been made on the basis of the case where the magnet arrangement is the NSNS type, but the present invention can also be similarly applied to the NSSN type. FIG. 33 shows the principle of the NSSN type radial magnetic bearing electromagnet according to a sixth embodiment of the present invention. There are shown a rotor 401 and a stator section 402. This stator section 402 is constructed of eight independent magnetic poles. That is, four north poles 403a through 403d and four south poles 404a through 404d are arranged in the circumferential direction with the homopolar combinations (NN or SS) arranged alternately. Paying attention Lo the north poles 403a and 403b, there are shown an inclined portion (taper portion) 405 formed at the end portion of the inner surface of the magnetic pole 403a, and perfect circle portions 406 and 407 arranged coaxially with the rotor 401. In the case of the NSSN type, no taper is required to be formed in the homopolar (NN or SS) intervals and a taper is required to be formed only in the heteropolar (N and S) intervals since the magnetic flux density does not vary gently. There are further shown mutually engageable projected and recessed connecting portions 408 and 409 for positioning and fastening the respective magnetic poles, winding accommodating portions 410 and 411, and slot portions 412 and 413 that are inter-heteropolar gaps. It is to be noted that the portions 405 through 411 are provided similarly for the other magnetic poles.

If the pole division core method used for a motor is utilized for the stator of the magnetic bearing to which the fourth and fifth embodlmenLt, of the present invention is applied, then magnetic poles of special shapes having great face widths, i.e., small slot widths and inclined surfaces can be adopted. For examtple, even when the face width B, is set greater than the width $B_2$ of the winding portion in order to form the inclined surfaces 405 and 406 in sufficiently long intervals as shown in the enlarged view of FIG. 19, a winding process that has not been able to be performed in the conventional magnetic bearing electromagnet can be achieved by using the division method. Furthermore, each magnetic pole can be treated as a single unit. Therefore, a high-density winding can be provided fully in the space for accommodating the coil, also facilitating the laminating and assembling work. That is, by virtue of the permitted great face width of the electromagnet, the narrow portion for providing the inclined surface on the magnetic pole inner surface or the magnetic resistance with a distribution in the circumferential direction can be formed with a sufficient margin in sufficiently long intervals. As a result, rising and falling intervals having sufficient lengths can be provided, so that the substantial reduction of the loss can be achieved.

Figure 34:
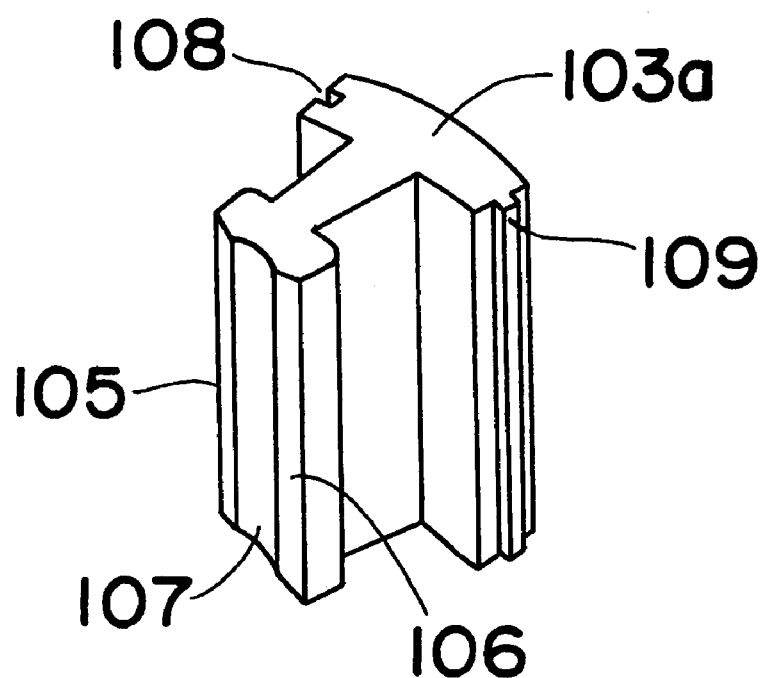
FIG. 34 is a perspective view of one magnetic pole in the case where the pole division method is used.

FIG. 34 shows the shape of one magnetic pole 103a in the case where the aforementioned processing method is used for the fourth embodiment (FIG. 18). By using the aforementioned processing method, a magnetic pole having an arbitrary shape can be adopted. Although the aforementioned division method is known in the field of the electric motor, there can be currently found no prior art to which the aforementioned processing method is applied to the magnetic bearing constructed of the magnetic poles each having the specific shape intended for reducing the loss as proposed by the fourth embodiment. An example of the pole division method has the processes of dividing the stator into a plurality of core pieces, laminating high-precision core pieces by the intra-metal-mold laminate fixing method by means of, for example, a laser, providing the pieces with high-density winding, and thereafter highly accurately recombining them together by means of a laser.

Although the above fourth and fifth embodiments have been described taking the magnetic bearing of the processing use spindle as an example, the present invention can also be applied to a turbo molecular pump or the like.

If the fourth and fifth embodiments are used, by forming the electromagnet shape corresponding to the magnetic flux density distribution during the high-speed rotation, the heat generation due to the eddy current loss generated at the rotor of the magnetic bearing can be remarkably reduced with a simple construction not much changed from that of the conventional magnetic bearing. As a result, the temperature rise of the main shaft can be suppressed. Therefore, the reliability of the spindle constructed of a plurality of composite components can be improved and the axial expansion of the main shaft can be suppressed, so that a high runout accuracy can be ensured.

The present invention provides a very effective means for achieving a high DN value (main shaft diameter×number of revolutions) of the magnetic bearing spindle. The issues of the conventional magnetic bearing during high-speed rotation are solved. Therefore, the magnetic bearing can cope with the demand for the high-speed cutting while further utilizing the fundamental capabilities (high speed and high rigidity) inherently owned by the magnetic bearing spindle, providing a very great practical effect.

(Seventh Embodiment)

Figure 35:
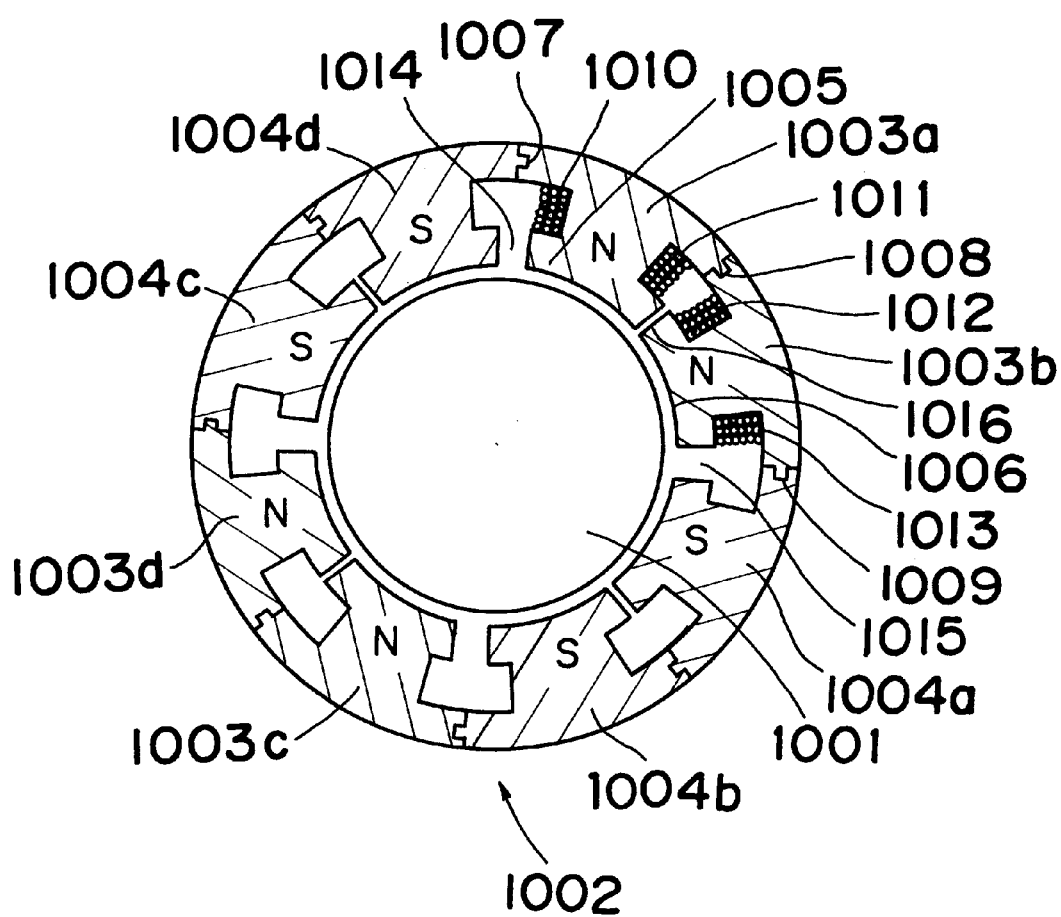
FIG. 35 is a view showing the principle of an electromagnet H of a radial magnetic bearing according to a seventh embodiment of the present invention.

FIG. 35 shows the principle of a radial magnetic bearing electromagnet (referred to as an electromagnet H) according to the seventh embodiment of the present invention. There are shown a rotor 1001 and a stator section 1002. This stator section 1002 employs the NSSN type structure constructed of eight independent magnetic poles. That is, four north poles 1003a through 1003d and four south poles 1004a through 1004d are arranged in the circumferential direction with pairs of homopolar magnetic poles arranged adjacently. In this case, with regard to two north poles 1003a and 1003b, there are shown perfect circle portions 1005 and 1006 arranged coaxially with the rotor 1001, mutually engageable projected and recessed connecting portions 1007 through 1009 for positioning and fastening the respective magnetic poles, and winding accommodating portions 1010 through 1013. Only the winding portions 1010 through 1013 are shown, and the winding portions of the other magnetic poles are omitted. There are further shown slot portions 1014 and 1015 that are inter-heteropolar (N and S) gaps and an inter-homopolar (N and N) slot portion 1016. It is to be noted that the portions 1005 through 1016 are similarly provided for the other magnetic poles.

Figure 36:
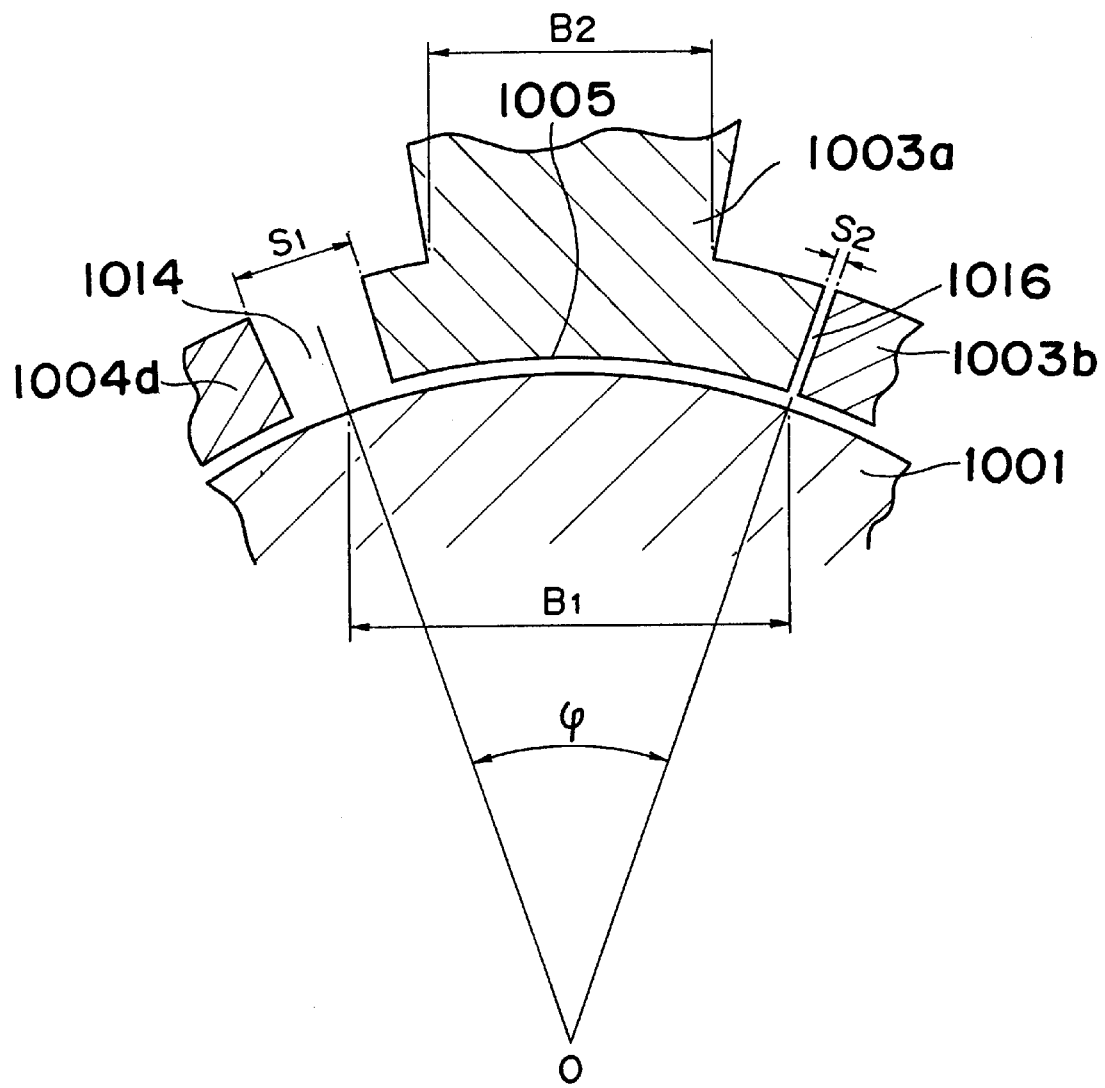
FIG. 36 is an enlarged view of the electromagnet of FIG. 35.

FIG. 36 shows a part-ally enlarged view of the magnetic pole 1003a. In the seventh embodiment, a slot width $S_2$ of the inter-homopolar slot portion 1016 is set to a sufficiently small value of $S_2=4$ deg by comparison with a slot width $S_1=16$ deg of the inter-heteropolar slot portions 1014.

For comparison with the seventh embodiment, FIG. 11 shows the principle of the conventional radial magnetic bearing electromagnet F of which the slot width $S_1=S_2=16$ deg. In FIG. 11 are shown a rotor 81 and a stator section 82. This stator section 82 also employs the NSSN type structure constructed of four north poles 83a through 83d and four south poles 84a through 84d, which are arranged in the circumferential direction with pairs of homopolar magnetic poles arranged adjacently. In this case, width regard to one north pole 83a, there are shown winding accommodating portions 85 and 86 (the windings are not shown). There are further shown slot portions 87 and 88 that are inter-heteropolar and inter-homopolar gaps, and their slot widths are equal to each other differently from the case of the electromagnet H.

The results of the eddy current losses of the electromagnet H and the electromagnet F obtained through a loss analysis as described later are shown in Table 3 below.

TABLE 3

| | Electromagnet H | Electromagnet F |
|---|---|---|
| Loss(kW) | 0.71 | 1.50 |

As is apparent from the results of the above Table 3, the electromagnet H of the seventh embodiment in which the inter-homopolar gap $S_2$ of the magnetic poles is made sufficiently smaller than the inter-heteropolar gap S, of the magnetic poles has a substantially reduced loss as compared with the electromagnet F of the prior art example in which the inter-homopolar gap and the inter-heteropolar gap are equal to each other.

The reason for the above will be described in detail below through theoretical analysis of the eddy current loss, similar to the description of the first through third embodiments.

I. Eddy current loss analysis

There is currently found no example of the conventional research for obtaining the absolute value of the eddy current loss of a magnetic bearing. Therefore, an analytic solution is first directly derived from the electromagnetic induction theory.

Figure 37:
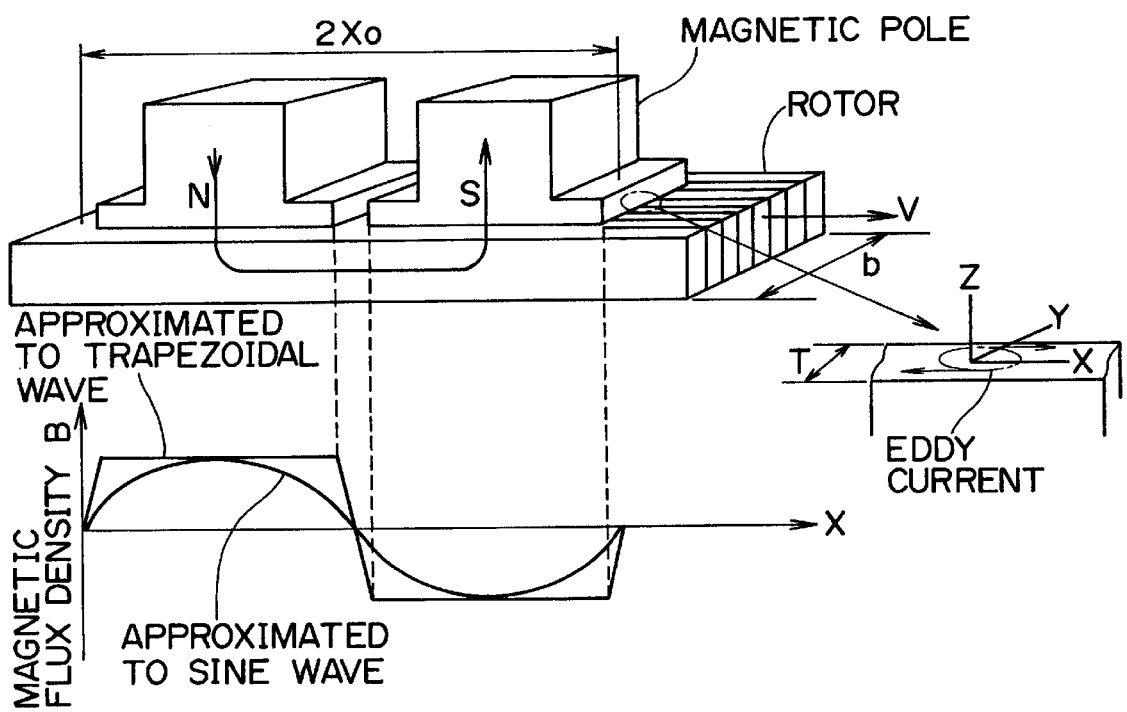
FIG. 37 is a view of an eddy current less analysis model.

In FIG. 37, coordinates are plotted on a planar conductor that is moving at a velocity v=rω, and it is assumed that a magnetic flux expressed by:

$$B = B_0 \sin\left[m\left(\omega t + \frac{x}{r}\right)\right]k \qquad \text{(Equation 21)}$$

is intersecting this planar conductor.

In the above equation (21), "ω" represents an angulac acceleration of the spindle, "r" represents the radius of the main shaft, and "m" represents a value which is determined by the magnetic pole arrangement and assumes the value m=4 in the case of the NSNS type and the value m=2 in the case of the NSSN type.

From the electromagnetic induction theory, thece is:

$$\nabla \times J = -\sigma \frac{\partial B}{\partial t} \qquad \text{(Equation 22)}$$

In this case, J represents a current density:

$(=J_x i+J_y j+J_z k)$ and "γ" represents the conductivity", $\nabla$ (nabla) represents a differential operator, $$\nabla = i\frac{\partial}{\partial x} + j\frac{\partial}{\partial y} + k\frac{\partial}{\partial z}$$

$$\nabla \times J = \left(\frac{\partial J_z}{\partial y} - \frac{\partial J_y}{\partial z}\right)i + \left(\frac{\partial J_x}{\partial z} - \frac{\partial J_z}{\partial x}\right)j + \left(\frac{\partial J_y}{\partial x} - \frac{\partial J_x}{\partial y}\right)k$$

"t" represents time, "i" indicates a direction of a vector in x-direction shown in FIG. 3, "j" indicate a direction of a vector in y-direction shown in FIG. 3, "k" indicate a direction of a vector in z-direction shown in FIG. 3, "Jx" represents a current density in x-direction, and "Jz" represents a current density in z-direction. With regard to one electromagnetic steel plate, the plate thickness is sufficiently small, and therefore, the current density in the y-direction is expressed by: $J_y=0$.

Assuming that there is a uniformity in the z-direction, then $Jz=\partial/\partial z=0$ $$\frac{\partial J_x}{\partial y}k = \sigma\frac{\partial}{\partial t}\left[B_0\sin\left\{m\left(\omega t + \frac{x}{r}\right)\right\}\right]k \qquad \text{(Equation 23)}$$

$$J_x = B_0\sigma m\omega \int \cos\left\{m\left(\omega t + \frac{x}{r}\right)\right\}dy \qquad \text{(Equation 24)}$$

$$= B_0\sigma m\omega \cos\left\{m\left(\omega t + \frac{x}{r}\right)\right\} \cdot y$$

where "m" represents an integer determined by magnetic pole arrangement in the circumferential direction and the number of the magnetic poles as described above.

If a time average and averages in the x-direction and y-direction are calculated assuming that the eddy current loss $W_e$ is cons-umed inside the conductor of an electromagnetic steel platce having a thickness T (a width b in terms of the total length of the laminated layers), a length d in the circumferential direction, and a depth S where the magnetic flux enters, since $\Delta W_e = J_x^2 \cdot \Delta V/\delta$ then:

$$W_e = \frac{1}{2\pi}\frac{bd}{2x_0 T}\int_0^{2\pi}\int_0^S \int_{-T/2}^{T/2}\int_0^{2x_0} \frac{1}{\sigma}J_x^2\,dx\,dy\,dz\,d(\omega t) \qquad \text{(Equation 25)}$$

where "$X_0$" represents a value of a length in the circumferential direction of one magnetic pole in a case where a length in the circumferential direction of two -magnetic poles as shown in FIG. 3 is supposed to be $2X_0$, the terms of the averages of time and the x-direction are expressed by:

$$\frac{1}{2\pi 2x_0}\int_0^{2\pi}\int_0^{2x_0}\cos^2\left\{m\left(\omega t+\frac{x}{r}\right)\right\}dx\,d(\omega t)=1/2 \qquad \text{(Equation 26)}$$

and the term of the average of the y-direction is expressed by:

$$\frac{1}{T}\int_{-T/2}^{T/2}y^2\,dy=\frac{T^2}{12}. \qquad \text{(Equation 27)}$$

If these values are used, then the eddy current loss $W_e$ in the case where the magnetic flux density distribution of the radial magnetic bearing is approximated to a sine wave in the circumferential direction is obtained. Since $d=2\pi r$, then:

$$W_e=\frac{\pi}{12}bT^2rsB_0^2\sigma m^2\omega^2 \qquad \text{(Equation 28)}$$

where "s" represents a depth of the entry of magnetic flux in the rotor.

Figure 38:
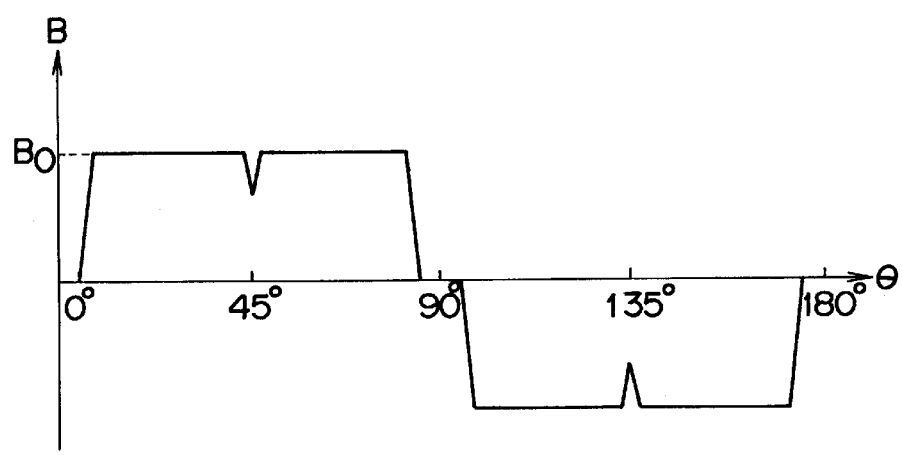
FIG. 38 is a graph showing the magnetic flux density distribution of the magnetic poles of the seventh embodiment of the present invention.
Figure 45:
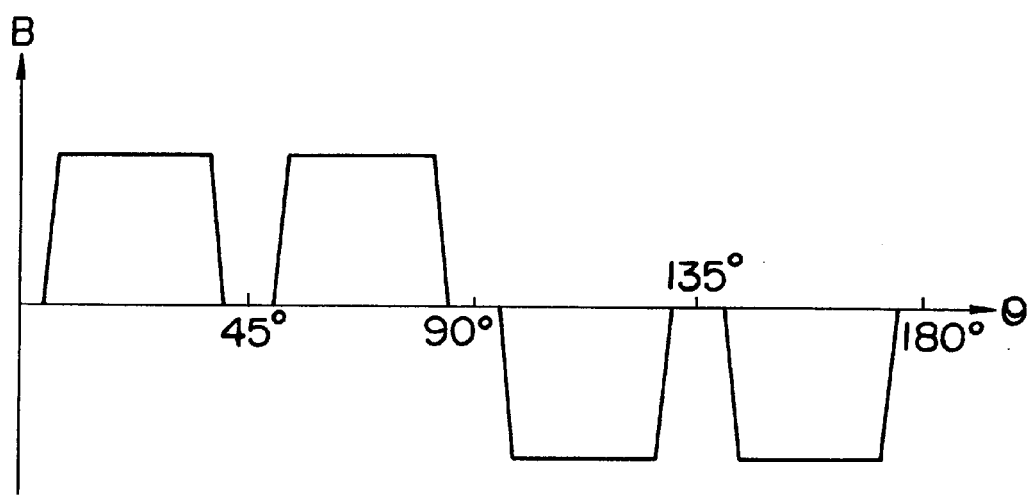
FIG. 45 is a graph showing the magnetic flux density distribution of the electromagnet of FIG. 44.

Although the magnetic flux density distribution curve has been approximated to the sine wave for the sake of easy understanding according to the above description, the periodic function of the magnetic flux density distribution of the actual magnetic bearing has a close resemblance to a is rectangular wave or a trapezoidal wave as shown in FIG. 38 or FIG. 45. In this case:

$$B=B_0\sum_n A_n\cdot\sin\left[m\left(\omega t+\frac{x}{r}\right)\right] \qquad \text{(Equation 29)}$$

instead of the equation (21).

The eddy current loss $W_e$ in this case is expressed by the following equation:

$$W_e=\frac{\pi}{12}bT^2rsB_o^2\sigma\omega^2\sum_n A_n^2 n^2 \qquad \text{(Equation 30)}$$

instead of the equation (28), where "$A_n$" represents a function of n obtained from Fourier-series by Fourier-series-approximating the periodic function.

On the rotor surface of the magnetic bearing, the low frequency components of the magnetic flux enter the inside of the rotor, however, high frequency components are hard to enter. Therefore, assuming that a skin depth, (i.e., a volume that causes a loss) is proportional to
$1\sqrt{n}$,
then the equation (30) becomes:

$$W_e=\frac{\pi}{12}bT^2rsB_o^2\sigma\omega^2\sum_n\frac{a_n^2}{\sqrt{n}}n^2. \qquad \text{(Equation 31)}$$

In the equation (31), $a_n$ represents the Fourier coefficient determined by the type (sine wave, trapezoidal wave, rectangular wave, or the like) of the periodic function.

II. Effect of reducing the loss

According to the above results, the fundamental equation (equation 31) for obtaining the absolute value of the eddy current loss when an arbitrary periodic function is given to the magnetic flux density distribution is thus obtained from the aforementioned result. Calculation is performed by applying the equation to the seventh embodiment (electromagnet H of FIG. 35) of the present invention. Further, the effect of reducing the loss in the seventh embodiment is evaluated by comparison with the bearincg structure (electromagnet F of FIG. 11) of which the gaps between the magnetic poles located on the left-hand side and the right-hand side are equal to each other.

Comparison of magnetic flux density distributions

FIG. 38 shows the magnetic flux density distribution of the seventh embodiment (electromagnet H) in the interval where a rotor rotating angle is 0 to 90 degrees when the inter-heteropolar gap $S_1$=16 deg, the inter-homopolar gap $S_2$=4 deg, and an inter-homopolar proximity angle (angle of proximity) at which the magnetic poles on the homopolar side are in close proximity to each other is $\Delta\theta$=6 deg. It should be theoretically provided that B=0 in the entire interval of the gap portion 0<$\theta$<8 deg (=$S_1$/2). However, in the actual electromagnet, the waveform of the magnetic field somewhat loses its edges due to the influence of leakage magnetic flux, the chamfering process of the rotor inner surface edge portions of the electromagnet, and other factors. For the above reasons, an angle of inclination is provided in the magnetic field distribution within a minute range of 5<$\theta$<8 deg. The same thing can be said for the homopolar side of the electromagnet H. Also, in the case of the magnetic flux density distribution of the conventional electromagnet F shown in FIG. 11 for comparison with the seventh embodiment of the present invention, the same angle of inclination is provided in the interval of the slot width ($S_1$=$S_2$=16 deg) as shown in FIG. 45 for the same reason.

Result of calculation of eddy current loss

Figure 39:
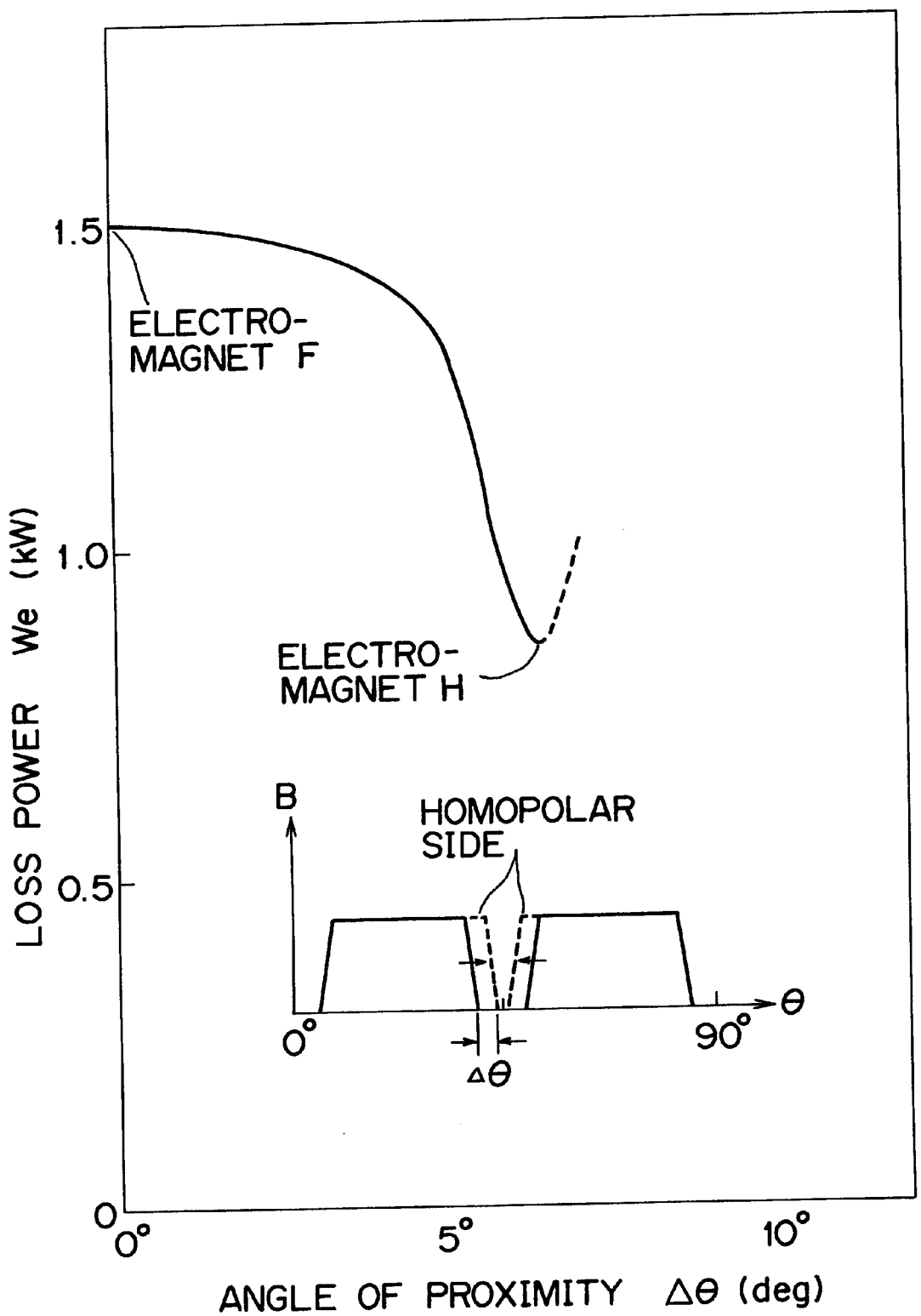
FIG. 39 is a graph showing a power loss with respect to an angle of proximity according to the result of the eddy current loss analysis.

FIG. 39 is the analytic results of the effect of reducing the eddy current loss of the electromagnet F, of the seventh embodiment of the present invention, obtained under the following conditions.

(1) The inter-heteropolar gap S, of the magnetic poles is set to $S_1$=16 deg similar to the electromagnet F.

(2) The inter-homopolar gap $S_2$ of the magnetic poles is reduced by 2$\Delta\theta$ deg so that $S_1$>$S_2$ with respect to the case of the electromagnet F ($S_2$ 16 deg) used as a reference ($\Delta\theta$=0).

FIG. 39 shows a graph of a relation between the eddy current loss and the above $\Delta\theta$ deg. As analytic conditions for both the electromagnets H and F to be analyzed, there are a specific resistance value ($\rho$=5.65×10$^{-7}$Ωm) of the electromagnetic steel plate and a depth s of the entry of magnetic flux in the rotor provided by the thickness (s=7 mm) of the electromagnetic steel plate rotor of the magnetic bearing. Further, an electromagnetic steel plate for high strength use (T=0.00035 m) intended for a high DN value is employed so as to withstand the centrifugal force although thie loss is large. There are further conditions of:

a magnetic bearing width b (=0.05 m), the maximum value $B_0$ of the magnetic flux density (=2.12 T), a conductivity $\delta$ (=1/$\rho$), a radius r of the main shaft (=0.09/2 m), and the-number of revolutions $\omega$ (=40000 rpm×2×$\pi$/60)

The following results are obtained from the analysis of FIG. 39.

(1) In the case of the electromagnet F (FIG. 11) of which the inter-homopolar gap and the inter-heteropolar gap are equal to each other ($S_1$=$S_2$16 deg), then $\Delta\theta$=0 and a loss $W_3$=1.5 kW.

(2) If the inter-homopolar gap $S_2$ of the electromagnet H is reduced, then the loss power $W_e$ is generally reduced in the interval of 0<$\Delta\theta$<4.0 deg (=$S_1$) However, if $\Delta\theta$>4.0 deg, then the loss is remarkably reduced and comes to have the minimum value of $W_e$=0.85 kW when $\Delta\theta$=6.5 deg.

(3) In this case, since the total magnetic flux is increased as compared with the case where Δθ=0, the maximum value of the magnetic flux density may be slightly reduced. By comparing the area of the magnetic flux density distribution in the case where Δθ=0 with the area of the magnetic flux density distribution in the case where Δθ6.5 deg, the loss $W_e$ changes from 0.85 kW to 0.71 kW.

The loss $W_e$ increases again when Δθ>6.5 deg. However, this is because the i-agnetic flux density in the interval where the magnetic flux of the above two magnetic poles overlaps exceeds the maximum value $B_0$ of the magnetic flux density of one magnetic pole in terms of calculation. However, it is practically impossible to exceed the maximum value $B_0$ of the magnetic flux density, and the effective interval through analysis is Δθ<6.5 deg.

(4) Therefore, if Δθ=6.5 deg by selection according to the application of the seventh embodiment of the present invention, then the eddy current loss can be reduced to a value not larger than one half with the same loading capability and rigidity maintained.

Assuming that the number of revolutions and the main shaft diameter are the uncompromisable conditions among the alternatives of design of the radial magnetic bearing, there are incompatible issues in terms of strength and loss in selecting the electromagnetic steel plate, and in terms of the loading capability, rigidity, and loss in selecting the bias current and the magnetic pole width, as described earlier.

The seventh embodiment pays attention to the factor of the occurrence of the eddy current loss on the stator side (stator), not on the rotor iron core side (rotor). The eddy current loss is attributed to the induction electromotive force generated as a consequence of variations in the direction and the magnitude of the magnetic flux on the surface opposite to the magnetic poles of the rotor. As described earlier, if attention is paid to one point of the rotor, then the magnetic flux applied to the one point of the rotor varies its direction and magnitude in the order of, for example, N→S→S→N due to the rotation of the rotor. Consequently, a varying induction electromotive force is generated on the surface of the rotor, thereby forming an eddy current. The current density of the eddy current attributed to this induction electromotive force is proportional to the amplitude of the variation in magnetic flux density. Tnerefore, the eddy current loss consumed by the rotor is proportional to the square of the current density, i.e., the square of the variation in magnetic flux density.

Explaining the eddy current loss by the fundamental equation (equation 31) for obtaining the eddy current loss, as the rate of change in magnetic flux density increases, a larger amount of higher harmonic components are included and the Fourier coefficient $a_n$ of high degree n .is great. Therefore, the term of the higher harmonic components expressed by:
$a_n^2 n^2/\sqrt{n}$
is not insignificant and can't be ignored.

The seventh embodiment pays attention to the fiact that the measure for reducing the loss differs depending on the following cases (1) and (2) with regard to one point of the rotor.

(1) In the case where the magnetic flux shifts between heteropolar magnetic poles (from N to S or from S to N).

(2) In the case where the magnetic flux shifts between homopolar magnetic poles (from N to N or from S to S).

When the present invention is applied to the NSSN type, the measure for suppressing the sudden change in magnetic flux density differs depending on the heteropolar side and the homopolar side. That is, the key factor of the seventh embodiment is that the electromagnets are arranged so that the shape of the single magnetic pole or the relative positional relation between adjacent magnetic poles has an asymmetrical arrangement between the heteropolar side and the homopolar side.

The aforementioned seventh embodiment proposes the practical measures. Assuming that the gap to the magnetic pole end portion on the heteropolar side is S, and the gap on the homopolar side is $S_2$, then $S_2$ is put closer to zero only on the homopolar side while maintaining the gap $S_1$ on the heteropolar side similar to the conventional bearing. If the heteropolar magnetic poles are put closer to each other ($S_1$→0), then the magnetic circuit does not passes through the rotor and a closed loop is formed between the magnetic poles. Consequently, the function as a magnetic bearing cannot be obtained. However, the method of putting the homopolar magnetic poles closer to each other exerts little influence on the basic performance of the magnetic bearing, and there is the effect of making uniform or flattening the magnetic flux density distribution as shown in FIG. 38. As a result, the eddy current loss due to the aforementioned reason (2) can be substantially reduced.

(Eighth Embodiment)

Figure 40:
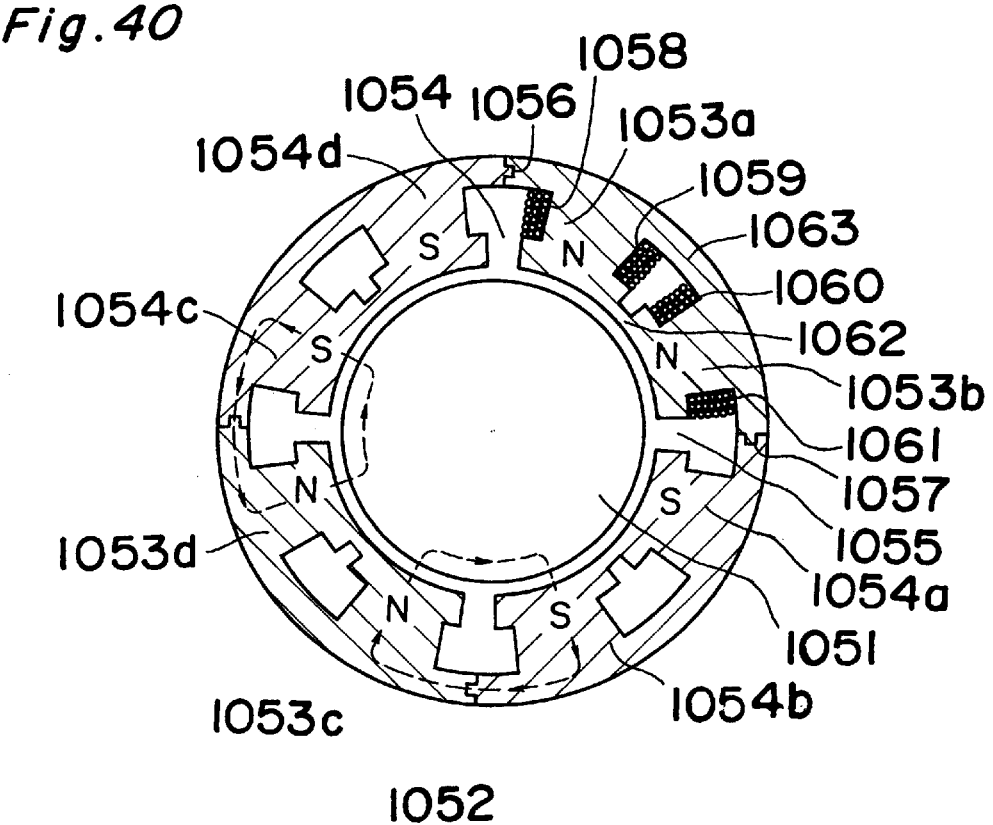
FIG. 40 is a view showing the principle of an electromagnet of a radial magnetic bearing according to an eighth embodiment of the present invention.

FIG. 40 shows an eighth embodiment of the present invention, in which two homopolar magnetic poles are integrated with each other when the present invention is applied to an electromagnet of which the magnetic pole arrangement is the NSSN type.

There are shown a rotor 1051 and a stator section 1052. This stator section 1052 employs the NSSN type structure constructed of eight magnetic poles. That is, the stator section 1052 is constructed of four north poles 1053a through 1053d and four south poles 1054a through 1054d, providing a construction in which homopolar magnetic pole pairs are arranged adjacently and arranged alternately in the circumferential direction. It is to be noted that each pair of homopolar magnetic poles (1053a and 1053b, for example) have an integrated structure.

In this case, with regard to two north poles 1053a and 1053b, there are shown slot portions 1054 and 1055 located on the heteropolar side, mutually engageable projected and recessed connecting portions 1056 and 1057 for positioning and fastening the respective magnetic poles, and winding accommodating portions 1058 through 1061. The reference numerals 1062 and 1063 denote a boundary portion A and a boundary portion B, respectively. In the eighth embodiment, the boundary portion A, which is normally separated, is integrated, and therefore, the magnetic flux density distribution can be further flattened for the reduction of loss. The boundary portion B is also integrated, and therefore, the magnetic poles 1053a and 1053b can be treated as a single component in the assembling stage. Therefore, according to the electromagnet of the eighth embodiment, the pole division method capable of providing the high-density winding can be applied.

(Ninth Embodiment)

Figure 41:
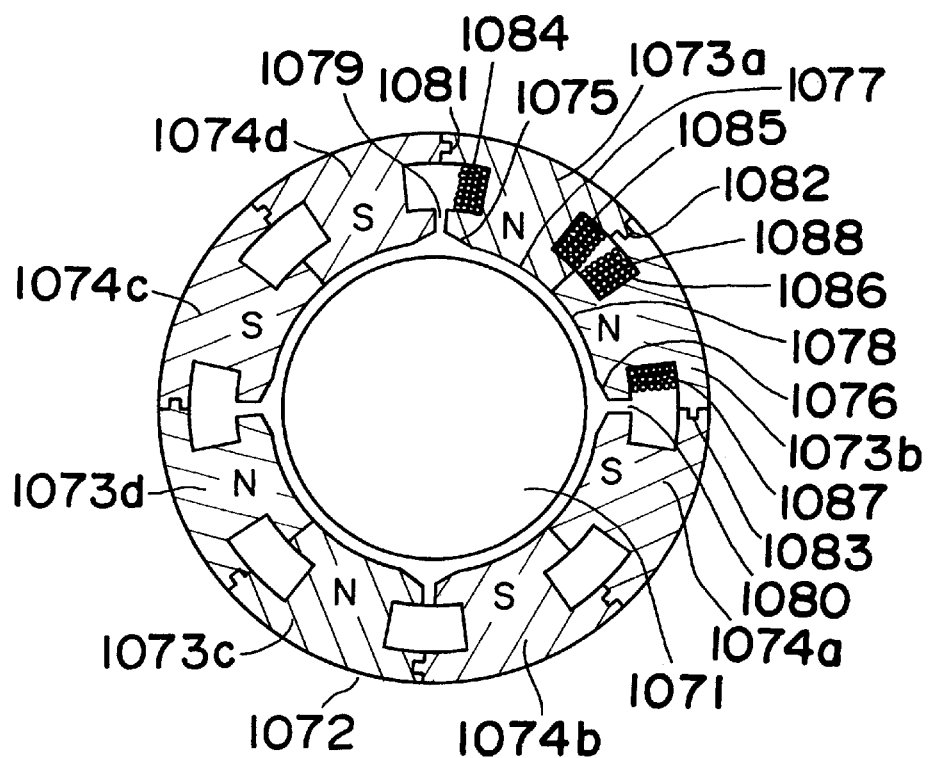
FIG. 41 is a view showing the principle of an electromagnet of a radial magnetic bearing according to a ninth embodiment of the present invention.

FIG. 41 shows a ninth embodiment of the present invention, which is intended for substantially reducing the eddy current loss due to the aforementioned factor (1) in the case where the present invention is applied to an electromagnet of which the magnetic pole arrangement is the NSSN type. That is, there is shown the case where a measure for suppressing the sudden change in magnetic flux density is effected by forming a gently inclined portion (rising and falling intervals of the magnetic flux density curve) on the inner surface of the magnetic poles on the heteropolar side.

Figure 42:
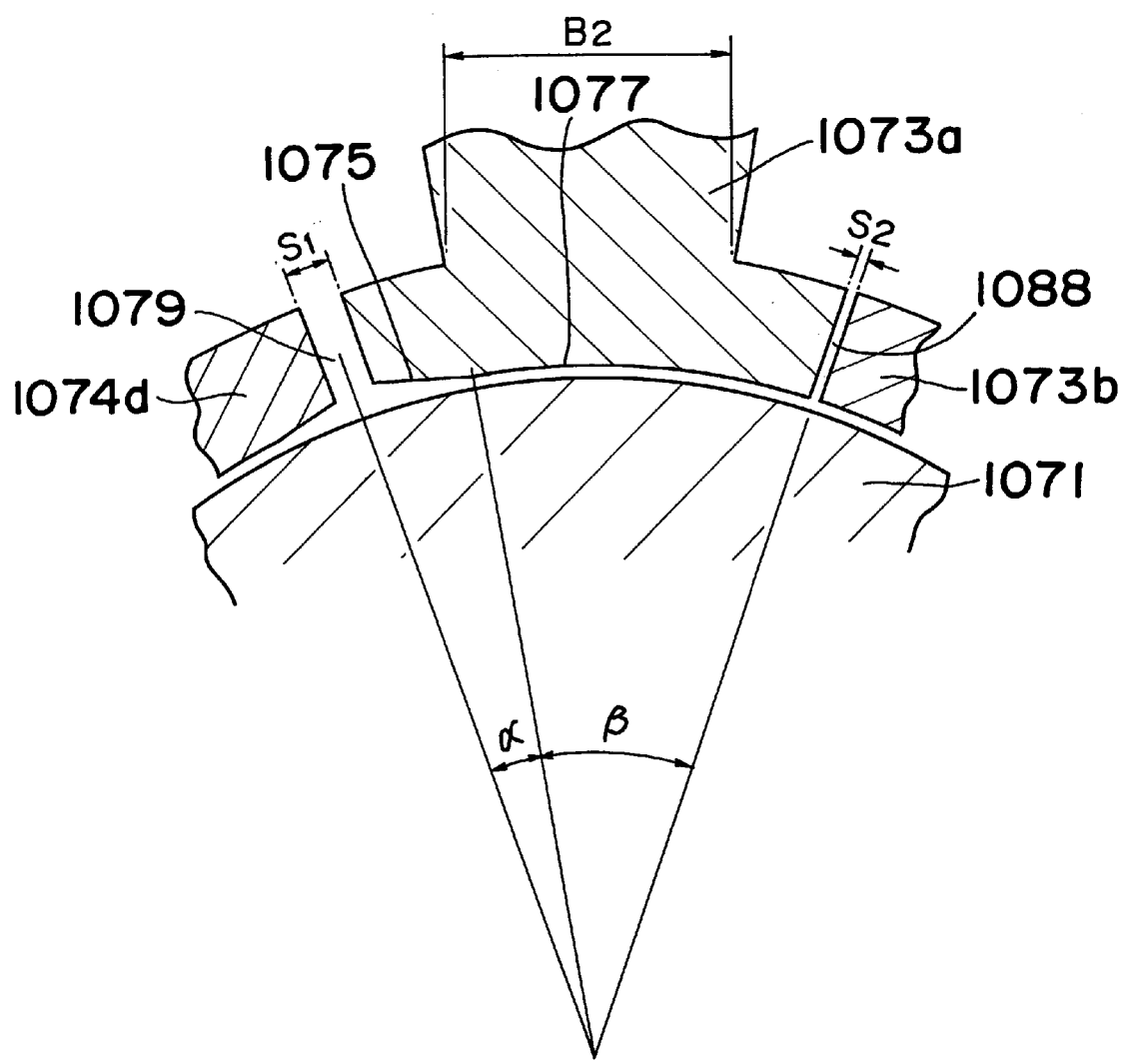
FIG. 42 is an enlarged view of part of the electromagnet of FIG. 40.

There are shown a rotor 1071 and a stator section 1072. This stator section 1072 employs the NSSN type structure constructed of eight independent magnetic poles. That is, four north poles 1073a through 1073d and four south poles 1074a through 1074d are arranged in the circumferential direction with ho-opolar magnetic pole pairs arranged adjacently and arranged alternately in the circumferential direction. In this case, with regard to two north poles 1073a and 1073b, there are shown inclined portions 1075 and 1076 formed at both end portions of the inner surfaces of the magnetic poles 1073a and 1073b, perfect circle portions 1077 and 1078, slot portions 1079 and 1080 located on the heteropolar side, mutually engageable projected and recessed connecting portions 1081 through 1083 for positioning and fastening the respective magnetic poles, winding accommodating portions 1084 through 1087, and a slot portion 1088 located on the homopolar side. FIG. 42 shows an enlarged view of part of the magnetic pole 1073a.

Figure 43:
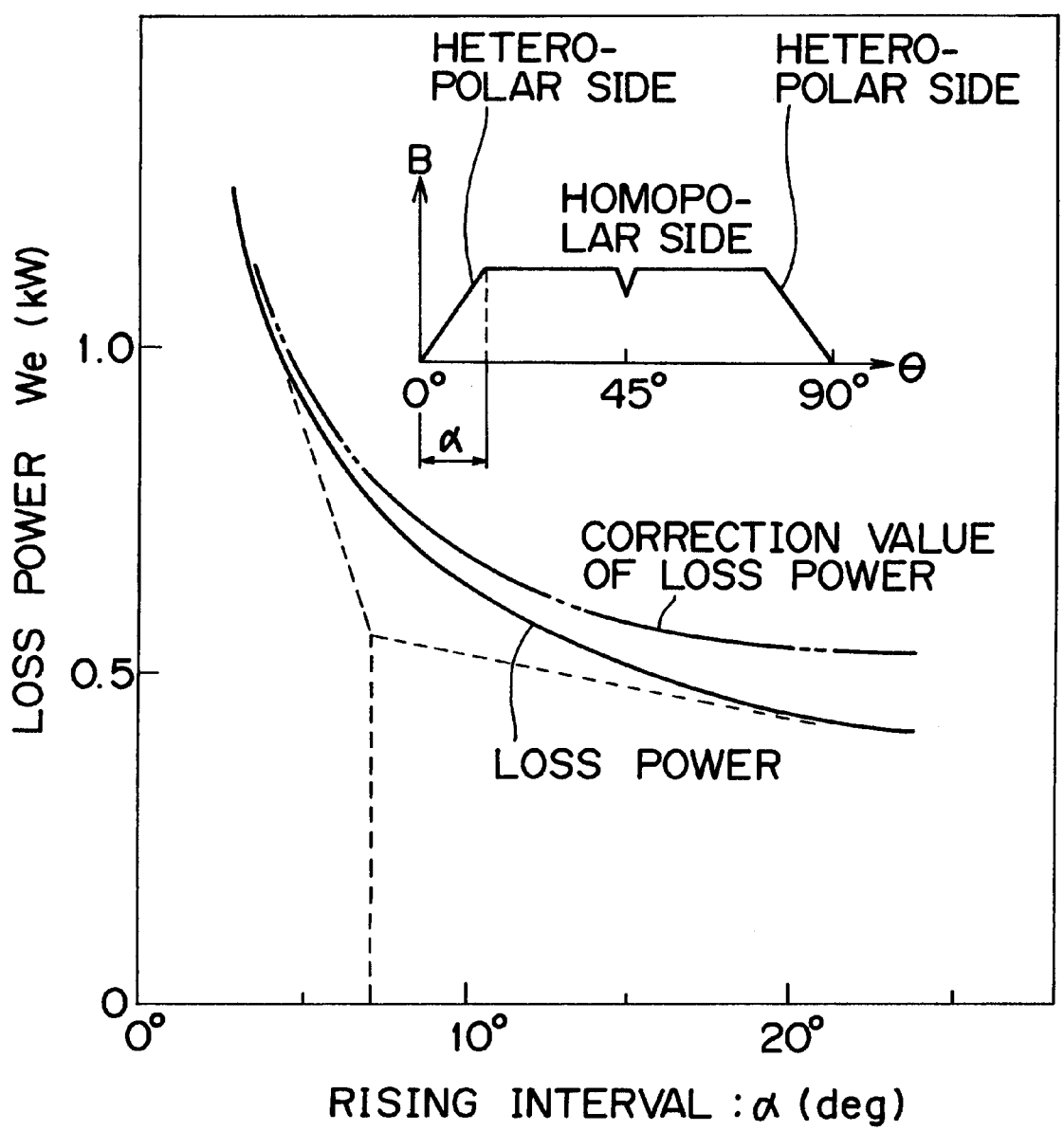
FIG. 43 is a graph showing a loss power with respect to a rising interval according to the result of the eddy current loss analysis.

In the ninth embodiment, a gently inclined surface is formed on the magnetic pole inner surface in the interval $\alpha$ extending from the magnetic pole end portion on the heteropolar side to the coaxial portion. The shape of the magnetic pole inner surface is formed coaxially with the axial center of the rotor similar to the conventional arrangement in the interval $\beta$ extending from the magnetic pole end portion on the homopolar side to the coaxial portion. Further, different from the seventh embodiment, the inter-heteropolar gap Si is set to a sufficiently small value of $S_1=6$ deg. The inter-homopolar gap is $S_2=4$ deg. FIG. 43 shows the analytic result of the power loss in the rising interval $\alpha$ with $S_1$ and $S_2$ kept constant. The results are summarized as follows.

(1) Even in the case of the electromagnet that has no inclined surface on the magnetic pole inner surface, the waveform of the magnetic field somewhat loses its edges as described earlier. If the loss of the electromagnet that has no inclined surface with the angle of dulled waveform edge $\alpha=3$ deg, then $W_e=1.17$ kW.

(2) If the rising interval is increased from $\alpha=3$ deg, then the power loss is substantially reduced.

For example, if the angle is varied from $\alpha=3$ deg to 14 deg, then the loss $W_3$ reduces from $W_e=1.17$ kW to 0.53 kW.

(3) Note that, in this case, the total magnetic flux reduces, and therefore, the maximum value of the magnetic flux density must be slightly increased as indicated by the curve of the one-dot chain line of FIG. 43. If the correction value (two-dot chain line) for the loss is obtained by taking the above increase into account, then $W_e$ becomes $W_e=0.53$ kW to 0.59 kW.

Therefore, it can be appreciated that, if the rising interval $\alpha=14$ deg is selected according to the application of the seventh through ninth embodiments of the present invention, then the eddy current loss can be reduced to a value slightly smaller than one half while maintaining the same loading capability and rigidity.

According to the seventh through ninth embodiments of the present invention, the magnetic flux density varies with a gentle slope when one point of the rotor shifts from N to S or from S to N. That is, by providing the magnetic flux density distribution with a sufficiently long rising interval (approaching interval) and a sufficiently long falling interval (decelerating interval) like a cam curve, the generation of eddy current loss is suppressed so as to allow the substantial reduction in heat generation.

The provision of the magnetic flux density distribution with the rising interval is not just for the effect of reducing the loss. The loading capability and rigidity of the magnetic bearing are determined by the total area of the magnetic flux density distribution. Therefore, the ninth embodiment in which the magnetic flux density distribution has a close resemblance to the trapezoidal wave is advantageous since the ninth embodiment can provide a large total area as compared with the conventional magnetic bearing (FIG. 45, the magnetic flux density distribution being not shown) of which the magnetic flux density distribution has a close resemblance to the rectangular wave.

In the ninth embodiment, there is used the method of forming the inclined surfaces only on the heteropolar side of the magnetic poles and putting the magnetic poles close to each other on the homopolar side similar to the seventh embodiment. The method of putting the homopolar magnetic poles close to each other is advantageous in terms of the loading capability and rigidity because the magnetic flux density distribu allowed to have a great total area.

Figure 46:
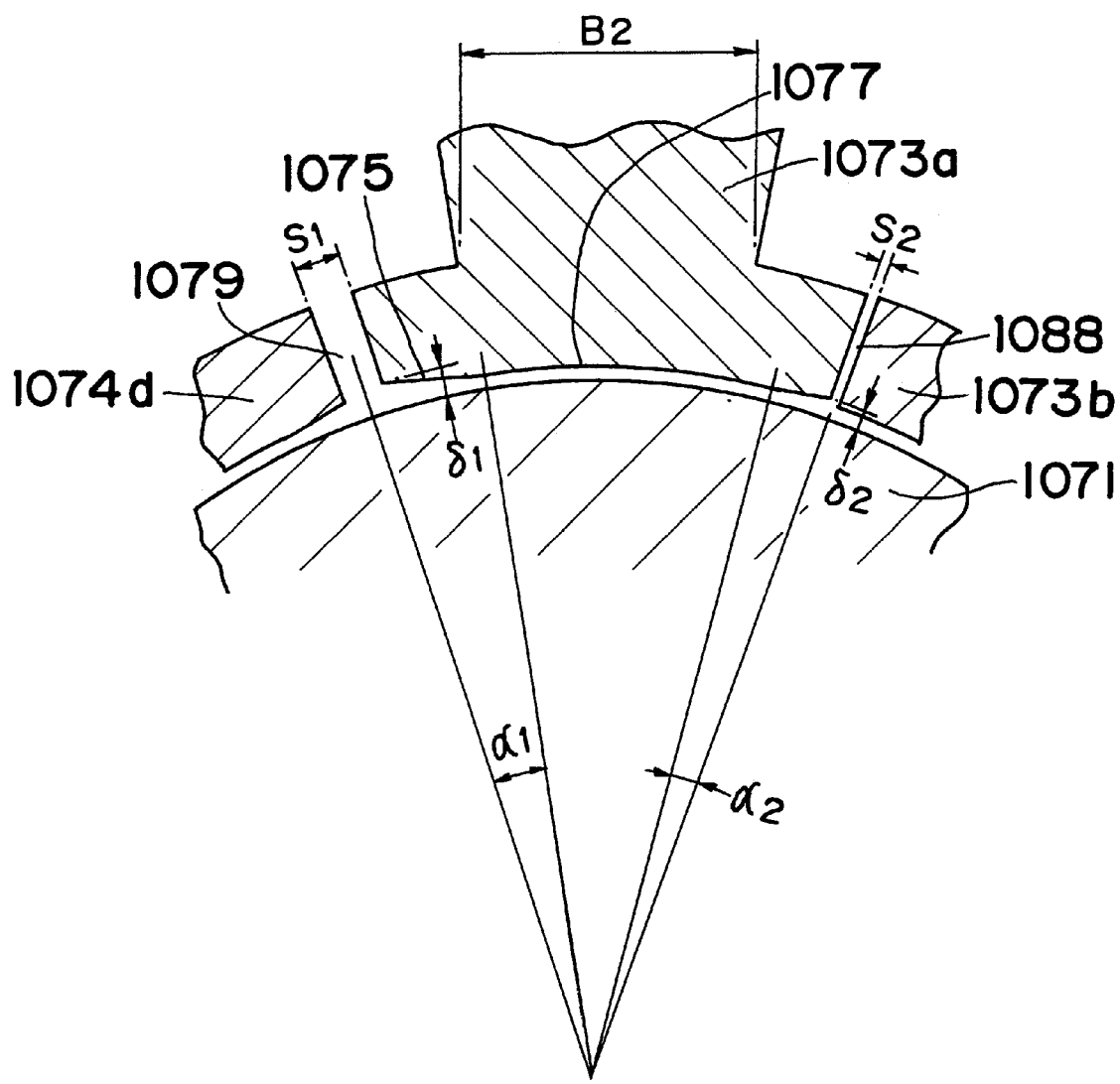
FIG. 46 is an enlarged view of the electromagnet of the radial magnetic bearing of a modification of the ninth embodiment of the present invention.

However, the loss can also be reduced by forming inclined surfaces on the homopolar side instead of the method of putting the magnetic poles close to each other. In this case, the rate of change in the magnetic flux density on the homopolar side is not so great in contrast to that on the heteropolar side. Therefore, the angle of the inclined surface l o be formed is allowed to be sufficiently small. That is, assuming that the angle of the inclined surface to be formed on the heteropolar side is $\alpha_1$ and the angle of the inclined surface to be formed on the homopolar side is $\alpha_2$, then it is proper to provide the construction in which $\alpha_1>\alpha_2$ and as shown in FIG. 46.

The above ninth embodiment is constructed so that the magnetic flux density distribution is provided with the rising characteristic by fori ming the i nclned surface on the inner surface of the magnetic pole and varying the gap (air gap) between the magnetic pole and the rotor in the circumferential direction.

(Tenth Embodiment)

Figure 44:
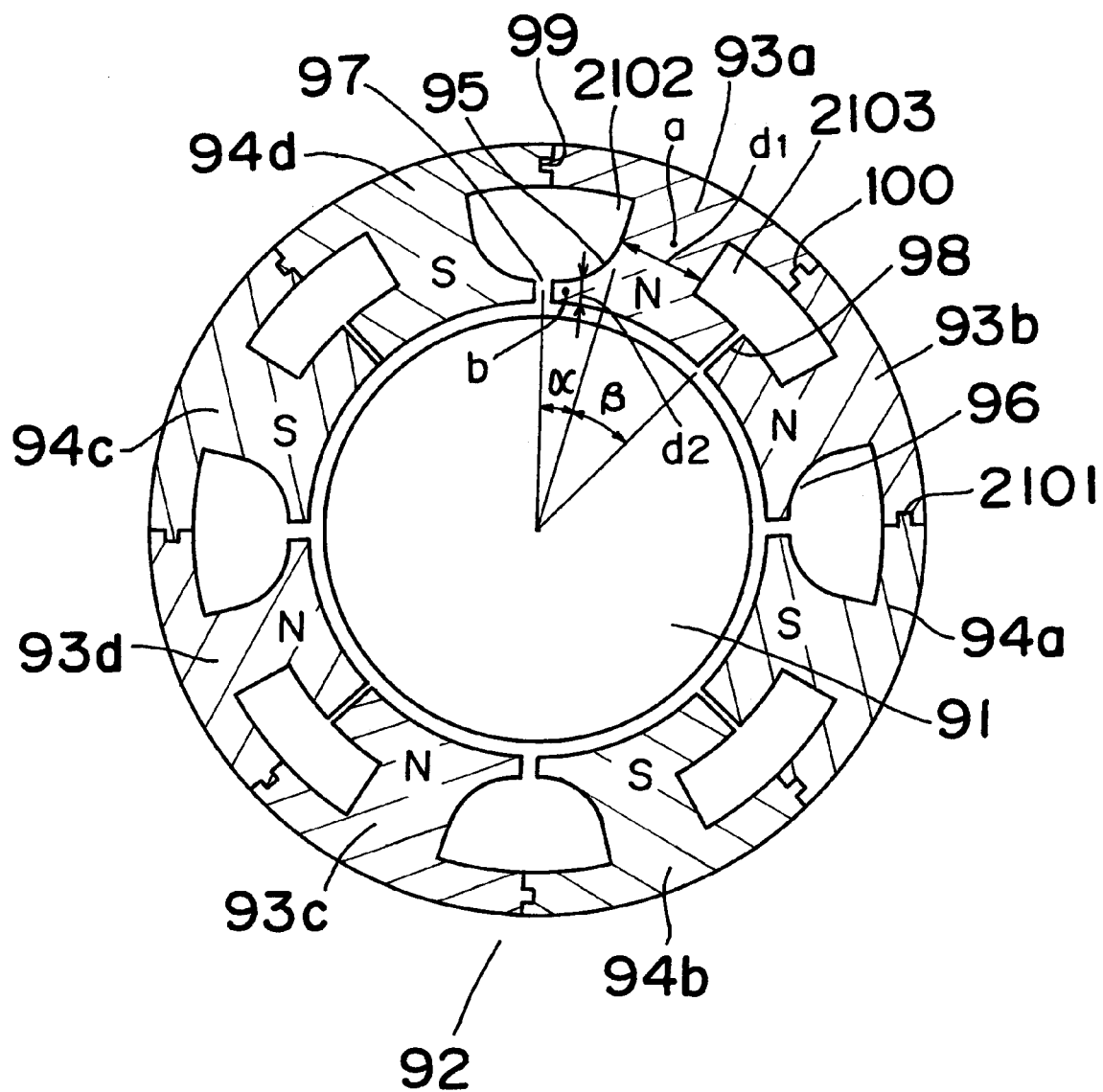
FIG. 44 is a view showing the principle of an electromagnet of a radial magnetic bearing according to a tenth embodiment of the present invention.

FIG. 44 shows a tenth embodiment of the present invention, in which the magnetic flux density distribution is provided with a long-interval rising characteristic by forming a portion of which the width (area) of the magnetic path is reduced along the path that extends from the winding portion to the magnetic pole end portion in, for example, the magnetic circuit formed through north pole→air gap→rotor→air gap→south pole. Therefore, according to the tenth embodiment, the magnetic pole is allowed to have an inner surface shape coaxial with the rotor.

There are shown a rotor 91 and a stator section 92. This stator section 92 is the NSNS type structure constructed of eight independent magnetic poles. That is, the stator section 92 is constructed of four north poles 93a through 93d and four south poles 94a through 94d, which are alternately arranged in the circumferential direction. In this case, with regard to one north pole 93a, constricted portions, (i.e., very narrow portions) 95 and 96 that have a reduced width in the circumferential direction of the magnetic path are formed between the magnetic pole inner surface on the rotor side and a winding accommodating portion 97. There are further shown a slot portion 97 located on the heteropolar side, a slot portion 98 located on the homopolar side, mutually engageable projected and recessed connecting portions 99, 100, and 2101 for positioning and fastening the respective magnetic poles and winding accommodating portions 2102 and 2103 (the windings are not shown).

In FIG. 44, there is formed a magnetic pole of a portionr of which the magnetic path width is reduced from $d_1$ to $d_2$ in an interval of the angle $\alpha$ through the path that extends from a point "a" at which a winding is provided around the point to an eyed portion "b" of the magnetic pole.

On the other hand, in the interval of the angle $\beta$, the width of the magnetic path is sufficiently large so that the path is effective for conducting the magnetic flux. According to the shape of the magnetic poles, the magnetic flux density distribution formed between the magnetic pole inner surface and the rotor 91 is not uniform in the circumferential direction but formed into a pseudo trapezoidal wave having an angle of inclination.

In applying the present invention, it is acceptable to provide the magnetic flux density distribution by devising the shape of the magnetic path other than the portion of the magnetic pole that faces the rotor, e.g., by forming the constricted portion (very narrow portion) in the magnetic path as described in connection with the tenth embodiment. However, it is also acceptable to combine the above arrangement with the method of setting the air gap (the ninth embodiment).

How large the magnitudes of the rising and falling intervals should be set will now be considered. Taking the ninth embodiment as an example, it can be found in the graph of FIG. 43 that the loss sharply reduces as the angle a is increased from the state in which $\alpha=0$. The radial electromagnet is normally constructed of a plurality of magnetic poles, and it is preferable to keep the thermal deformation of the spindle symmetrical about its axis by making the loss (i.e., the calorific value) of the magnetic poles uniform in order to ensure a high accuracy. Therefore, taking the variation in processing accuracy and the like of the mfagnetic pole shape into account, it is preferable to avoid this sharply varying portion and set an angle a to be not smaller than seven degrees which is the point of inflection of the curve Assuming that the angle that one magnetic pole bears as a radial bearing is $\psi$ $(=\alpha+\beta 30 \gamma)$ and generalizing the knowledge obtained from the result of the ninth embodiment in the case where $\psi=45$ degrees, it is proper to set the rising and falling intervals (a portion in which an inclined surface is formed, for example) so that $(\alpha/\psi)>0.15$.

(Eleventh Embodiment)

If the pole division core method used for a motor is utilized for the stator of a magnetic bearing to which an eleventh embodiment of the present invention is applied, then magnetic poles of special shapes each having a great face width, (i.e., a small slot width) and an inclined surface can be adopted. For example, even when the face width $B_1$ is set greater than the width $B_2$ of the winding portion as shown in the enlarged view of FIG. 36, a winding process that has not been able to be performed in the conventional magnetic bearing electromagnet can be achieved by using the division method. Furthermore, each magnetic pole can be treated as a single unit. Therefore, a high-density winding can be provided fully in the space for accommodating the coil, also facilitating the laminating and assembling work. That is, by virtue of the permitted great face width of the electromagnet, the constricted portion (indicated by the reference numeral 95 in FIG. 44) for providing the inclined surface on the magnetic pole inner surface or the magnetic resistance with a distribution in the circumferential direction can be formed in sufficiently long intervals with a sufficient margin. As a result, rising and falling intervals each having a sufficient length can be provided, so that the substantial reduction of the loss can be achieved.

Although the aforementioned division method is known in the field of the electric motor, there can currently be found no prior art to which the aforementioned processing method is applied to the magnetic bearing constructed of the magnetic poles having the specific shape intended for reducing the loss as proposed by the present invention. An example of the pole division method has the processes of dividing the stator into a plurality of core pieces, laminating high-precision core pieces by the intra-metal-mold laminate fixing method by means of, for example, a laser, providing the pieces with high-density winding, and thereafter highly accurately recombining them together by means of a laser.

Although the above embodiments have been described taking the processing use spindle as an example, the present invention can also be applied to a turbo molecular pump or the like.

By using the present invention, the heat generation due to the eddy current loss occurring at the rotor of the magnetic bearing can be substantially reduced with a simple construction not much changed from that of the conventional magnetic bearing. As a result, the temperature rise of the main shaft can be suppressed. Therefore, the reliability of the spindle constructed of a plurality of composite components can be improved and the axial expansion of the main shaft can be suppressed. Thus, a high runout accuracy can be ensured.

The present invention provides a very effective means for achieving a high DN value (main shaft diameter×number of revolutions) of the magnetic bearing spindle. The issues of the conventional magnetic bearing during high-speed rotation are solved. Therefore, the magnetic bearing can cope with the requirement for the high-speed cutting while further utilizing the fundamental capabilities (high speed and high rigidity) inherently owned by the magnetic bearing spindle, providing a very great practical effect.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic bearing comprising:

a rotatable rotor portion; and a stationary stator portion having a plurality of north magnetic poles and a plurality of south magnetic poles arranged in a circumferential direction of said stator portion, each of said magnetic poles spanning a circumferential angle W with respect to a center of the magnetic bearing, said rotatable rotor portion being arranged within said stator such that an outer surface of said rotatable rotor portion faces an inner surface of each of said magnetic poles, each of said magnetic poles being formed into a shape having a flux-increasing portion at an end of each of said magnetic poles with respect to said circumferential direction of said stator portion, said flux-increasing portion spanning a circumferential angle a with respect to said center ofthe magnetic bearing wherein a magnetic flux between said rotatable rotor portion and said inner surface of each of said magnetic poles at said flux-increasing portion has a density distribution increasing from said end of said each of said magnetic poles toward a center of said each of said magnetic poles with respect to said circumferential direction of said stator portion, and wherein a ration of $\alpha/\psi$ is greater than 0.15.

2. The magnetic bearing of claim 1, wherein said inner surface of each of said magnetic poles has a circular portion being coaxial with said outer surface of said rotatable rotor portion such that a uniform magnetic path gap is maintained between said circular portion and said rotatable rotor portion.

3. A magnetic bearing comprising:
a rotatable rotor portion; and
a stationary stator portion having a plurality of north magnetic poles and a plurality of south magnetic poles arranged so as to form an NSSN configuration in a circumferential direction of said stator portion such that each of said magnetic poles has a heteropolar end and a homopolar end with respect to said circumferential direction of said stator portion, said rotatable rotor portion being arranged within said stator such that an outer surface of said rotatable rotor portion faces an inner surface of each of said magnetic poles, each of said magnetic poles being formed into a shape such that a magnetic flux at said heteropolar end has a density distribution that increases from a midpoint of a boundary between an adjacent magnetic pole and said heteropolar end toward a center of said each of said magnetic poles, and such that a magnetic flux at said homopolar end has a density distribution that remains substantially constant from a midpoint of a boundary between an adjacent magnetic pole and said homopolar end toward a center of said each of said magnetic poles.

4. The magnetic bearing of claim 3, wherein said inner surface of each of said magnetic poles has a circular portion being coaxial with said outer surface of said rotatable rotor portion such that a uniform magnetic path gap is maintained between said circular portion and said rotatable rotor portion.

5. A magnetic bearing comprising:
a rotatable rotor portion; and
a stationary stator portion having a plurality of north magnetic poles and a plurality of south magnetic poles arranged so as to form an NSSN configuration in a circumferential direction of said stator portion such that each of said magnetic poles has a heteropolar end and a homopolar end with respect to said circumferential direction of said stator portion, said rotatable rotor portion being arranged within said stator such that an outer surface of said rotatable rotor portion faces an inner surface of each of said magnetic poles, each of said magnetic poles being formed into a shape such that a magnetic flux between said rotatable rotor portion and said inner surface of each of said magnetic poles has a density distribution increasing from at least one end of each of said magnetic poles toward a center of each of said magnetic poles with respect to said circumferential direction of said stator portion, a gap $\delta_1$ being formed between said outer surface of said rotatable rotor and said inner surface of each of said magnetic poles at said heteropolar end, and a gap $\delta_2$ being formed between said outer surface of said rotatable rotor and said inner surface of each of said magnetic poles at said homopolar end, wherein $\delta_1$ is greater than $\delta_2$.

6. The magnetic bearing of claim 5, wherein said inner surface of each of said magnetic poles has a circular portion being coaxial with said outer surface of said rotatable rotor portion such that a uniform magnetic path gap is maintained between said circular portion and said rotatable rotor portion.

7. A magnetic bearing comprising:
a rotatable rotor portion; and
a stationary stator portion having a plurality of north magnetic poles and a plurality of south magnetic poles arranged in a circumferential direction of said stator portion, each of said magnetic poles spanning a circumferential angle $\psi$ with respect to a center of the magnetic bearing, said rotatable rotor portion being arranged within said stator such that an outer surface of said rotatable rotor portion faces an inner surface of each of said magnetic poles, each of said magnetic poles having an entrance end defined as an end with respect to said circumferential direction of said stator portion whereat a point on said outer surface of said rotatable rotor portion passes first, and each of said magnetic poles having an exit end defined as an end with respect to said circumferential direction located opposite to said entrance end, each of said magnetic poles being formed into a shape so as to have a flux-increasing portion at said entrance end, said flux-increasing portion spanning a circumferential angle $\alpha_1$ with respect to said center of the magnetic bearing wherein a magnetic flux between said rotatable rotor portion and said inner surface of each of said magnetic poles at said flux- increasing portion has a density distribution increasing from said entrance end of each of said magnetic poles toward a center of said each of said magnetic poles with respect to said circumferential direction of said stator portion, and each of said magnetic poles being formed into a shape so as to have a flux-decreasing portion at said exit end, said flux-decreasing portion spanning a circumferential angle $\alpha_2$ with respect to said center of the magnetic bearing wherein a magnetic flux between said rotatable rotor portion and said inner surface of each of said magnetic poles at said flux-decreasing portion has a density distribution decreasing from said exit end of said each of said magnetic poles toward a center of said each of said magnetic poles with respect to said circumferential direction of said stator portion, and wherein a ration of $\alpha_1/\psi$ is less than a ratio of $\alpha_2/\psi$.

8. The magnetic bearing of claim 7, wherein said inner surface of each of said magnetic poles has a circular portion being coaxial with said outer surface of said rotatable rotor portion such that a uniform magnetic path gap is maintained between said circular portion and said rotatable rotor portion.

9. A magnetic bearing comprising:
a rotatable rotor portion; and
a stationary stator portion having a plurality of north magnetic poles and a plurality of south magnetic poles arranged in a circumferential direction of said stator portion such that each of said magnetic poles has a heteropolar end and a homopolar end, said rotatable rotor portion being arranged within said stator such that an outer surface of said rotatable rotor portion faces an inner surface of each of said magnetic poles, each of said magnetic poles being formed into a shape such that a magnetic flux between said rotatable rotor portion and said inner surface of each of said magnetic poles has a density distribution increasing from at least one end of each of said magnetic poles to a center of each of said magnetic poles with respect to said circumferential direction of said stator portion, and wherein at least one of:
a shape of said heteropolar end and a shape of said homopolar end of each of said magnetic poles are asymmetrical, and
a relative positional relation between said heteropolar end and said homopolar end of each of said magnetic poles is asymmetrical.

10. The magnetic bearing of claim 9, wherein said inner surface of each of said magnetic poles has a circular portion being coaxial with said outer surface of said rotatable rotor portion such that a uniform magnetic path gap is maintained between said circular portion and said rotatable rotor portion.

11. The magnetic bearing of claim 9, wherein a gap $S_1$ is formed between said heteropolar end of each of said magnetic poles and an adjacent magnetic pole, and a gap $S_2$ is formed between said homopolar end of each of said magnetic poles and an adjacent magnetic pole, wherein $S_1$ is greater than $S_2$.

12. The magnetic bearing of claim 9, wherein said homopolar end of each of said magnetic poles and an adjacent homopolar end of an adjacent magnetic pole are formed separately and then integrated.

13. The magnetic bearing of claim 9, wherein said magnetic poles include a first magnetic pole, and wherein one of said magnetic poles formed adjacent to said homopolar end of said first magnetic pole have integrated structures.

14. The magnetic bearing of claim 9, wherein each of said magnetic poles is formed into a shape such that said magnetic flux at said heteropolar end has a density distribution that increases from a midpoint of a boundary between an adjacent magnetic pole and said heteropolar end toward a center of said each of said magnetic poles, and such that said magnetic flux at said homopolar end has a density distribution that remains substantially constant from a midpoint of a boundary between an adjacent magnetic pole and said homopolar end toward a center of said each of said magnetic poles.

15. The magnetic bearing of claim 9, wherein each of said magnetic poles is formed into a shape so as to have a flux-increasing portion at said heteropolar end, said flux-increasing portion at said heteropolar end spanning a circumferential angle $\alpha_1$ with respect to said center of the magnetic bearing wherein said magnetic flux between said rotatable rotor portion and said inner surface ofeach of said magnetic poles at said flux-increasing portion of said heteropolar end has a density distribution increasing from said heteropolar end of each of said magnetic poles toward a center of said each of said magnetic poles with respect to said circumferential direction of said stator portion, and wherein each of said magnetic poles is formed into a shape so as to have a flux-increasing portion at said homopolar end, said flux-increasing portion at said homopolar end spanning a circumferential angle $\alpha_2$ with respect to said center of the magnetic bearing wherein said magnetic flux between said rotatable rotor portion and said inner surface of each of said magnetic poles at said flux-increasing portion of said homopolar end has a density distribution increasing from said homopolar end of each of said magnetic poles toward a center of said each of said magnetic poles with respect to said circumferential direction of said stator portion, wherein $\alpha_1$ is greater than $\alpha_2$.

16. The magnetic bearing of claim 9, wherein a gap $\delta_1$ is formed between said outer surace of said rotatable rotor and said inner surface of each of said magnetic poles at said heteropolar end, and a gap $\delta_2$ is formed between said outer surface of said rotatable rotor and said inner surface of each of said magnetic poles at said homopolar end, wherein $\delta_1$ is greater than $\delta_2$.

17. The magnetic bearing of claim 9, wherein each of said magnetic poles has an inclined portion on said inner surface such that a magnetic path gap between said rotatable rotor portion and said heteropolar end of each of said magnetic poles is tapered down from said heteropolar end toward said center of each of said magnetic poles with respect to said circumferential direction of said stator portion.

18. The magnetic bearing of claim 17, wherein said inner surface of each of said magnetic poles has a circular portion being coaxial with said outer surface of said rotatable rotor portion such that a uniform magnetic path gap is maintained between said circular portion and said rotatable rotor portion.

19. The magnetic bearing of claim 9, wherein said heteropolar end of each of said magnetic poles has a reduced magnetic path area in a magnetic circuit extending from a winding portion of each of said magnetic poles to said heteropolar end.

20. The magnetic bearing of claim 9, wherein said stationary stator portion comprises a plurality of core pieces.

* * * * *